United States Patent
Beerens et al.

(10) Patent No.: US 11,644,020 B2
(45) Date of Patent: May 9, 2023

(54) FLUID DOSING SYSTEM

(71) Applicant: Diversey, Inc., Fort Mill, SC (US)

(72) Inventors: Jeroen C. Beerens, Maarssen (NL); Gregory R. Alcott, Utrecht (NL)

(73) Assignee: Diversey, Inc., Fort Mill, SC (US)

( * ) Notice: Subject to any disclaimer, the term of this patent is extended or adjusted under 35 U.S.C. 154(b) by 0 days.

(21) Appl. No.: 17/610,967

(22) PCT Filed: Jul. 29, 2020

(86) PCT No.: PCT/US2020/044090
§ 371 (c)(1),
(2) Date: Nov. 12, 2021

(87) PCT Pub. No.: WO2021/021945
PCT Pub. Date: Feb. 4, 2021

(65) Prior Publication Data
US 2022/0205439 A1    Jun. 30, 2022

Related U.S. Application Data

(60) Provisional application No. 62/978,563, filed on Feb. 19, 2020, provisional application No. 62/879,893, filed on Jul. 29, 2019.

(51) Int. Cl.
*F04B 13/00* (2006.01)
*F04B 1/0535* (2020.01)
(Continued)

(52) U.S. Cl.
CPC ............ *F04B 13/00* (2013.01); *F01B 1/0603* (2013.01); *F01B 1/0606* (2013.01);
(Continued)

(58) Field of Classification Search
CPC ........ F04B 13/00; F04B 1/0535; F04B 9/045; F04B 9/109; F01B 1/0603; F01B 1/0606; G01N 1/38; G01F 11/024
See application file for complete search history.

(56) References Cited

U.S. PATENT DOCUMENTS 1,382,336 A    6/1921   Behr
3,193,148 A *  7/1965   Anthon .............. G01N 35/1097
                                                222/255

(Continued)

FOREIGN PATENT DOCUMENTS

AU    2011254629 A1 * 12/2012 ............. F04B 13/00
BE       421969 A       5/1937
(Continued)

OTHER PUBLICATIONS

International Search Report and Written Opinion for Application No. PCT/US2020/44090 dated Oct. 22, 2020 (14 pages).

*Primary Examiner* — Donnell A Long
(74) *Attorney, Agent, or Firm* — Michael Best & Friedrich LLP

(57) ABSTRACT

A closing engine including a framework, fluid drivers, and a flow control device. The framework has an inlet that receives a fluid and an outlet that dispenses the fluid. The fluid drivers are supported by the framework and pump fluid toward the outlet. The flow control device is coupled to the framework and is in fluid communication with the inlet, the outlet, and the fluid drivers. The fluid drivers are cooperatively driven by a motive force from fluid flow through the inlet to dispense fluid via the outlet, and to drive the flow control device to distribute diluent to the diluent drivers in a coordinated manner.

20 Claims, 55 Drawing Sheets

(51) Int. Cl.
*F04B 9/04* (2006.01)
*G01N 1/38* (2006.01)
*F01B 1/06* (2006.01)

(52) U.S. Cl.
CPC ............ *F04B 1/0535* (2013.01); *F04B 9/045* (2013.01); *G01N 1/38* (2013.01)

(56) References Cited

U.S. PATENT DOCUMENTS

| | | | |
|---|---|---|---|
| 3,747,412 A * | 7/1973 | Jones | G01N 35/10 73/864.24 |
| 3,948,605 A | 4/1976 | Atwood et al. | |
| 4,177,834 A | 12/1979 | Bonney | |
| 4,245,509 A | 1/1981 | Mody et al. | |
| 4,756,329 A | 7/1988 | Cloup | |
| 5,058,768 A | 10/1991 | Lichfield | |
| 5,388,725 A | 2/1995 | Lichfield | |
| 5,513,963 A | 5/1996 | Walton | |
| 5,580,227 A | 12/1996 | Rappenhoner | |
| 5,588,813 A | 12/1996 | Berke-Jorgensen | |
| 6,162,027 A | 12/2000 | Tuell | |
| 6,676,387 B1 | 1/2004 | Penn | |
| 7,207,260 B2 | 4/2007 | Thierry et al. | |
| 8,132,497 B2 | 3/2012 | Darbois et al. | |
| 9,303,634 B2 | 4/2016 | Furet et al. | |
| 9,605,765 B1 | 3/2017 | Cheng | |
| 9,664,184 B2 | 5/2017 | Bosch et al. | |
| 9,790,935 B2 | 10/2017 | Parsons et al. | |
| 9,903,312 B1 | 2/2018 | Walsh | |
| 10,240,459 B2 | 3/2019 | Satake et al. | |
| 10,371,137 B2 | 8/2019 | Himmelmann | |
| 2005/0247742 A1 | 11/2005 | Livingston et al. | |
| 2006/0182640 A1 | 8/2006 | Kellar et al. | |
| 2009/0266751 A1 | 10/2009 | Straka et al. | |
| 2010/0051716 A1 | 3/2010 | Walton | |
| 2010/0108714 A1 | 5/2010 | Bertucci et al. | |
| 2011/0274563 A1 | 11/2011 | Man et al. | |
| 2012/0186518 A1 | 7/2012 | Herre et al. | |
| 2016/0084242 A1* | 3/2016 | Prineppi | F04B 13/00 417/44.1 |
| 2016/0102658 A1 | 4/2016 | Wichmann | |
| 2018/0252213 A1 | 9/2018 | Afshari | |
| 2019/0293066 A1 | 9/2019 | Duquennoy et al. | |
| 2020/0002151 A1 | 1/2020 | Kraus et al. | |

FOREIGN PATENT DOCUMENTS

| | | | | |
|---|---|---|---|---|
| CA | 2883458 A1 * | 3/2014 | ............ | F04B 13/00 |
| CN | 205955936 U | 2/2017 | | |
| DE | 112015001329 T5 * | 12/2016 | .......... | B05B 7/1459 |
| EP | 1971774 B1 | 5/2009 | | |
| EP | 2946110 B1 | 11/2016 | | |
| GB | 249885 A | 10/1926 | | |
| GB | 631597 A | 11/1949 | | |
| GB | 2473702 A * | 3/2011 | ............ | G01N 35/00 |
| WO | 2017021801 A1 | 2/2017 | | |

* cited by examiner

FLUID DOSING SYSTEM

BACKGROUND

The present invention relates to a chemical dosing system, and more particularly to a rotary dosing system that can dispense different chemical dilutions.

SUMMARY

Many industries rely on systems that mix one or more chemicals and water or another suitable fluid. These systems require a means of consistently and accurately providing doses of chemicals to the appropriate amount of water to create a correctly diluted solution. The goal is for the system to create effective solutions without wasting chemical.

In one aspect, the invention provides a dosing engine including a framework that has at least three housings and a wall defining a central chamber in communication with each of the at least three housings via chamber inlets and chamber outlets, and a piston disposed in each of the at least three housings. Each piston and housing cooperate to define a piston-cylinder arrangement, and the pistons are cooperatively driven between respective first positions and second positions by a motive force. The dosing engine also includes a valve assembly that is positioned in the central chamber and that is configured to be in fluid communication with a diluent inlet and a diluent outlet. The valve assembly is rotatable via the motive force for intake of diluent and a second position for dispense of diluent. The dosing engine further includes at least one chemical pump assembly that is attached to the framework and that is driven by the motive force to intake and dispense a chemical concentrate.

In another aspect, the invention provides a dosing engine including a framework that defines a central chamber, and three or more pistons that are coupled to the framework within respective housings. Each piston and housing cooperate to define a piston-cylinder arrangement. The dosing engine also includes a valve assembly that is positioned in the central chamber and that is configured to be in fluid communication with a source of diluent via a diluent inlet and a diluent outlet. The dosing engine further includes at least one chemical pump assembly that is attached to the framework and that is configured to be in fluid communication with a source of chemical concentrate. A single motive force is configured to drive the three or more pistons between respective first positions and second positions. The single motive force is further configured to rotate the valve assembly to intake diluent and dispense diluent, and to drive the chemical pump assembly to intake and dispense the chemical concentrate.

In another aspect, the invention provides a dosing engine including a diluent pump that has a framework with an inlet and an outlet and defining a central chamber, a valve assembly positioned in the central chamber, and three or more pistons disposed in the framework and cooperating with the framework to define piston-cylinder assemblies that are reciprocated between a first position and a second position by a motive force. The inlet is configured to be connected to a source of diluent. The valve assembly has an intake valve in fluid communication with the inlet and a discharge valve that is in fluid communication with the outlet. The dosing engine also includes a chemical pump that has a chemical piston and first and second sleeves. The chemical piston is configured to reciprocate within the sleeves via the motive force. The valve assembly also is configured to rotate via the motive force.

In another aspect, the invention provides a dosing engine including a framework, fluid drivers, and a flow control device. The framework has an inlet that receives a fluid and an outlet that dispenses the fluid. The fluid drivers are supported by the framework and pump fluid toward the outlet. The flow control device is coupled to the framework and is in fluid communication with the inlet, the outlet, and the fluid drivers. The fluid drivers are cooperatively driven by a motive force from fluid flow through the inlet to dispense fluid via the outlet, and to drive the flow control device to distribute diluent to the diluent drivers in a coordinated manner.

In another aspect, the invention provides a dosing engine including a framework, fluid drivers, a drive mechanism and a flow control device. For example, the framework has an inlet that receives a fluid and an outlet that dispenses the fluid. The fluid drivers are supported by and, in some cases, radially arranged on the framework. In cases where the fluid drivers are radially arranged, the fluid drivers are angularly spaced around the framework and pump fluid toward the outlet. The drive mechanism is coupled to the framework and is operatively coupled to the fluid drivers. The flow control device is at least partially disposed in the framework and is operatively coupled to the drive mechanism. For example, the flow control device is in fluid communication with the inlet, the outlet, and the fluid drivers, and the flow control device is defined by one or more cams and one or more valves to sequence flow of fluid to and from the fluid drivers in response to movement of the drive mechanism.

In another aspect, the invention provides a method of dispensing a fluid. The method includes directing a fluid through an inlet of a framework. The framework support fluid drivers that at least partially define pump chambers associated with the fluid drivers. The method also includes cooperatively moving the fluid drivers via a motive force from fluid flow into the framework to dispense fluid to an outlet, and driving a flow control device in response to the cooperative movement of the fluid drivers to distribute diluent to the fluid drivers in a coordinated manner.

Figure 1:
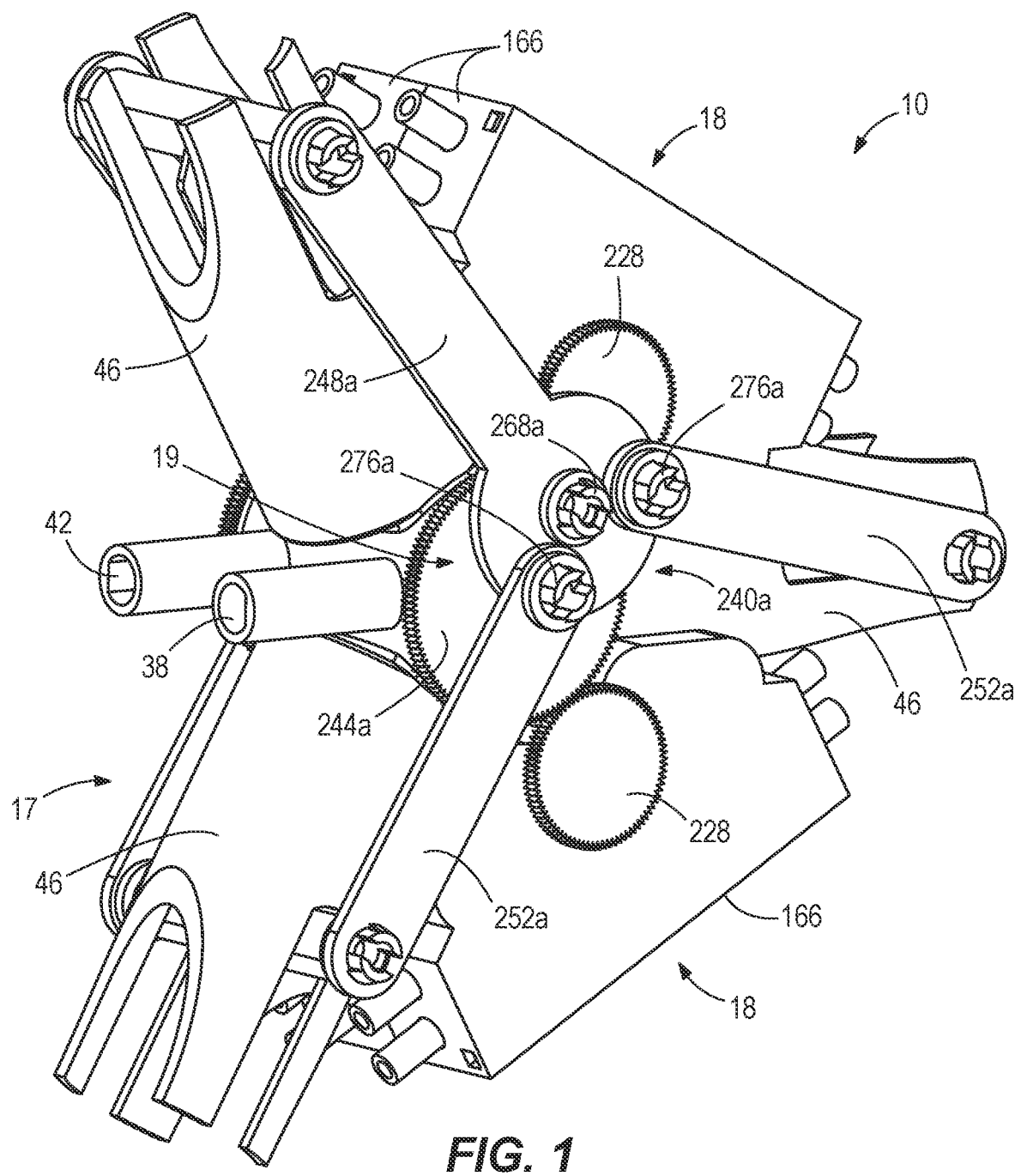
FIG. 1 is a perspective view of an exemplary dosing system including a dosing engine that has a mechanism 64 pump, chemical pump assemblies, and a drive mechanism.

Before any embodiments of the present invention are explained in detail, it should be understood that the invention is not limited in its application to the details or construction and the arrangement of components as set forth in the following description or as illustrated in the drawings. The invention is capable of other embodiments and of being practiced or of being carried out in various ways. It should be understood that the description of specific embodiments is not intended to limit the disclosure from covering all modifications, equivalents and alternatives falling within the spirit and scope of the disclosure. Also, it is to be understood that the phraseology and terminology used herein is for the purpose of description and should not be regarded as limiting.

DETAILED DESCRIPTION

Figure 19:
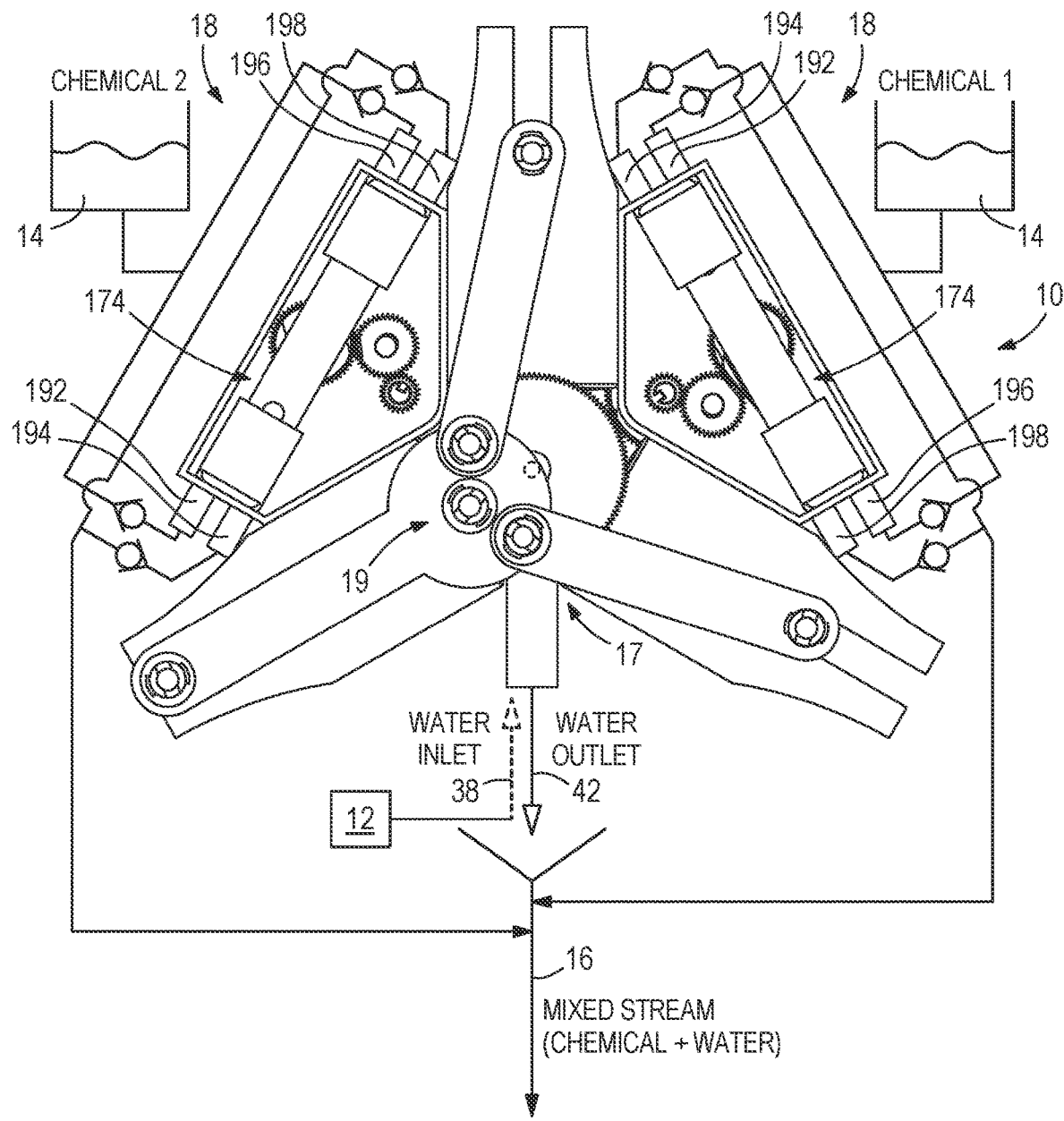
FIG. 19 is a schematic of the rotary dosing system illustrating the dosing engine, chemical concentrate sources, a fluid source, and a mix chamber.

FIGS. 1 and 19 illustrate an exemplary dosing system including a dosing engine or dispenser 10 (e.g., a rotary dosing engine or rotary dispenser) that is coupled to a fluid or diluent source 12 (e.g., a water or other fluid source) and chemical reservoirs 14 (e.g., containers, bags, tanks, etc.) for mixing fluid and chemical in a mix chamber 16. The dosing engine 10 includes a fluid or diluent pump 17 (referred to as a 'diluent pump' for purposes of description only), chemical drivers or pump assemblies 18, and a drive mechanism 19 that operatively couples the pump 17 and the chemical pump assemblies 18 to dispense predetermined amounts of diluent and a selected chemical into the mix chamber 16. As shown in FIG. 19, the mix chamber 16 is located downstream of the dosing engine 10.

Figure 2:
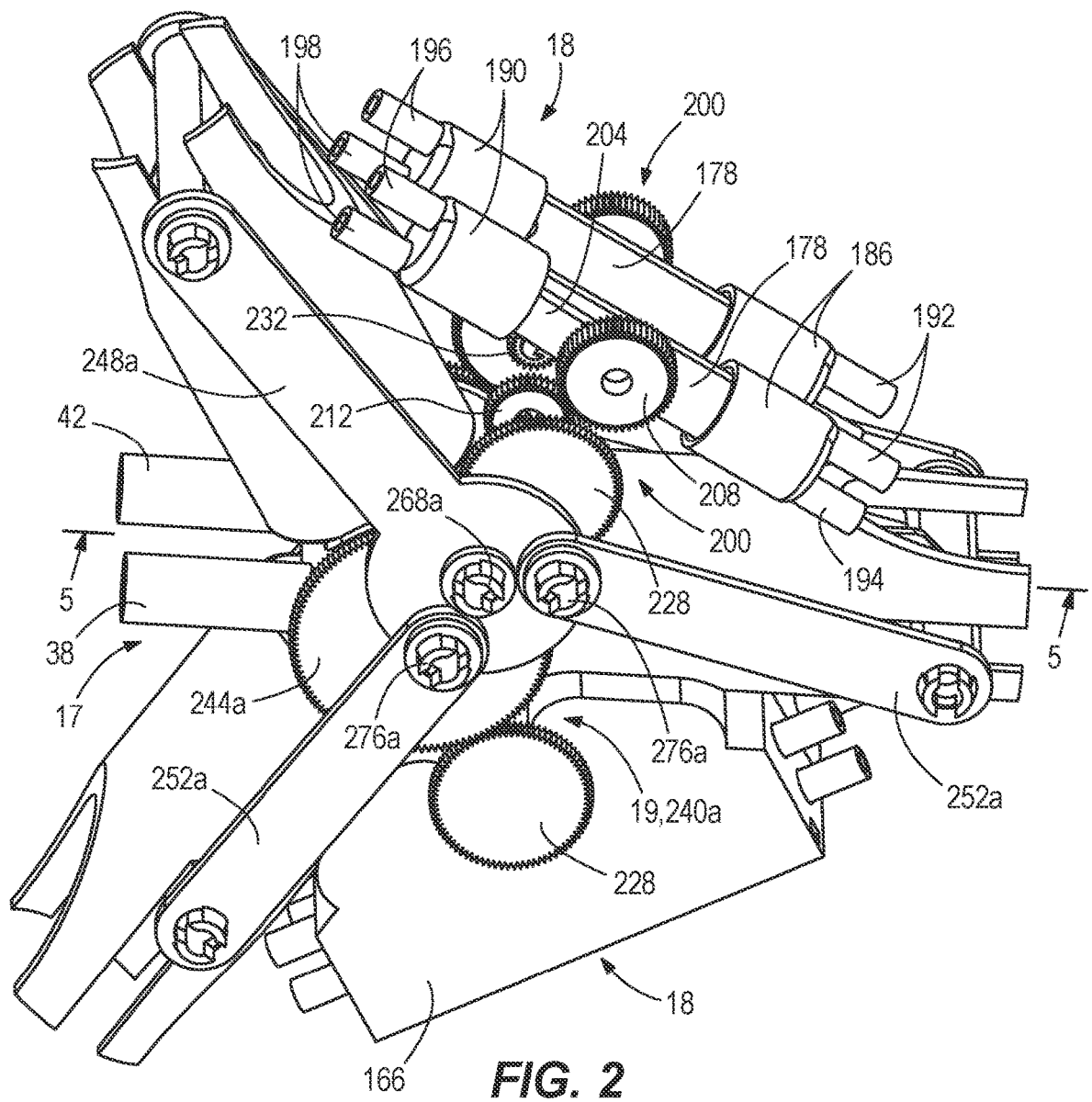
FIG. 2 is a perspective view of a portion of the dosing engine of FIG. 1 exposing features of two of the chemical pump assemblies.
Figure 3A:
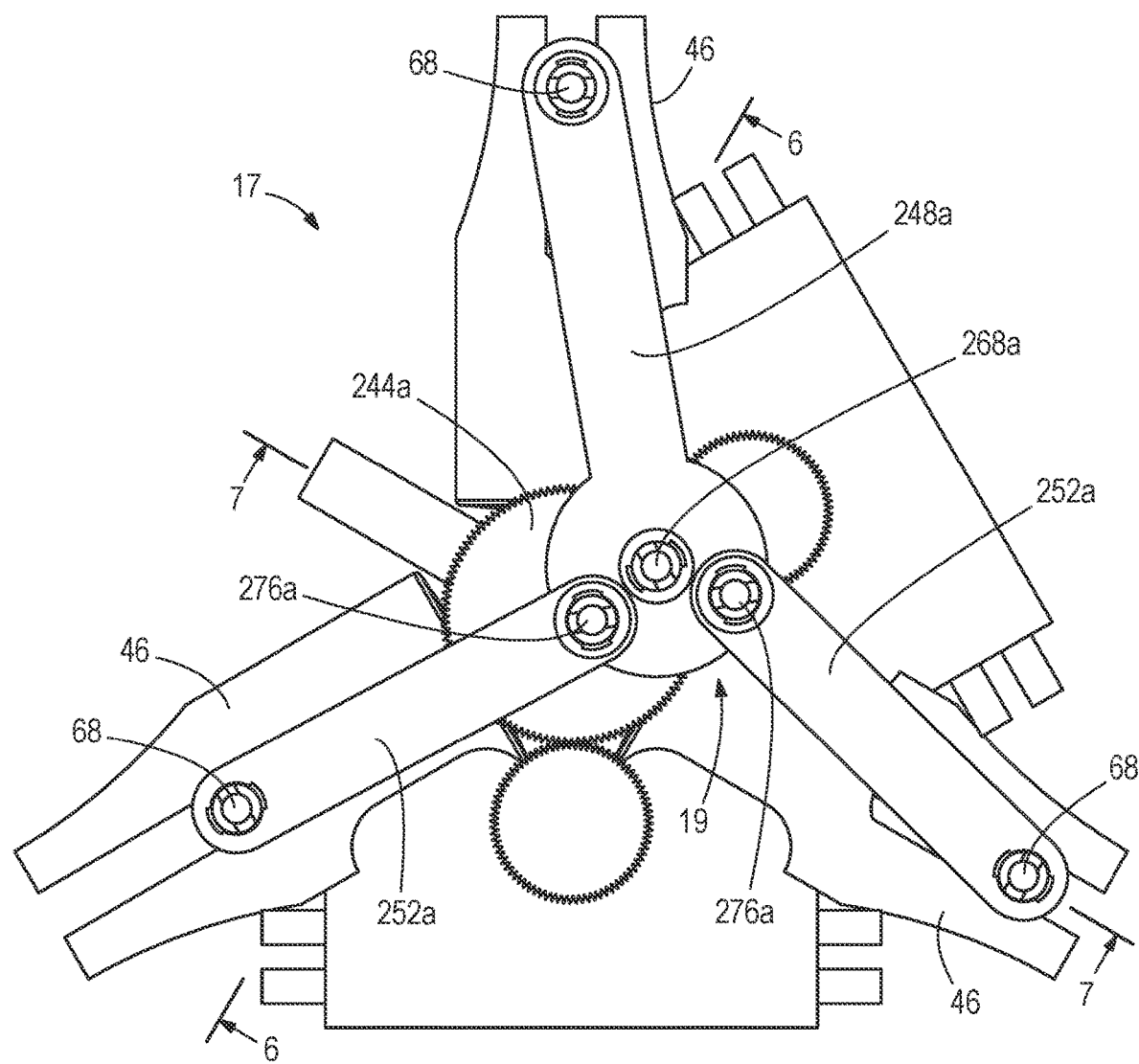
FIG. 3A is an elevation view of the dosing engine of FIG. 1 from a first side.
Figure 3B:
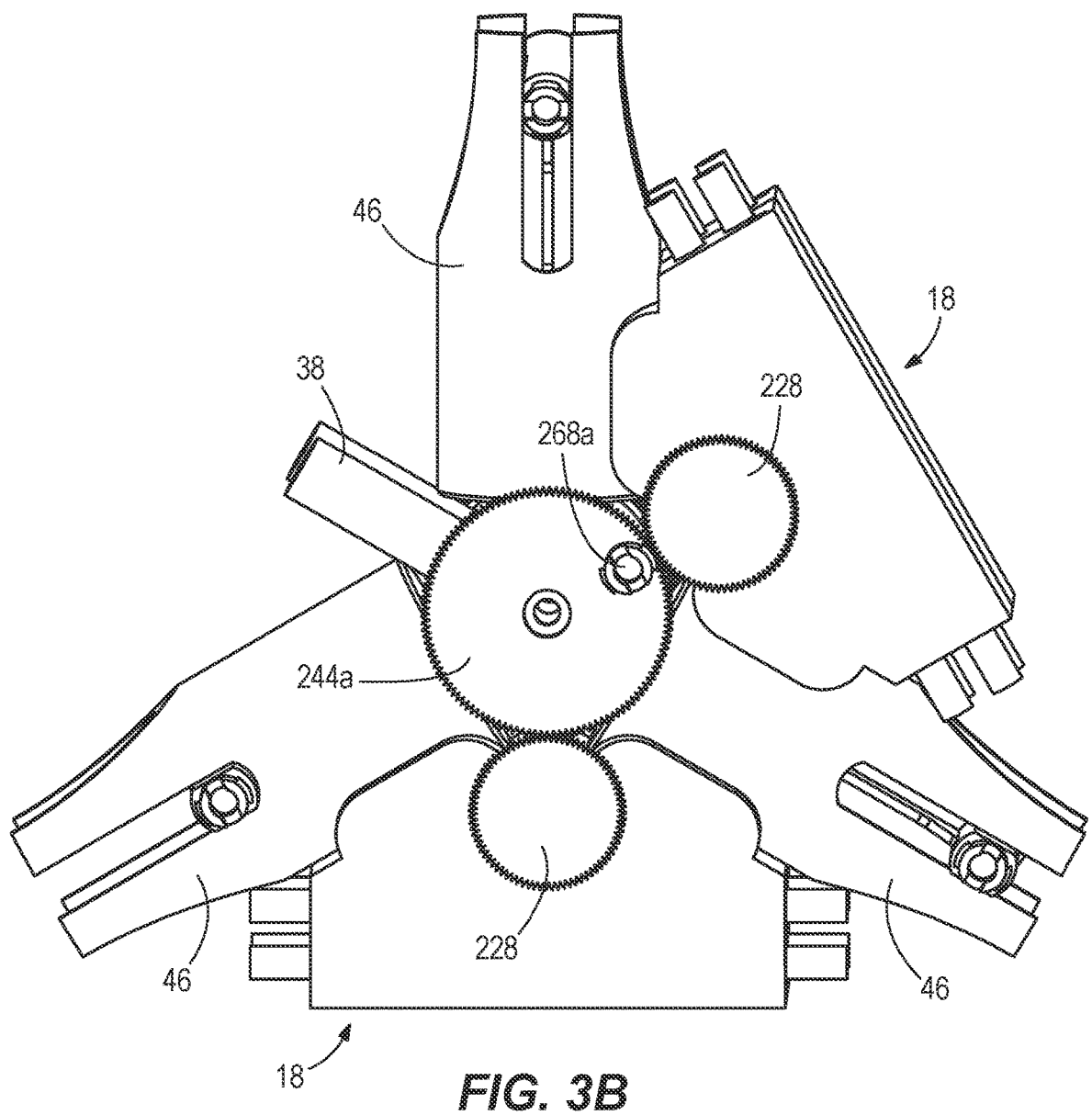
FIG. 3B is an elevation view of the dosing engine of FIG. 1, with a portion of the drive mechanism removed for clarity.
Figure 4:
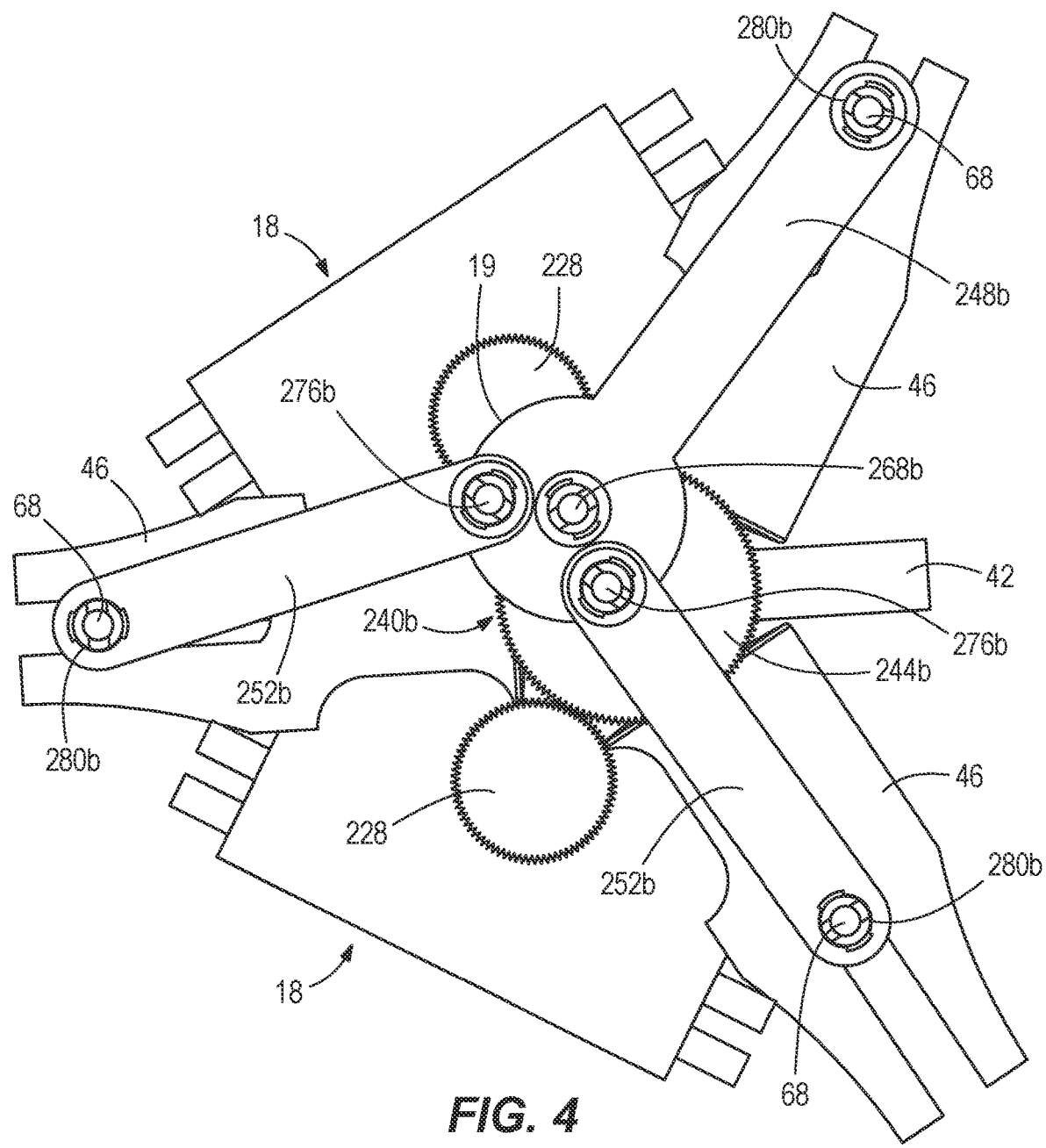
FIG. 4 is an elevation view of the dosing engine of FIG. 1 from a second side.
Figure 5:
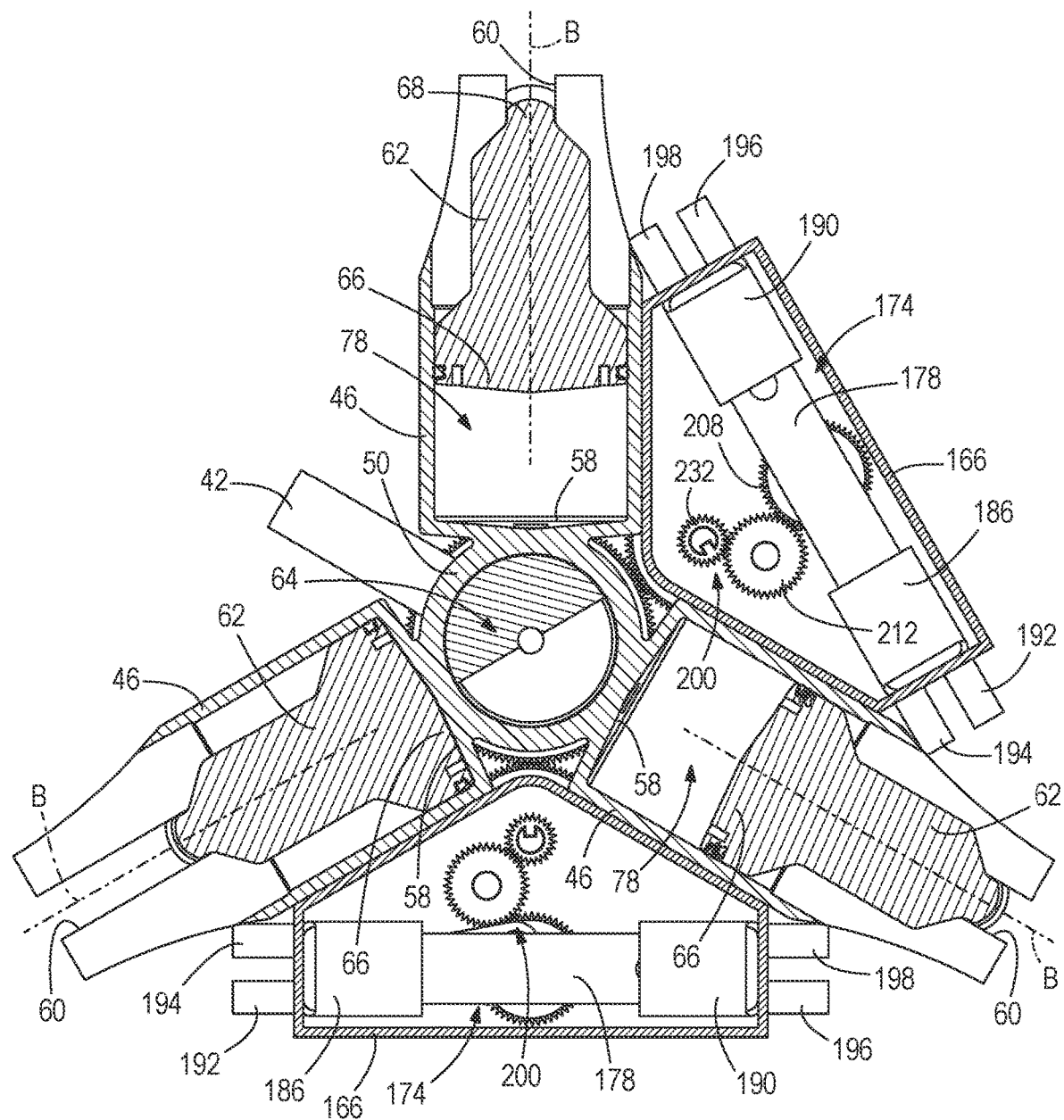
FIG. 5 is an elevation view of the dosing engine with portions of the dosing engine removed to illustrate fluid pistons, chemical pistons, and the axes along which fluid pistons and chemical pistons move.

With reference to FIGS. 1-10, the diluent pump 17 includes a framework 34 that has an inlet 38, an outlet 42, a central chamber 44 (best seen in FIGS. 8 and 9), and housings 46 (FIGS. 2 and 5). The inlet 38 is fluidly coupled to the diluent source 12 (e.g., via piping, conduit, or hoses) and connects the diluent source 12 to the central chamber 44. The outlet 42 fluidly connects the central chamber 44 to the mix chamber 16. It will be appreciated that the pump 17 can be used with fluids other than a diluent.

Figure 7:
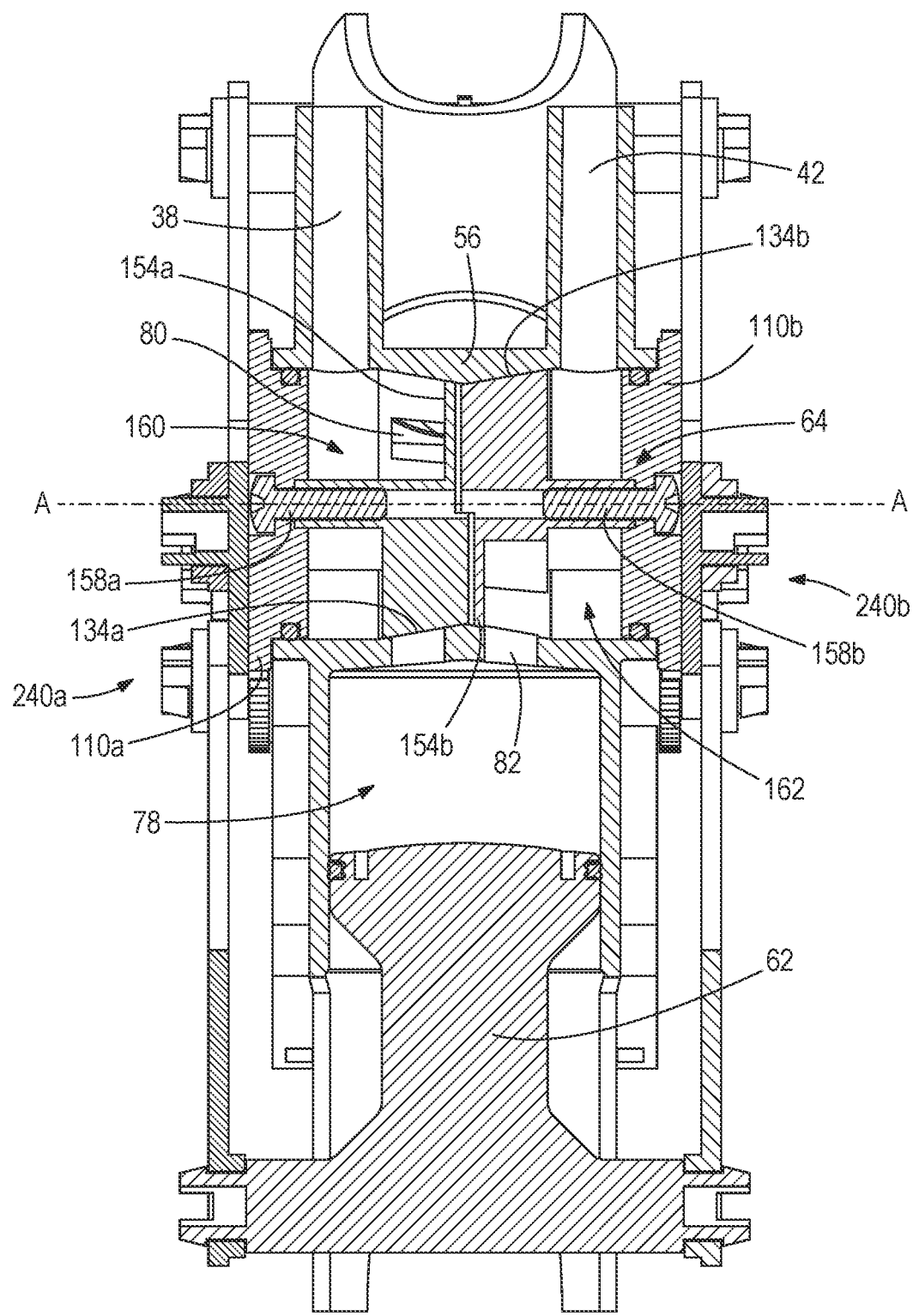
FIG. 7 is a cross-section view of the mechanism 64 pump and the drive mechanism taken along line 7-7 of FIG. 3A.
Figure 8:
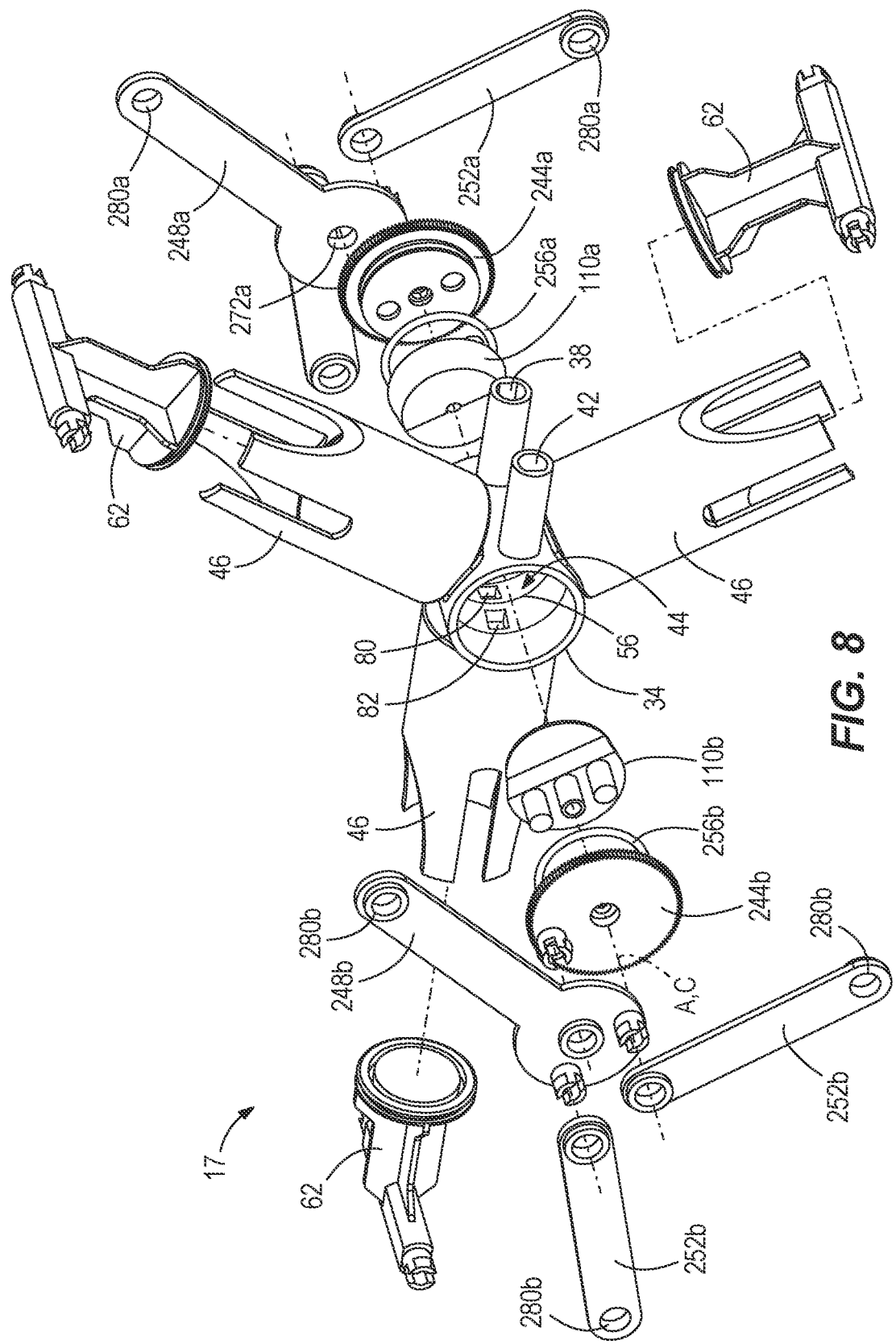
FIG. 8 is an exploded view of the mechanism 64 pump and the drive mechanism of FIG. 1 illustrating a dosing engine framework, a valve assembly, and mechanism 64 pistons.
Figure 9:
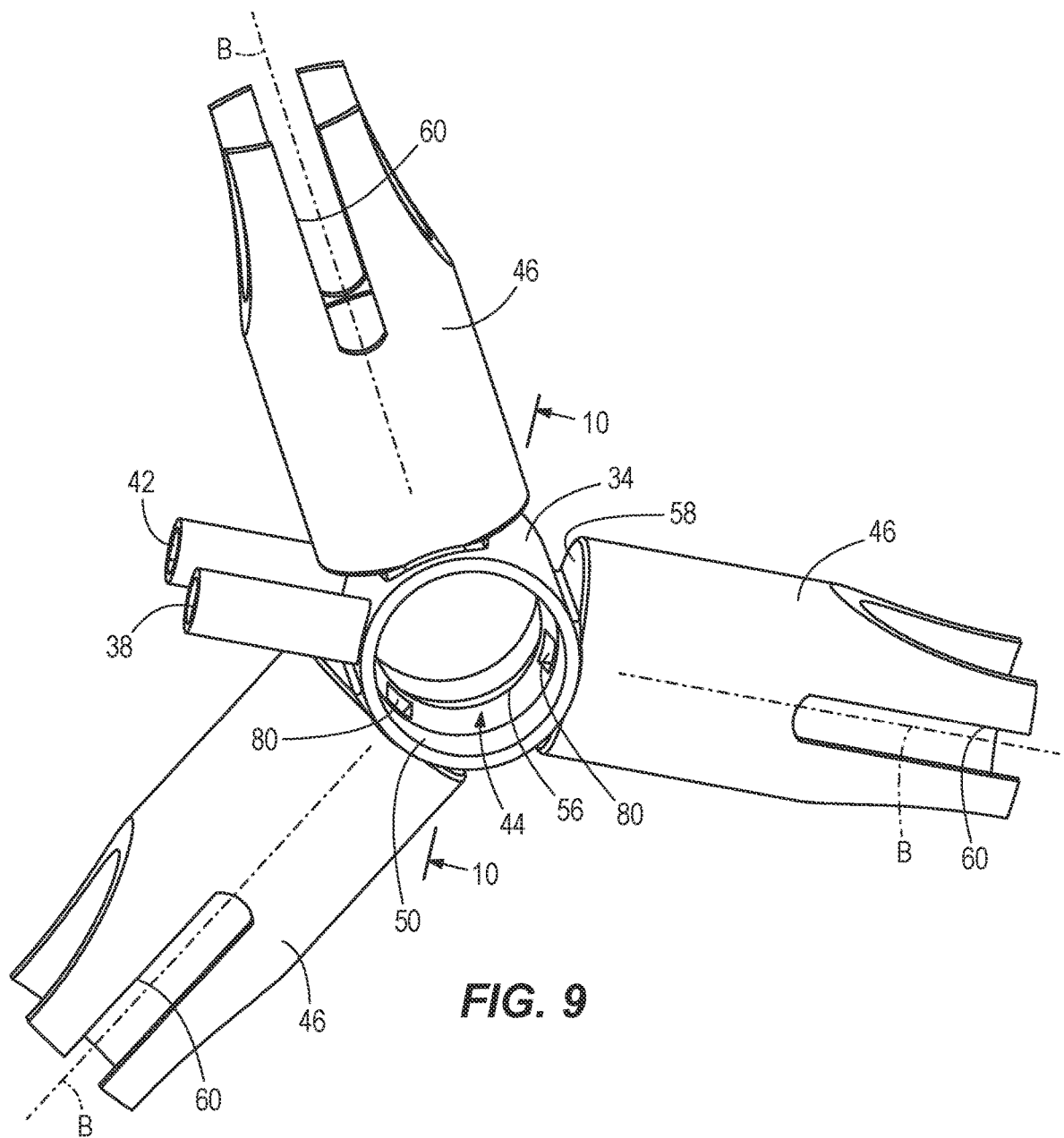
FIG. 9 is a perspective view of the dosing engine framework of FIG. 8.
Figure 10:
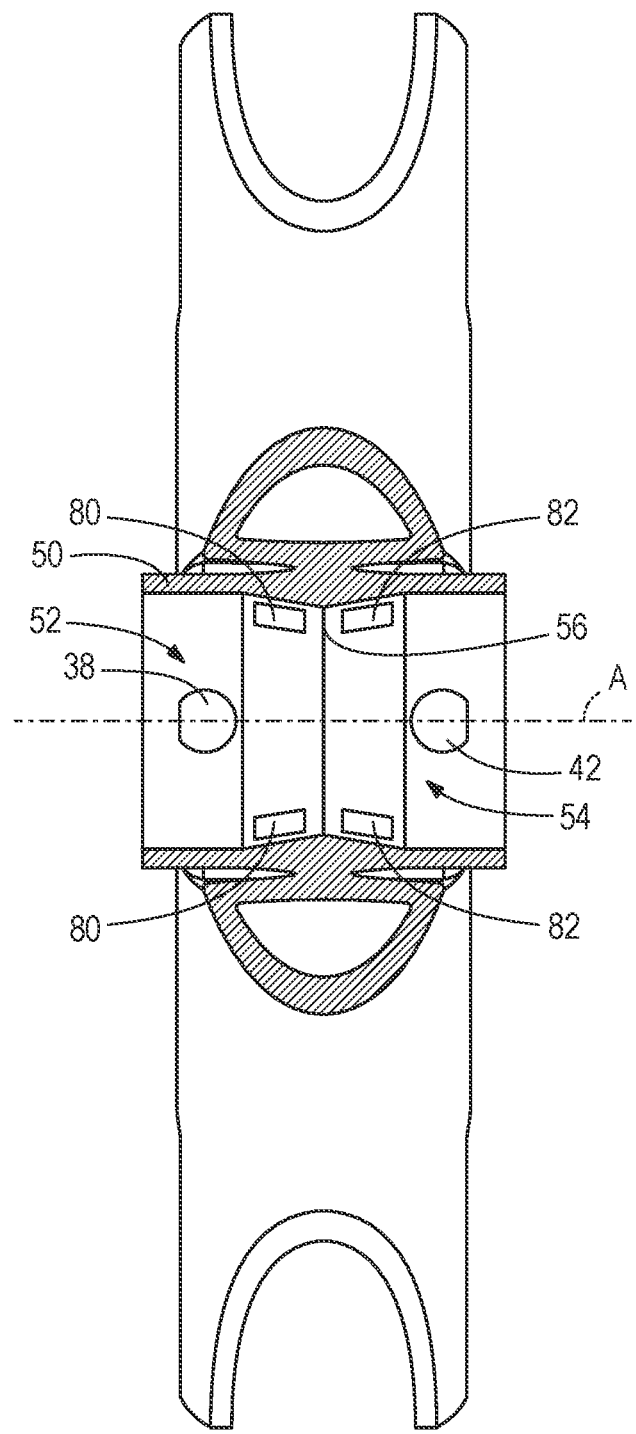
FIG. 10 is a cross-section view of the dosing engine framework of FIG. 9 taken along line 10-10 in FIG. 9.

With reference to FIGS. 9 and 10, the central chamber 44 is defined by a wall 50 with an interior surface of revolution about a central axis A (see FIGS. 7, 8, and 10). The illustrated central chamber 44 includes a first or intake chamber section 52 and a second or discharge chamber section 54. Each chamber section 52, 54 is defined by a cylindrical portion 52a, 54a, respectively, on the outer or lateral extent of the central chamber 44 (left and right sides of the chamber 44 as viewed in FIG. 10; along the axis A), and a tapered portion 52b, 54b, respectively, that tapers radially inward relative to the central axis A. The tapered portions 52b, 54b terminate at a ridge 56. It will be appreciated that the central chamber 44 can have a different profile and still function in the manner described herein. The inlet 38 fluidly communicates with the intake chamber section 52, and the outlet 42 fluidly communicates with the discharge chamber section 54.

The housings 46 are attached to the central chamber 44 (e.g., by welding or formed integral with the central chamber 44 via a molding or forming process) and extend outward from the central chamber 44. As best seen in FIG. 5, the framework 34 has three housings 46, although it will be appreciated that the framework 34 may have fewer or more than three housings 46 (e.g., two housings, five housings, etc.). The illustrated housings 46 are cylindrical, but it will be appreciated that the housings 46 can have other shapes (e.g., oblong, polygonal, elliptical, etc.). As shown in FIGS. 5 and 9, the housing 46 has an end wall 58 that joins with (e.g., partially shares) the wall 50. In some embodiments, the end wall 58 can be completely separate from (and still attached to) the wall 50. Each housing 46 also has slots 60 that extend from a distal end of the housing 46 axially inward along a piston axis B toward the end wall 58.

As shown in FIGS. 5-8, the diluent pump 17 also includes fluid drivers 62 (e.g., illustrated as pistons) and a flow control device 64 (e.g., illustrated as a valve assembly or valve mechanism). For purposes of the description, the terms 'valve assembly' and 'valve mechanism' are used as examples of a flow control device. One piston 62 is disposed in a corresponding housing 46, and each housing-piston combination defines a piston-cylinder arrangement. It will be appreciated that the term 'piston-cylinder' encompasses more than a cylindrical housing 46, and that the shape of the housing 46 and the piston head can have shapes other than cylindrical (e.g., oblong, polygonal, elliptical, etc.). In addition, each piston 62 defines an exemplary pump mechanism of the dosing engine 10 that is supported by the framework 34 and that pumps fluid from the inlet 38 to the outlet 42 in a coordinated manner with the other pump mechanisms. For purposes of the description and the claims, the terms 'fluid driver' or 'diluent driver' shall be broadly construed as a pump mechanism that can include the piston 62, or another pump mechanism that is designed to pump a fluid. The term 'flow control device' shall be broadly construed to include the valve mechanism 64 or another mechanism or assembly that controls flow of fluid through the framework 34.

Figure 13:
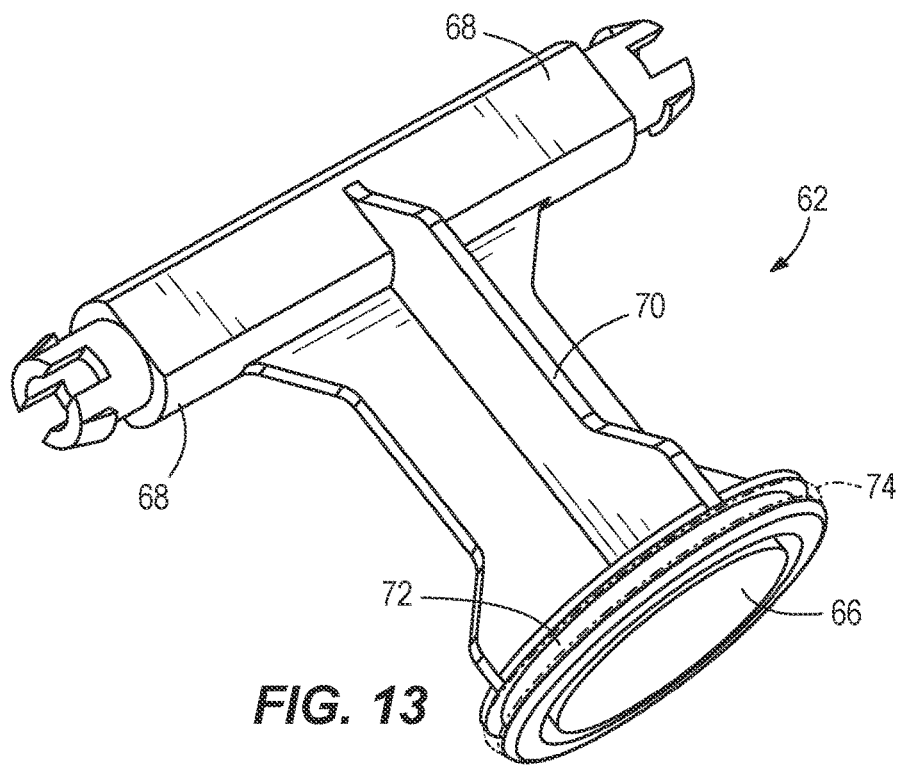
FIG. 13 is a perspective view of one mechanism 64 piston of FIG. 8.
Figure 14A:
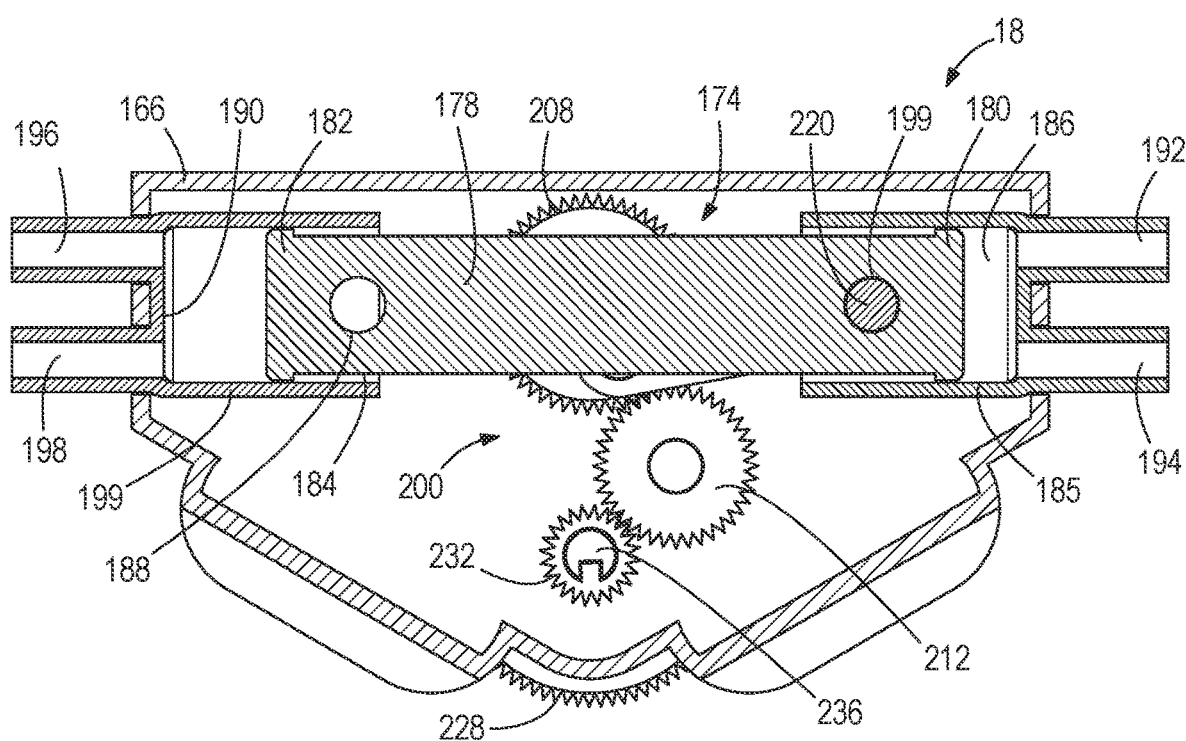
FIG. 14A is an elevation view of a one chemical pump assembly illustrating inlets and outlets, the chemical piston, and the chemical drive assembly.
Figure 14B:
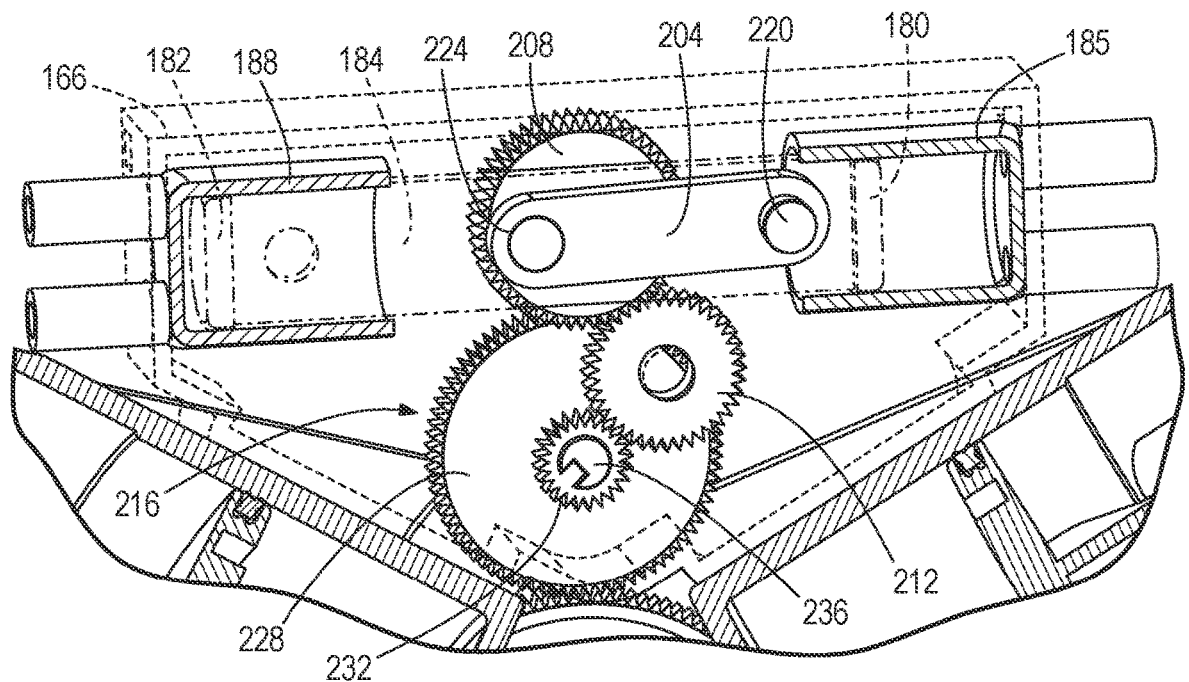
FIG. 14B is a perspective view of a portion of the chemical pump assembly with the housing made transparent to illustrate the chemical piston, pump chambers, and chemical drive assembly.
Figure 14C:
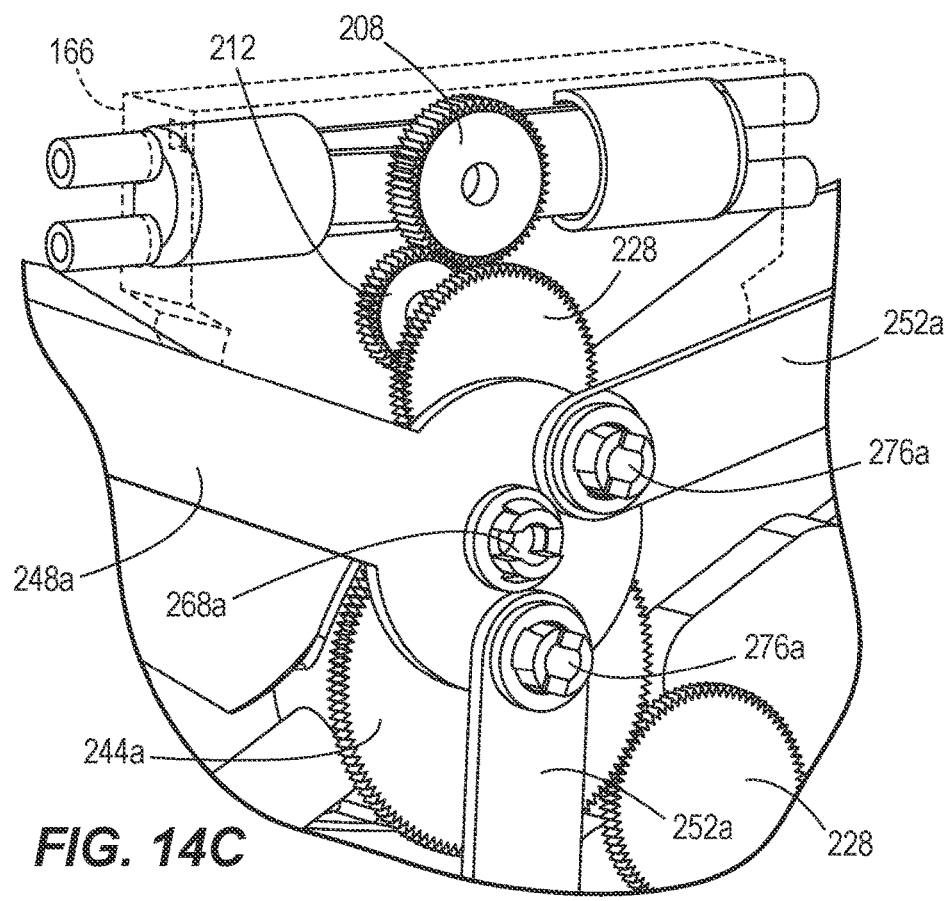
FIG. 14C is another perspective view of a portion of the chemical pump assembly with the housing made transparent to illustrate the chemical piston, pump chambers, and chemical drive assembly.
Figure 14D:
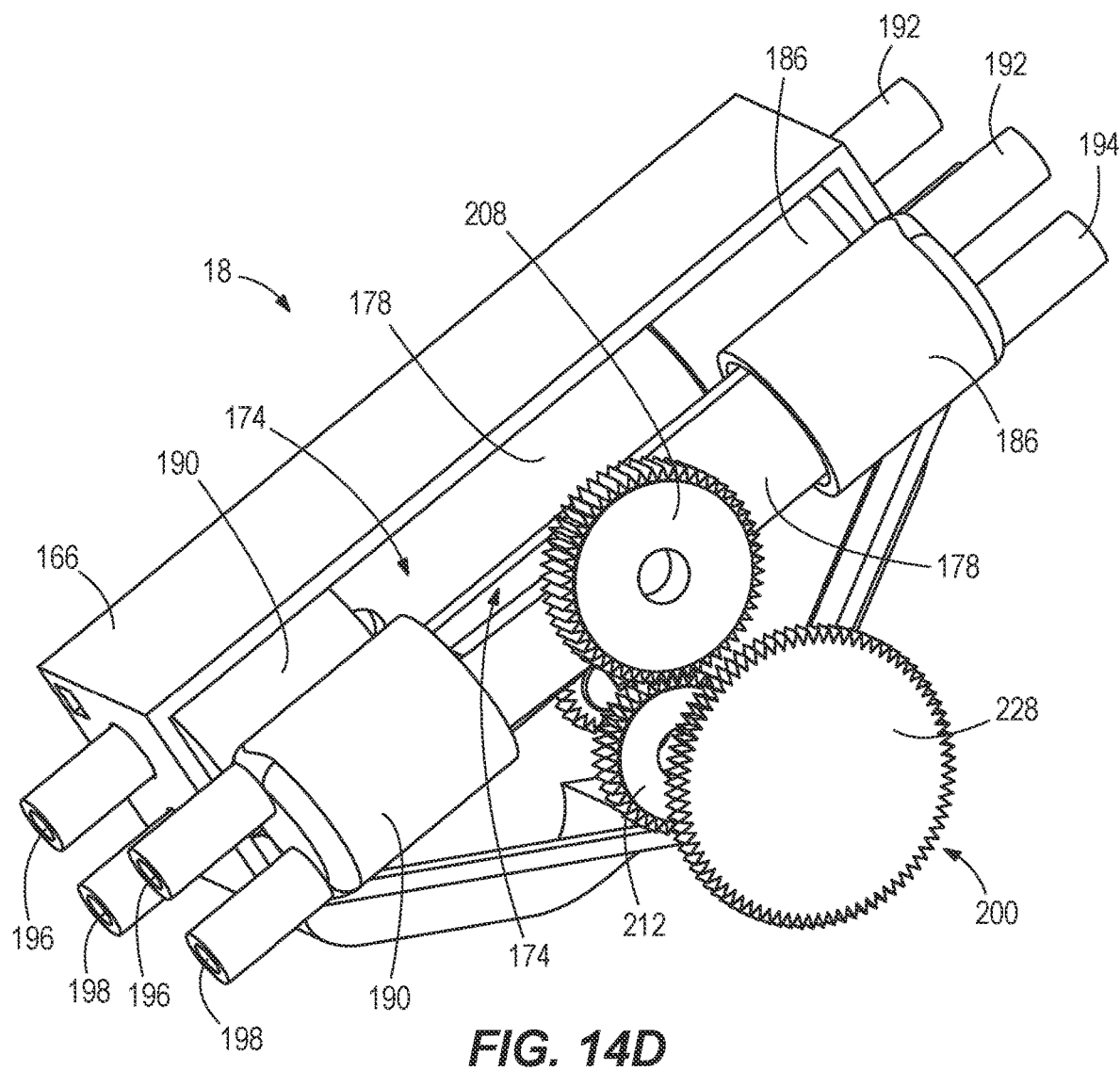
FIG. 14D is a perspective view of two adjacent, parallel chemical pump assemblies, with a portion of the housing removed for clarity.
Figure 14E:
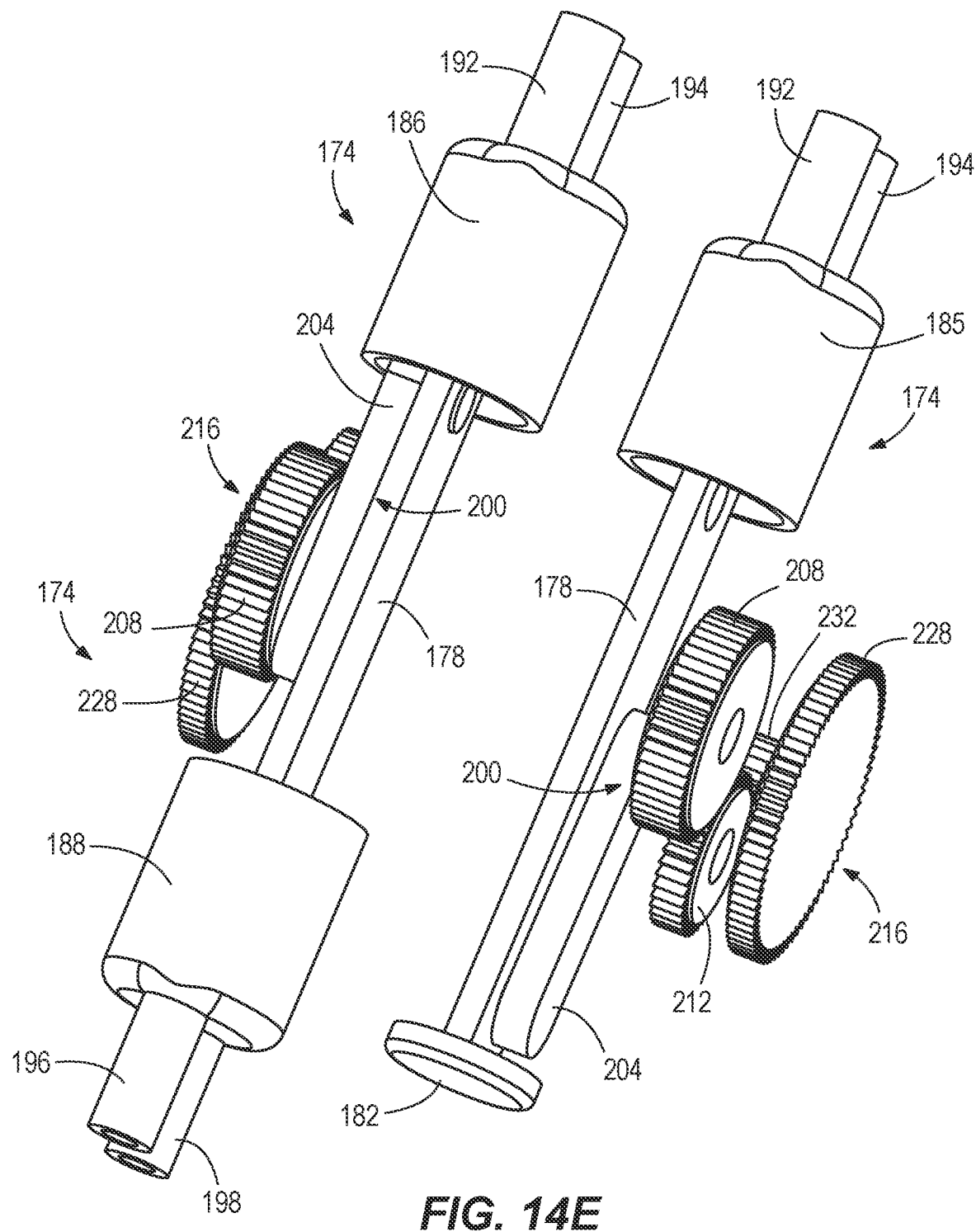
FIG. 14E is a perspective view of a portion of two adjacent chemical pump assemblies illustrating chemical pistons, chemical pump chambers, and chemical drive assemblies.
Figure 15:
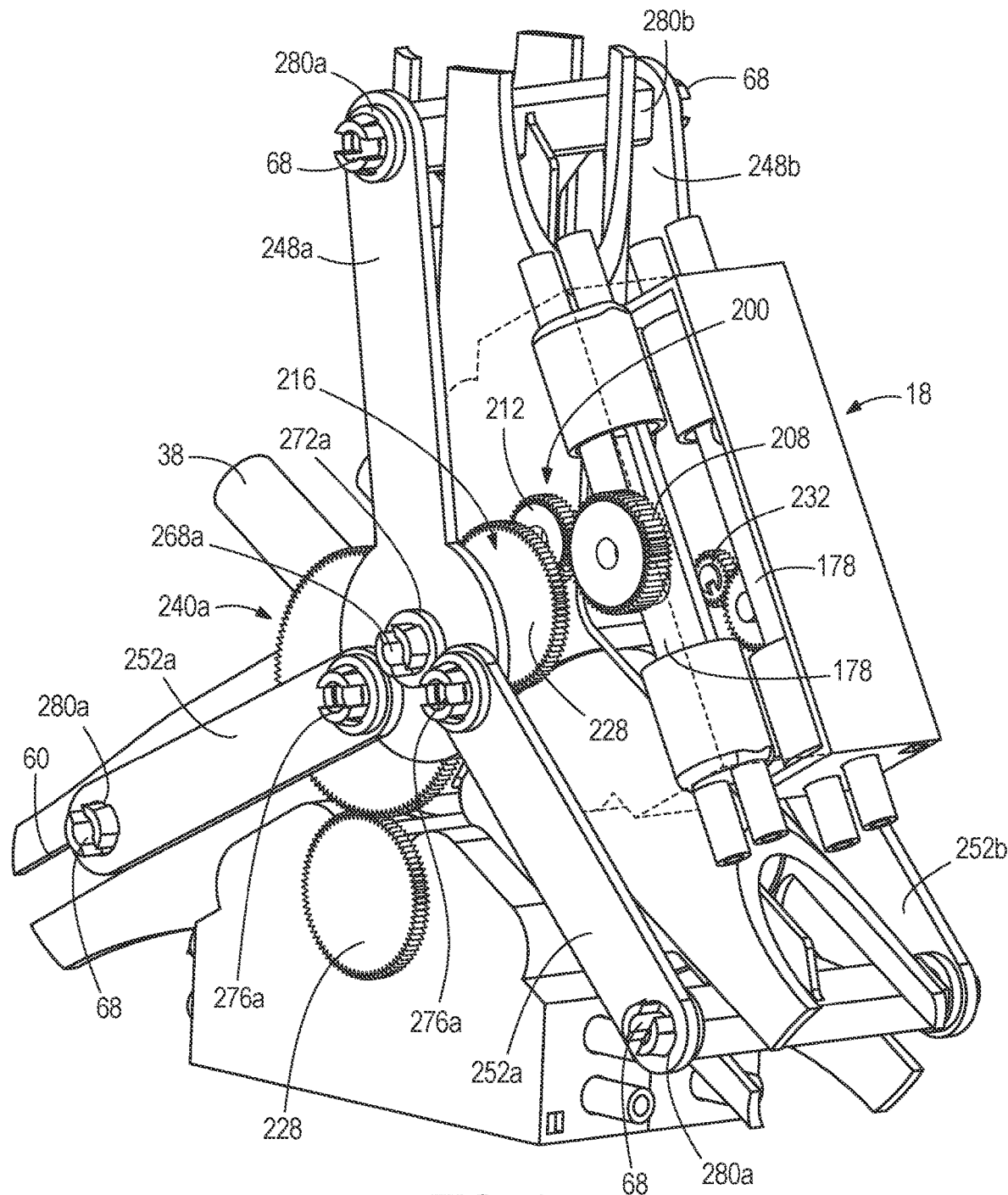
FIG. 15 is a perspective view of the dosing engine of FIG. 1 illustrating the drive mechanism, with portions of the drive mechanism and the chemical pump assembly transparent for the sake of clarity.

With reference to FIG. 13, the diluent piston 62 is defined by a body that has a piston head 66 and arms 68 that are connected to the piston head 66 by a neck portion 70. The piston head 66 is shaped consistent with the shape of the housing 46, and has a channel 72 that carries a seal 74. With reference to FIGS. 1-4, 6, 7 and 13, the arms 68 extend laterally outward from the body and extend through the slots 60 when the diluent piston 62 is positioned in the housing 46. As shown, the arms 68 include a fastener or attachment 76 (e.g., snap-protrusions) on the respective ends of the arms 68 that attach the diluent piston to the drive mechanism 19. The arms 68 may be coupled to the drive mechanism 19 in any suitable manner (e.g., by fasteners, pins, etc.) that facilitates reciprocation of the diluent piston 62 in the housing 46.

The housing 46, including the end wall 58, and the piston head 66 cooperate to define a diluent pump chamber 78 that is in fluid communication with the central chamber 44. More specifically, and with reference to FIG. 10, the diluent pump chamber 78 is in fluid communication with the intake chamber section 52 via a first aperture or pump chamber inlet 80. The diluent pump chamber 78 also is in fluid communication with the discharge chamber section 54 via a second aperture or pump chamber outlet 82. The seal 74 fluidly seals the diluent pump chamber 78 to prevent leakage of diluent from the diluent pump chamber 78 beyond the piston head 66.

Figure 16:
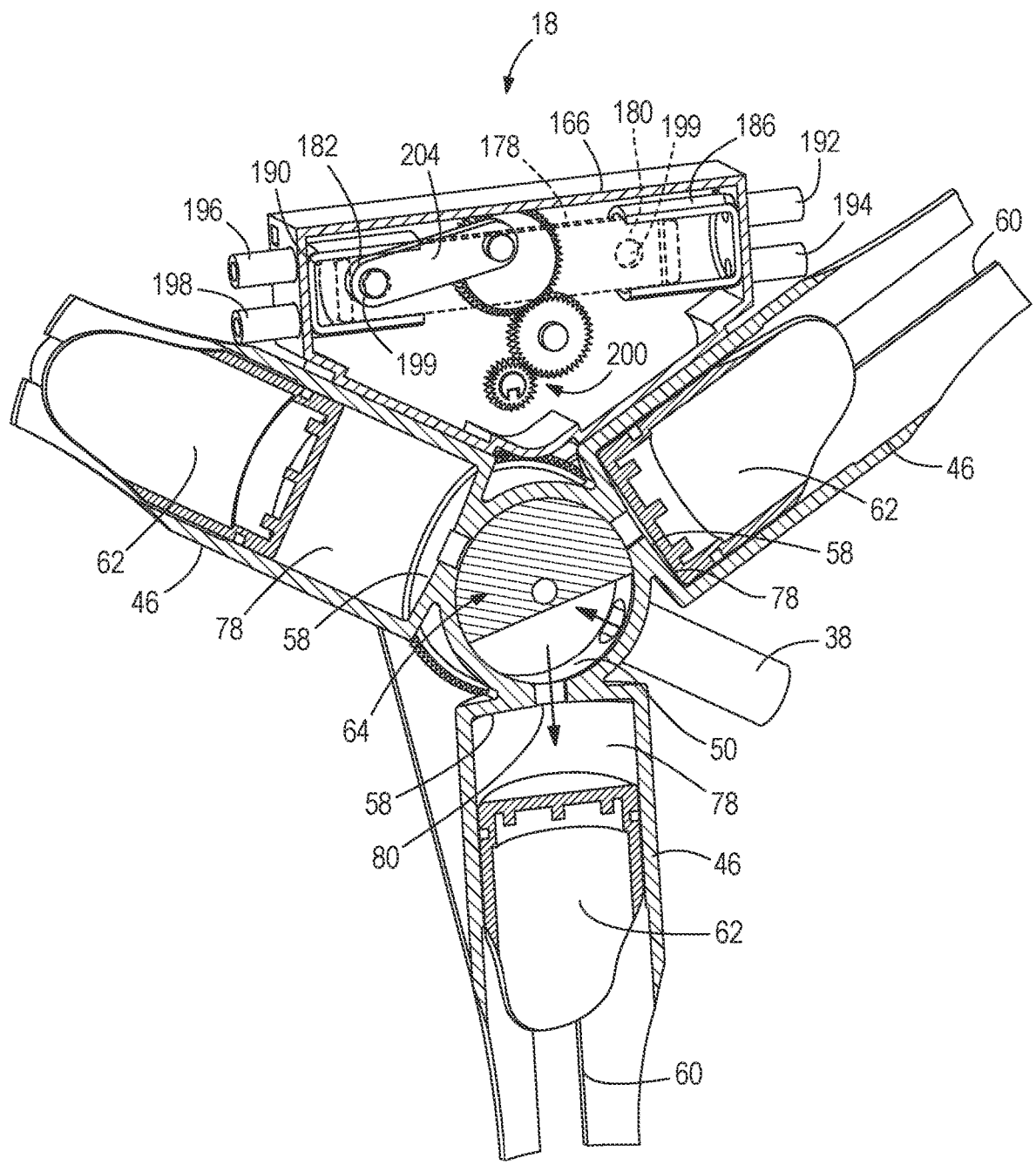
FIG. 16 is an exposed view of the rotary dosing system illustrating the dosing engine in a first state with a first diluent piston, a second diluent piston, and a third diluent piston in respective stroke positions.
Figure 17:
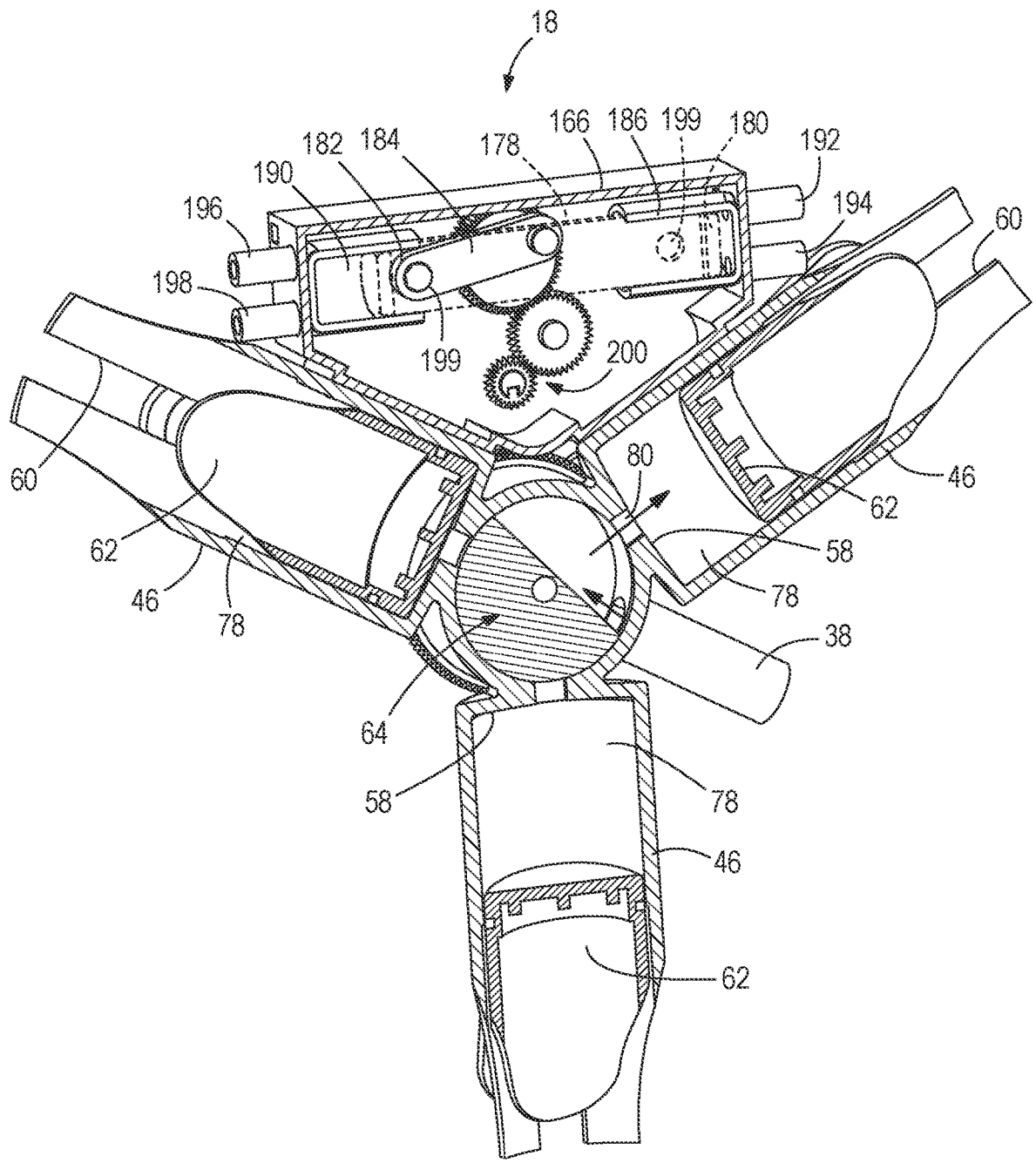
FIG. 17 is an exposed view of the rotary dosing system illustrating the dosing engine in a second state with the mechanism 64 pistons in different respective stroke positions relative to FIG. 16.
Figure 18:
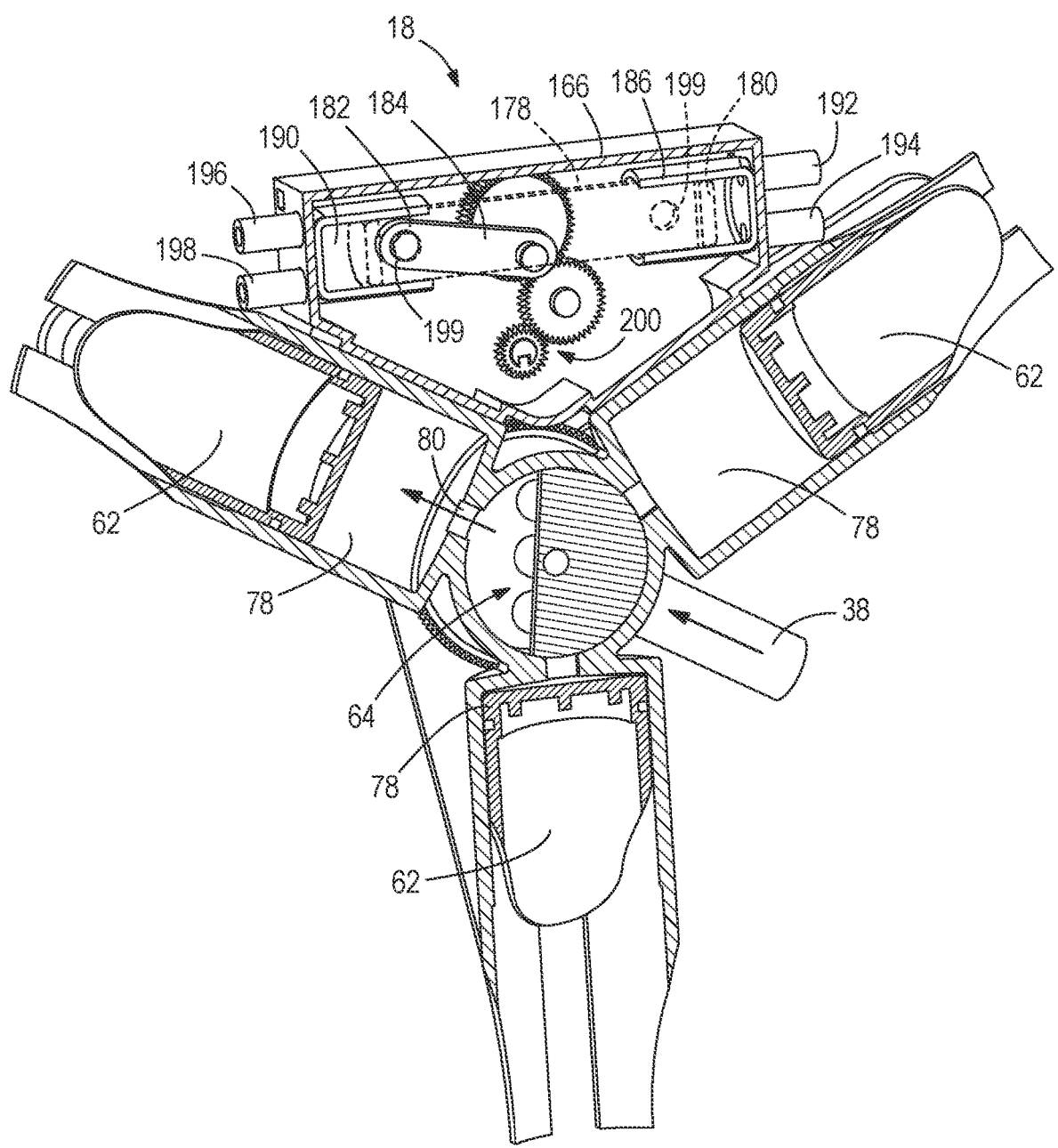
FIG. 18 an exposed view of the rotary dosing system illustrating the dosing engine in a third state with the mechanism 64 pistons in different respective stroke positions relative to FIGS. 16 and 17.

Each diluent piston 62 reciprocates within the corresponding housing 46 between a first or intake position (referred to herein as a "diluent intake position" for purposes of clarity) and a second or discharge position (referred to herein as a "diluent discharge position" for purposes of clarity). The diluent intake position corresponds to the state of the diluent piston 62 where diluent has been fully drawn into the diluent pump chamber 78 (e.g., a "bottom dead-center" position or priming position; see upper left piston-cylinder arrangement in FIG. 16). The diluent discharge position corresponds to the state of the diluent piston 62 where diluent has been fully discharged from the diluent pump chamber 78 (a "top dead-center" position or discharging position; see upper right piston-cylinder arrangement in FIG. 16). Movement of the diluent piston 62 from the diluent intake position to the diluent discharge position discharges diluent from the diluent pump chamber 78, and movement of the diluent piston 62 from the diluent discharge position to the diluent intake position draws diluent into the diluent pump chamber 78.

As shown in FIGS. 5-8, the illustrated valve mechanism 64 is disposed in the central chamber 44 and controls the flow of diluent between the inlet 38, the outlet 42, the central chamber 44, and each diluent pump chamber 78. With reference to FIGS. 6, 7, 11A-12C, the valve mechanism 64 is rotatable within the central chamber 44 about the axis A. The valve mechanism 64 includes a first or intake valve (e.g., first valve portion) 110a and a second or discharge valve (e.g., second valve portion) 110b. As illustrated, the intake valve 110a and the discharge valve 110b are the same, with the discharge valve 110b positioned in the central chamber 44 in an orientation that is 180° relative to the orientation of the intake valve 110a.

Because the intake valve 110a and the discharge valve 110b are the same, it should be understood that generic reference numerals will be used to identify the valve features, including the valves themselves (i.e. the generic reference numeral for each valve is '110'). Where there is a need to differentiate between the intake valve 110a and the discharge valve 110b, the features of the intake valve 110a will be referred to with reference numerals having the character 'a', and features of the discharge valve 110b will be referred to with reference numerals having the character 'b'. Also, while the illustrated embodiment includes distinct valves 110a, 110b that are coupled to each other, it should be appreciated that the valve assembly may be integrally formed as a monolithic element.

Figure 12A:
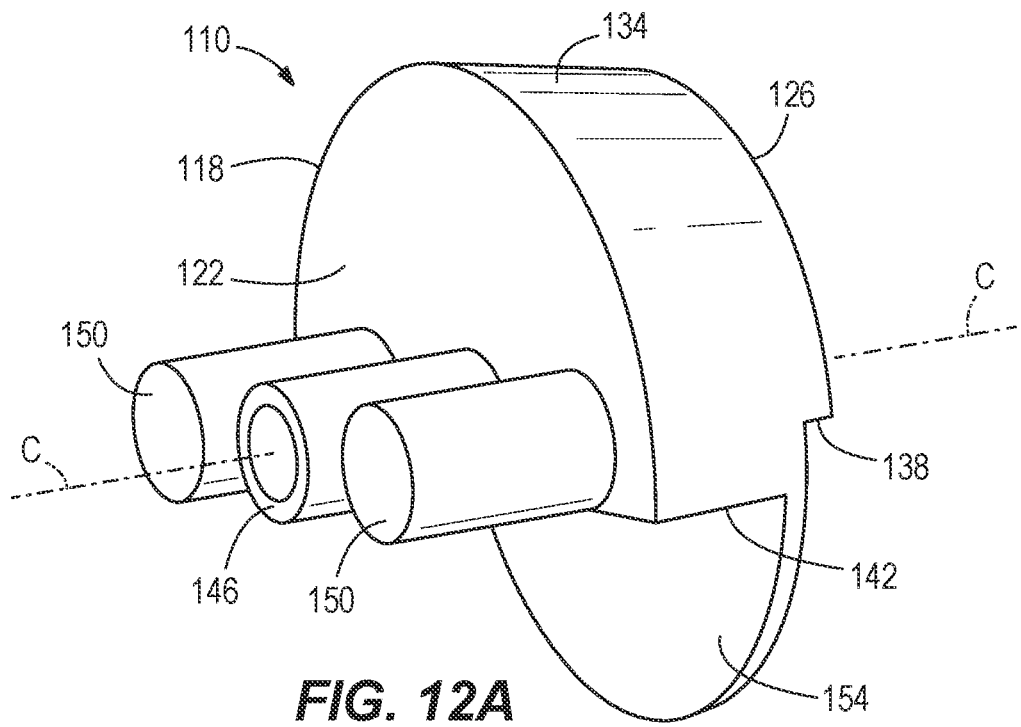
FIG. 12A is a perspective view of the first valve of FIG. 11.
Figure 12B:
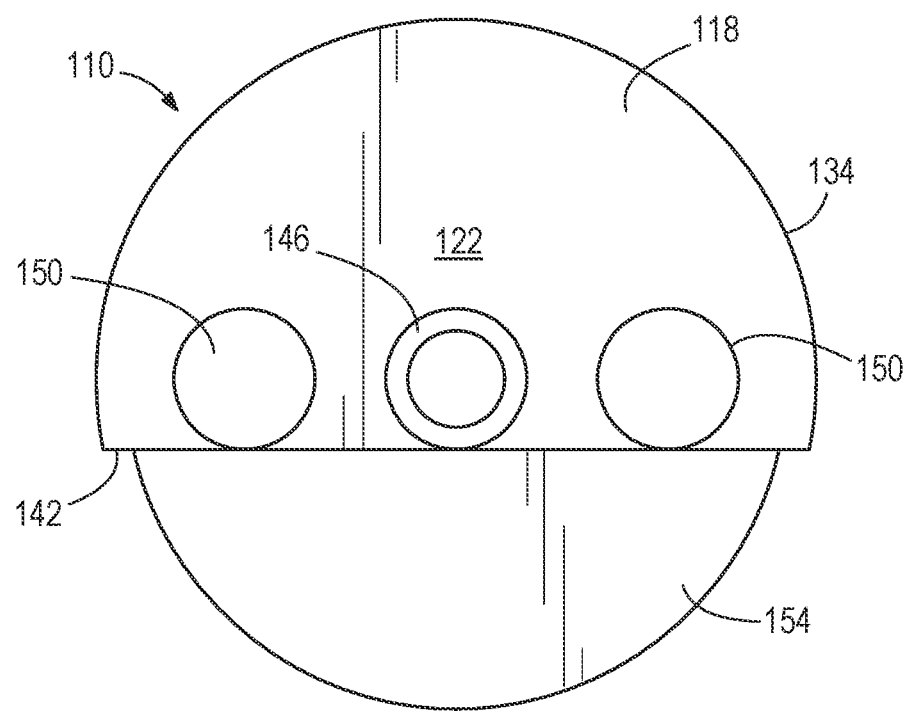
FIG. 12B is an elevation view of the first valve from the left side of FIG. 12A.
Figure 12C:
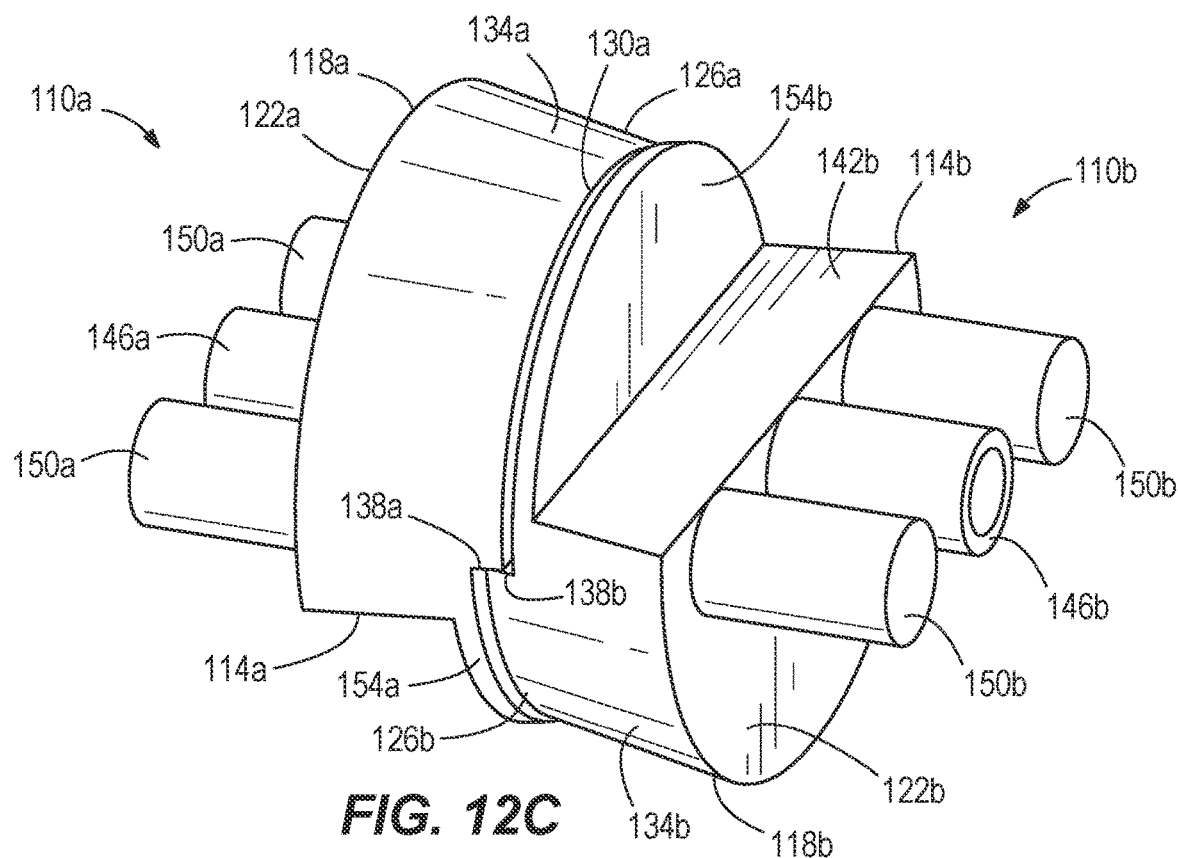
FIG. 12C is a perspective view of the valve assembly illustrating the first and second valves.
Figure 12D:
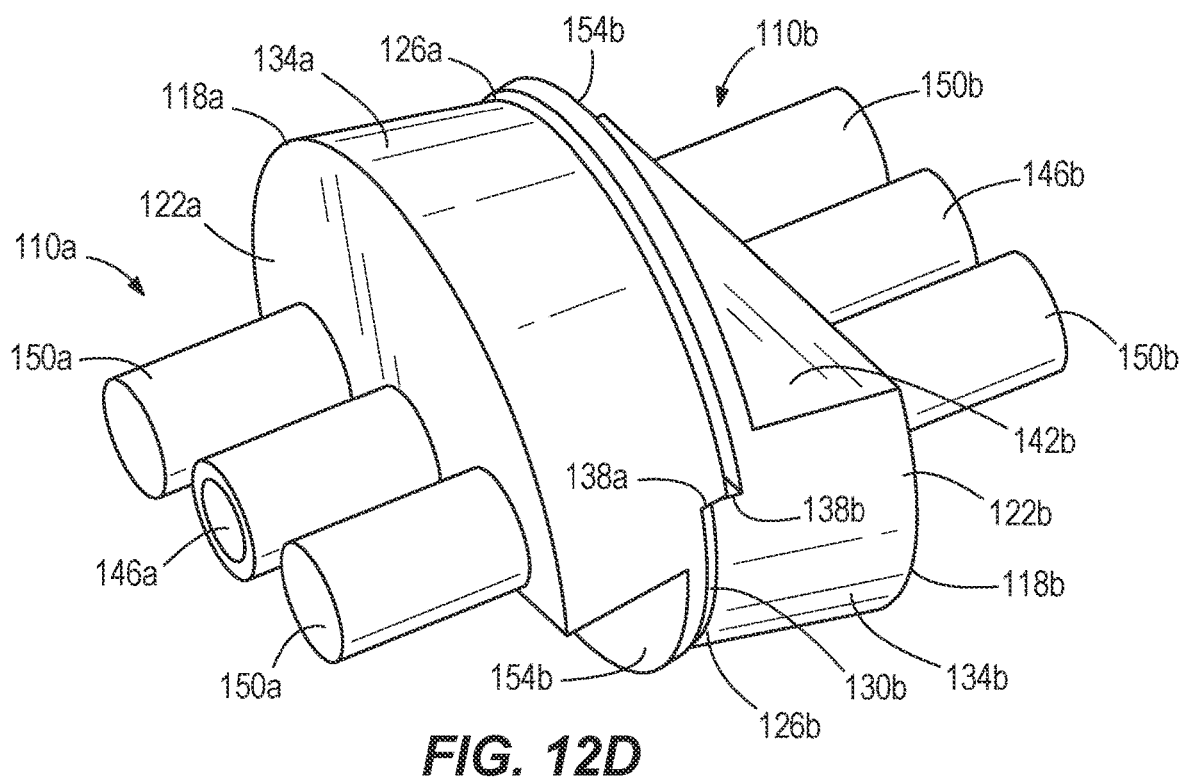
FIG. 12D is another perspective view of the valve assembly of FIG. 11.
Figure 12E:
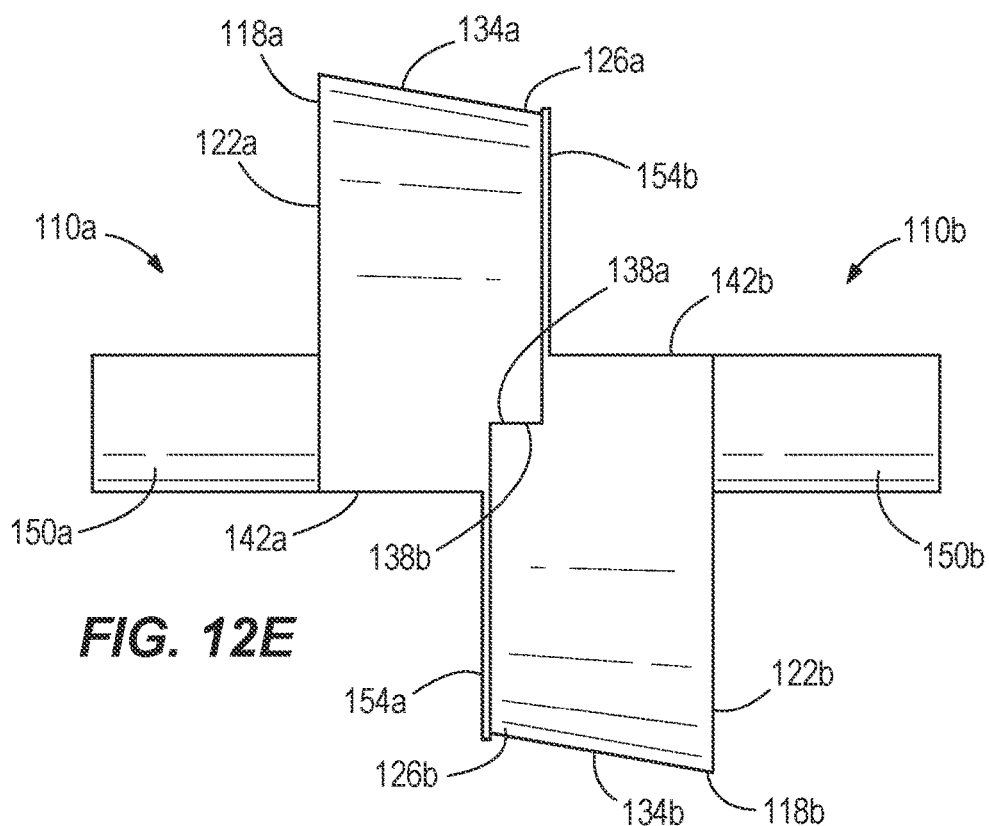
FIG. 12E is an elevation view of the valve assembly illustrating the first and second valves mated together.
Figure 12F:
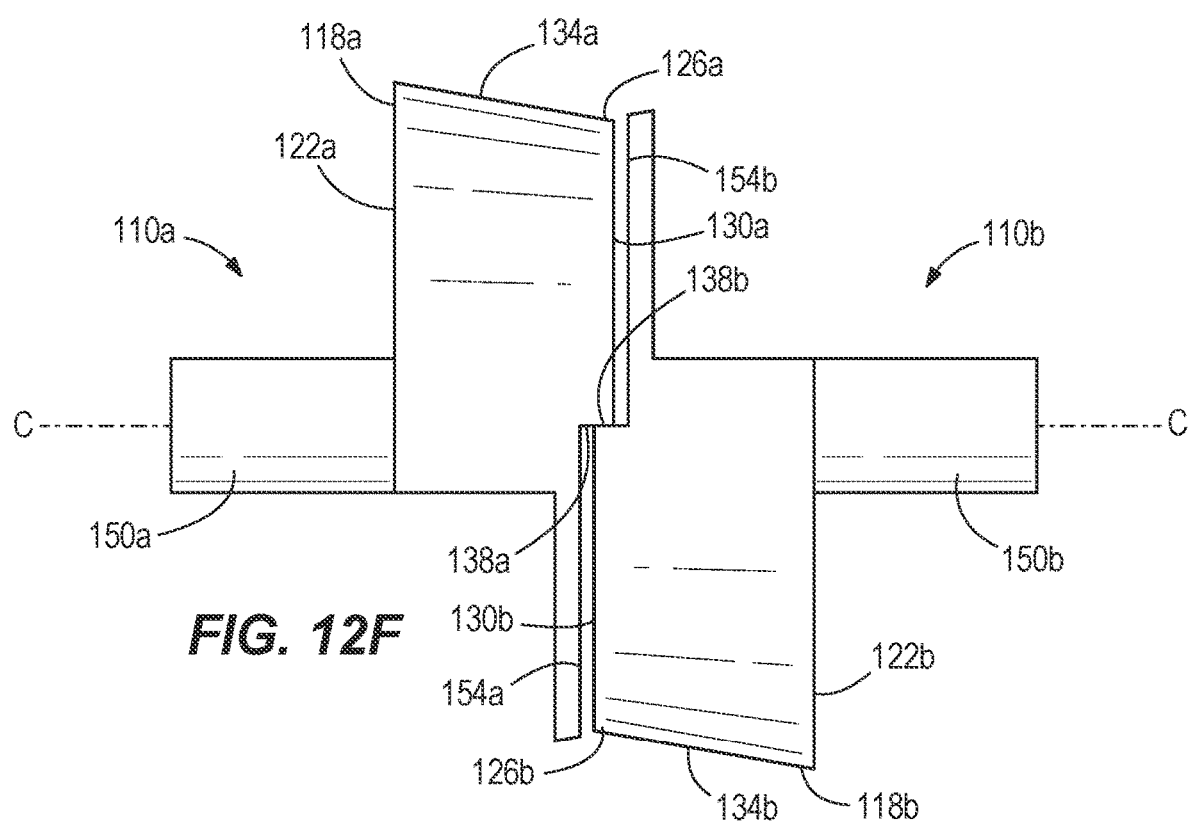
FIG. 12F is an elevation view of the valve assembly illustrating the first and second valves spaced apart from each other.

FIG. 12A-12F illustrate that the valve 110 has a body 114 with an axis of rotation C (the axis A and C are collinear when the valve 110 is positioned in the central chamber 44). The body 114 is defined by a circular segment in cross-section (see FIG. 12B), and extends along the axis of rotation C such that the body 114 has a truncated frusto-conical profile. Stated another way, the body 114 has a first side 118 that is defined by a first planar surface 122, a second side 126 that is defined by a second planar surface 130, and an outer surface 134 that extends and radially tapers between the first planar surface 122 and the second planar surface 130. A shelf 138 is defined on the second side 126 and extends through the axis of rotation C. The body 114 also has a chord surface 142 that extends between opposite edges of the outer surface 134. As shown in FIG. 12B, the outer surface 134 defines a circular arc that is larger than 180° from one edge of the outer surface 134 to the other edge of the outer surface 134.

Figure 11:
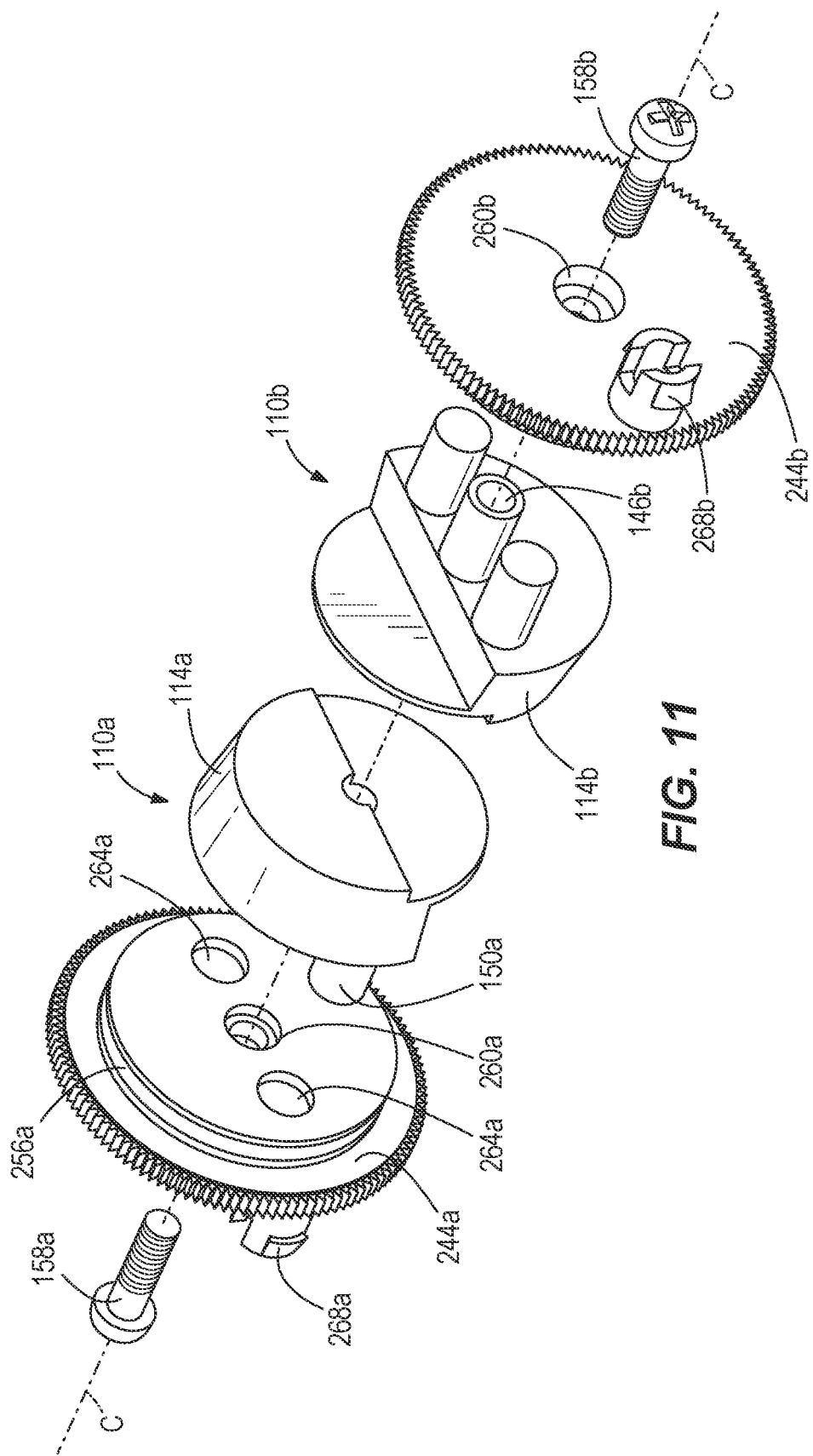
FIG. 11 is an exploded perspective view of the valve assembly including a first valve and a second valve, and a portion of the drive mechanism.

With continued reference to FIGS. 12A-12F, a fastener post 146 and alignment posts 150 extend linearly outward from the first side 118, and a flange 154 extends radially outward from the body 114 adjacent the second side 126. The fastener post 146 is positioned on the axis of rotation C, and the alignment posts 150 are diametrically opposite each other relative to the fastener post 146. The fastener post 146 is a hollow column that receives a fastener 158 (FIG. 11). In some embodiments, the fastener post 146 is threaded to receive the fastener 158. In other embodiments, springs or other devices can be used to secure the valves 10a, 110b to each other in the central chamber 44. The alignment posts 150 are shown as solid columns, although the alignment posts 150 can be hollow. The flange 154 has a circular segment profile when viewed from the side or in cross-section. The radius of curvature for the flange 154 is equal to the radius of curvature for the second side 126.

When the intake valve 110a and the discharge valve 110b are fully positioned in the central chamber 44 (i.e. the intake valve 110a is positioned in the intake chamber section 52 and the discharge valve is positioned in the discharge chamber section 54), the second side 126a mates with the second side 126b such that the shelves 138a, 138b are engaged with each other. As explained in detail below, engagement of the shelves 138a, 138b permit coordinated rotation of the valves 110a, 110b. The outer surfaces 134a, 134b are complementary to and engage or mate with the tapered portions of the intake chamber section 52 and the discharge chamber section 54, respectively. Also, the radial extents of the flanges 154a, 154b are aligned with and engage opposite sides of the ridge 56.

Figure 6:
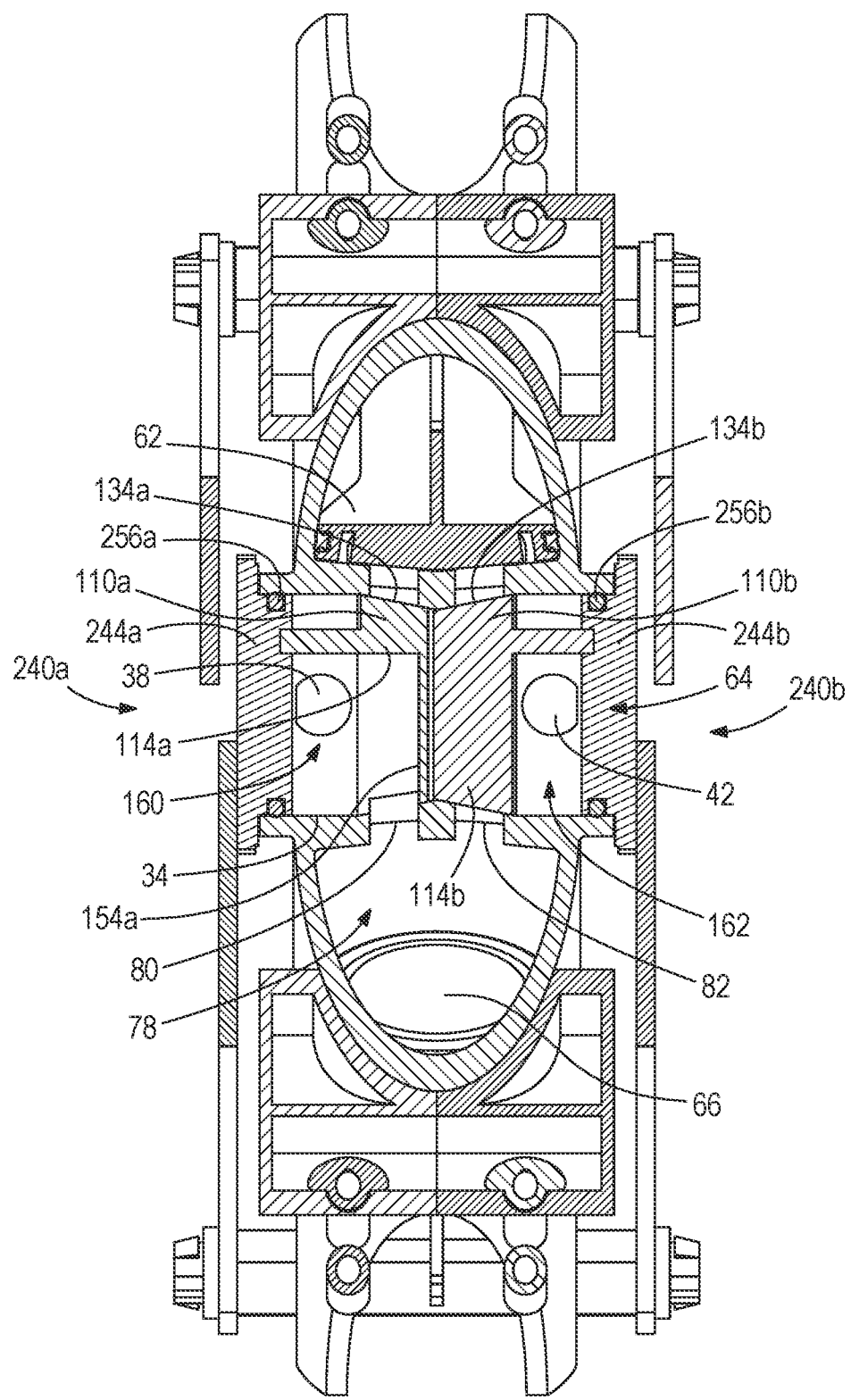
FIG. 6 is a cross-section view of the mechanism 64 pump taken along line 6-6 of FIG. 3A.

With reference to FIGS. 6 and 7, the wall 50 and the intake valve 110a cooperate to define an intake chamber 160 that selectively fluidly couples to the inlet 38 and the diluent pump chambers 78 depending on the rotational position of the valve mechanism 64. The wall 50 and the discharge valve 110b cooperate to define a discharge chamber 162 that selectively fluidly couples to the outlet 42 and the diluent pump chambers 78 depending on the rotational position of the valve mechanism 64. The complementary mating between the valves 110a, 110b and the wall 50 seal the respective chambers 160, 162 from each other.

With reference to FIGS. 1-5, the chemical pump assemblies 18 (sometimes referred to as chemical drivers) are coupled to the framework 34 between the housings 46 (e.g., snapped onto the framework 34, or attached by an adhesive or other fasteners or fastener combinations, engaged by one or more hinges, etc.). As shown, the dosing engine 10 has four chemical pump assemblies 18, although fewer or more than four chemical pump assemblies 18 may be included on the dosing engine 10.

The chemical pump assemblies 18 are arranged in pairs that are attached at each of two locations on the framework 34. As illustrated in FIGS. 3A-5, the pairs of chemical pump assemblies 18 share a pump housing 166 (e.g., a two-piece shell). It should be appreciated that each chemical pump assembly may have its own pump housing. Each chemical pump assembly 18 includes a chemical pump 174 that, as illustrated, takes the form of a piston pump. The chemical pump 174 can take other forms, such a lobe pump, an internal gear pump, or another type of pump that can deliver a chemical concentrate to the mix chamber 16.

With reference to FIGS. 2, 5, and 14A-18, each chemical pump assembly 18 includes a chemical piston 178 that is defined by a first piston head 180 on one end and a second piston head 182 on the opposite end, and a piston rod 184 that interconnects the first and second piston heads 180, 182. The chemical pump assembly 18 also includes a first sleeve 185 that defines a first chemical pump chamber 186 and that houses the first piston head 180, and a second sleeve 188 that defines a second chemical pump chamber 190 and that houses the second piston head 182. The first chemical pump chamber 186 is fluidly connected to a first chemical inlet 192 and a first chemical outlet 194, and the second chemical pump chamber 190 is fluidly connected to a second chemical inlet 196 and a second chemical outlet 198. The inlets 192, 196 and the outlets 194, 198 extend through the pump housing 166. The dual inlets 192, 196 and the dual outlets 194, 198, along with the piston heads 180, 182 and the corresponding chambers 186, 190, cooperate to define a reciprocating, dual-action piston pump that dispenses chemical based on motion of the piston in each direction. Each piston head 180, 182 carries a seal to prevent leakage of chemical concentrate behind the respective piston heads 180, 182. In some embodiments, one or more of the The piston rod 184 includes a hole 199 that connects the chemical piston 178 to a chemical drive assembly 200 to enable reciprocal movement of the chemical piston 178 such that each piston head 180, 182 moves a between a first or intake position (referred to herein as a "chemical intake position" for purposes of clarity) and a second or discharge position (referred to herein as a "chemical discharge position" for purposes of clarity). The chemical intake position corresponds to the state of the piston head 180 or the piston head 182 where chemical concentrate has been fully drawn into the chemical pump chamber 186, 190 associated with the piston head that is in the chemical intake position (e.g., the piston head 180 is in the chemical intake position in FIG. 15). The chemical discharge position corresponds to the state of the piston head 180 or the piston head 182 where chemical concentrate has been fully discharged from the chemical pump chamber 186, 190 associated with the piston head that is in the chemical discharge position.

Movement of the piston head 180 or the piston head 182 from the chemical intake position to the chemical discharge position discharges chemical concentrate from the associated chemical pump chamber 186, 190, and movement of the chemical piston head 180 or the chemical piston head 182 from the chemical discharge position to the chemical intake position draws chemical concentrate into the associated chemical pump chamber 186, 190. It will be appreciated that when one piston head is in the chemical intake position, the other piston head is in the chemical discharge position, and that each piston head 180, 182 will be in complementary positions when the chemical piston 178 is reciprocated. As illustrated, the piston rod 184 has two holes 199, one of which is connected to the chemical drive assembly 200. In some embodiments, one or more of the chemical pump assemblies 18 may be selectively engaged or disengaged relative to the drive mechanism 19 (e.g., by disconnecting part of the drive assembly 200 between the drive mechanism 19 and the chemical pump assembly 18).

The chemical drive assembly 200 is the same for each chemical pump assembly 18. With reference to FIGS. 14A-14E, the chemical drive assembly 200 includes a connecting rod 204, a crank gear 208, a chemical driven gear 212, and a drive gear mechanism 216. The connecting rod 204 has a protrusion 220 to pin the connecting rod 204 to the piston rod 184, and a hole 224 on the opposite end of the connecting rod 204 that receives a pin 224 and the crank gear 208. The crank gear 208 is meshed with the driven gear 212 (e.g., via teeth on each of the crank gear 208 and the driven gear 212). The driven gear 212 is pinned to a sidewall of the pump housing 166, and is meshed (e.g., via teeth) with the drive gear mechanism 216. The drive gear mechanism 216 includes a drive gear 228 and a transfer gear 232. The drive gear 228 has a shaft 236 that extends through the sidewall of the housing 166, and the transfer gear 232 is keyed to the shaft 236. As illustrated, the transfer gear 232 has teeth that mesh with the driven gear 212. It will be appreciated that the gears may be operatively connected or meshed with each other in ways other than via teeth. Also, the gears 208, 212, 228, 232 are sized relative to each other (i.e. the gears 208, 212, 228, 232 have respective gear ratios) to drive the chemical piston heads 180, 182 between the chemical intake positions and the chemical discharge positions. Furthermore, as explained in more detail below, the gear ratios are selected to work in tandem or cooperation with the drive mechanism 19 so that diluent and chemical concentrate reach the mix chamber 16 at the same time and in the desired proportions.

The chemical drive assemblies 200 are operatively coupled to the drive mechanism 19 so that one or more of the chemical pumps 174 deliver a predetermined amount of chemical concentrate to the mix chamber 16 in sequence with delivery of a predetermined amount of diluent from the diluent pump 17. With reference to FIGS. 1, 2, and 6-8, the drive mechanism 19 has parallel drive assemblies 240a, 240b that are positioned on opposite, lateral sides of the framework 34 and that cooperate to drive the diluent pump 17 and the chemical pump assemblies 18. The drive assemblies 240a, b are the same, and features of each drive assembly 240a, 240b will be annotated with the character 'a' and 'b', respectively for ease in understanding the system.

With reference to FIGS. 1-4, 14B, 14C, 15 and 19, the drive assemblies 240a, 240b respectively include a valve crank gear 244a, 244b, a primary crank arm 248a, 248b, and secondary crank arms 252a, 252b. FIGS. 6-8 and 11 show that valve crank gear 244a has a body that carries a seal 256a, and a central aperture 260a through which the fastener 158a extends to secure the valve crank gear 244a to the intake valve 110a via the fastener post 146a. The valve crank gear 244a also has alignment recesses or pockets 264a diametrically opposite each other that align and mate with the alignment posts 150a to secure the valve crank gear 244a to the intake valve 110a in a rotationally fixed manner. Similarly, the valve crank gear 244b has a body that carries a seal 256b, and a central aperture 260b through which the fastener 158b extends to secure the valve crank gear 244b to the discharge valve 110b via the fastener post 146b. The valve crank gear 244b also has alignment recesses or pockets 264b diametrically opposite each other that align and mate with the alignment posts 150b to secure the valve crank gear 244b to the discharge valve 110b in a rotationally fixed manner. It should be understood that 'rotationally fixed' means that the dependent or complementary rotation of the intake valve 110a and the discharge valve 110b transfers to the valve crank gears 244a, 244b that are attached to the lateral or outer extents of the valve mechanism 64. In other words, the valve crank gears 244a, 244b rotate with the valve mechanism 64.

Each valve crank gear 244a, 244b also includes a pin 268a, 268b that extends outward from the valve crank gear 244a, 244b opposite the side of the valve crank gear 244a, 244b that is connected to the valve mechanism 64. The pin 268a, 268b is located on adjacent the perimeter of the valve crank gear 244a, 244b (i.e. at a radial extent of the crank valve gear 244a, 244b). The primary crank arm 248a, 248b has a central hole 272a, 272b that attaches to the pin 268a, 268b so that rotation of the valve crank gear 244a, 244b transfers to movement of the primary crank arm 248a, 248b about the axis A. As illustrated, the primary crank arm 248a, 248b is snapped onto the pin 268a, 268b, although other connections are considered herein.

FIGS. 1, 2, 3A, 4, each primary crank arm 248a, 248b includes a plurality of crank pins 276a, 276b that are positioned adjacent a perimeter of the primary crank arm 248a, 248b (i.e. positioned at a radial extent on the crank arm 248a, 248b). As illustrated, each primary crank arm 248a, 248b has two crank pins 276a, 276b that are spaced apart from each other at a 120° angle having a center on the central hole 272a, 272b. In some embodiments, each primary crank arm 248a, 248b may have fewer or more than two crank pins 276a, 276b (generally corresponding to the quantity of secondary crank arms 252a, 252b included in the drive mechanism 19).

Each of the primary crank arms 248a, 248b and the secondary crank arms 252a, 252b are defined by elongated rods with distal ends that have piston arm holes 280a, 280b. The piston arm holes 280a, 280b connect the crank arms 248a, 248b, 252a, 252b to the respective arms 68 on the diluent pistons 62 (e.g., the crank arms 248a, 248b, 252a, 252b snap onto the arms 68). As illustrated, the primary crank arms 248a, 248b connect to the same diluent piston 62 on the opposite arms 68 of that piston 62. In addition, the secondary crank arm pairs (i.e. the secondary crank arms 252a, 252b that are parallel to each other) connect to the same diluent pistons 62 in the same manner.

The pinned connection of the primary crank arms 248a, 248b to the valve crank gear 244a, 244b, and the pinned connections of the secondary crank arms 252a, 252b to the primary crank arm 248a, 248b define slider crank mechanisms or similar mechanical linkages that transfer linear or reciprocal movement of the diluent pistons 62 within the housings 46 to rotation of the valve mechanism 64. The connections of the secondary crank arms 252a, 252b to the primary crank arms 248a, 248b define a diluent pump 17 with pump chambers 78 that are phased or out-of-sync with each other. For example, the Figures show that the dosing engine 10 has three diluent pump chambers 78 and three parallel crank arm pairs. This means that the diluent pistons 62 are $\frac{1}{3}^{rd}$ out-of-phase or out-of-sync such that, when one piston 62 is in the diluent intake position, another piston 62 will be in the diluent discharge position, and the third piston 62 will be in a position between the diluent intake position and the diluent discharge position. It will be appreciated that the dosing engine 10 may include more than three diluent pistons 62 in respective housings 46, and the sequencing or out-of-phase relationship of the diluent pistons 62 will be driven by the quantity of diluent pistons 62. Also, while the drive mechanism 19 and the chemical drive assembly 200 are described separately, it will be apparent from the exemplary dosing system described relative to FIGS. 1-19 that the drive mechanism 19 inherently drives the chemical pumps 174. As such, the chemical drive assembly 200 can be subsumed in or part of the drive mechanism 19 in some embodiments.

To assemble the dosing engine 10, the intake valve 110a is inserted into the intake chamber section 52 and discharge valve 110b is inserted into the discharge intake section 54 so that the second sides 126a, 126b, as well as the shelves 138a, 138b, are oriented to engage and mate with each other. Next, the valve crank gear 244a (with the seal 256a) is positioned on the intake side of the valve mechanism 64 and is attached to the intake valve 110a by aligning the alignment pockets 264a with the alignment posts 150a and securing the valve crank gear 244a to the intake valve 110a via the fastener 158a. The valve crank gear 244b (with the seal 256b) is positioned on the discharge side of the valve mechanism 64 and is attached to the discharge valve 110b by aligning the alignment pockets 264b with the alignment posts 150b and securing the valve crank gear 244b to the discharge valve 110b via the fastener 158b. The pistons 62 are positioned in the framework 34 so that the arms 68 are disposed in the slots 60. The primary crank arms 248a, 248b are attached to (e.g., snapped onto) the respective valve crank gears 244a, 244b and onto the arms 68 of one of the pistons 62. The secondary crank arms 252a, 252b are then attached to (e.g., snapped onto) the primary crank arms 248a, 248b and to the arms 68 of the remaining pistons 62.

Each chemical pump assembly 18 is assembled by inserting the chemical piston 178 into the housing 166 so that the piston heads 180, 182 are disposed in the respective sleeves 185, 188. The connecting rod 204 is attached to the piston rod 184, and then to the crank gear 208 that is attached to the sidewall of the housing 166. The driven gear 212 is attached to the post on the sidewall of the housing 166 and is meshed with the crank gear 208. The shaft 236 of the drive gear 228 is inserted through the housing 166, and the transfer gear 232 is keyed to the shaft 236 and meshed with the driven gear 212. Each chemical pump assembly 18 is attached to the framework 34 so that the drive gear 228 meshes with the corresponding valve crank gear 244a, 244b.

In general, the order of assembly for the components of the dosing engine 10 can vary, with the main exception being that the valve mechanism 64 must be installed in the central chamber 44 before the drive mechanism 19 is assembled.

In operation, and with reference to the Figures (and particularly FIGS. 16-18), the dosing engine 10 self-primes the pistons 62 when water flows through the inlet 38 and the intake valve 110a, and into at least one of the pump chambers 78. Stated another way, diluent entering the system defines the motive force for the dosing engine 10 and drives movement of the pistons 62, which in turn rotates the valve mechanism 64 and drives the chemical pump assemblies 18. A pressure differential that is generated between the inlet 38 and the outlet 42 cause the pistons 62 to reciprocate within the housings 46, which in turn rotate the valve mechanism 64. When a piston 62 moves toward the diluent intake position (see FIG. 16, upper left piston 62), the piston head 66 draws diluent into the diluent pump chamber 78. When the piston 62 is in the diluent intake position, the volume of the diluent pump chamber 78 defines the amount of diluent to be dispensed to the mix chamber 16 via subsequent movement of the piston toward (and to) the diluent discharge position. Movement toward the diluent discharge position dispenses (i.e. pushes) diluent through the pump chamber outlet 82, into the discharge chamber 162, and through the outlet 42 for mixing with chemical concentrate in the mix chamber 16.

Incorporation of three or more pistons 62 in the dosing engine 10 means that the valve mechanism 64 is never at a 'dead' or inoperable state. The valve mechanism 64 rotates within the central chamber 44 to selectively permit and selectively prevent fluid communication between the diluent pump chambers 78 and the intake chamber 160 and the discharge chamber 162. The intake valve 110a and the discharge valve 110b are 180° out-of-phase such that only the pump chamber inlet 80 or the pump chamber outlet 82, and not both, is in fluid communication with the intake chamber 160 or the discharge chamber 162. Stated another way, the valve bodies 114a, 114b sequentially blocks or unblocks flow of diluent through the inlet 80 and the outlet 82.

More specifically, when the piston 62 moves toward the diluent intake position, the intake valve 110a is in a rotational position in which the body 114a permits flow of diluent from the intake chamber 160 through the pump chamber inlet 80 into the diluent pump chamber 78 associated with the piston 62 because the outer surface 134a is not engaged with the section of the wall 50 in the area of the pump chamber inlet 80. At the same time, the discharge valve is in a rotational position in which the body 114b blocks flow of fluid from the diluent pump chamber 78 through the pump chamber outlet 82 via engagement of the outer surface 134b with the wall 50 in the area of the outlet 82. When the piston 62 moves toward the diluent discharge position, the intake valve 110a is in a rotational position in which the body 114a blocks flow of fluid from the intake chamber 160 through the pump chamber outlet 82 associated with the piston 62 because the outer surface 134a is engaged with the wall 50 in the area of the pump chamber outlet 82. At the same time, the discharge valve 110b is in a rotational position in which the body 114b does not block the pump chamber outlet 82, so diluent flows into the discharge chamber 162 as the piston 62 moves toward the diluent discharge position.

Figure 43A:
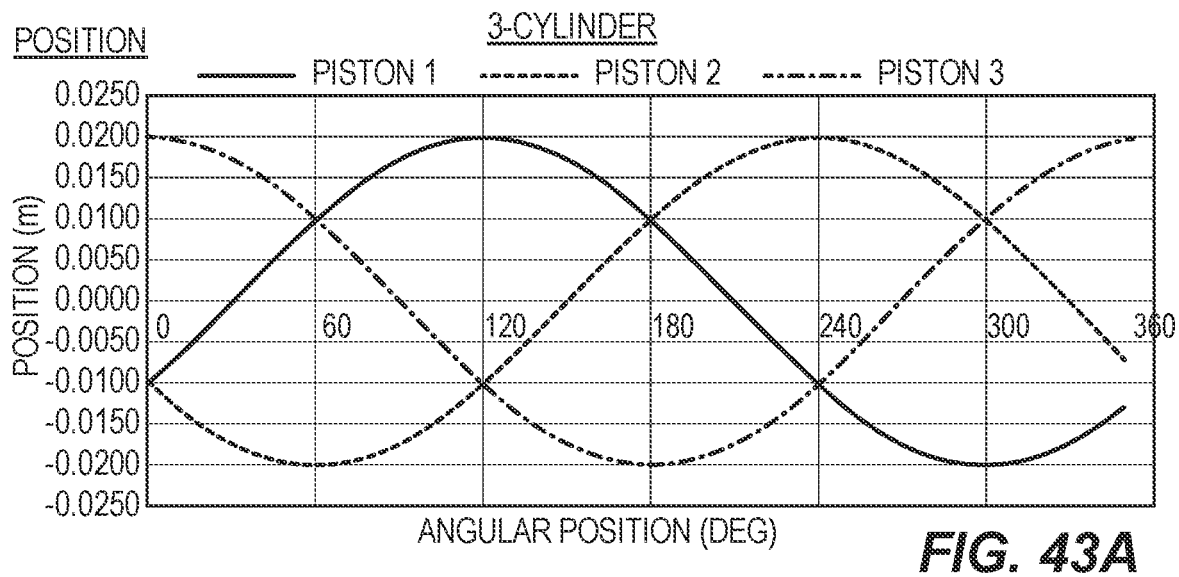
FIG. 43A illustrates piston position relative to the angular position of pistons in a three-piston dosing engine consistent with what is shown in FIG. 1.
Figure 43B:
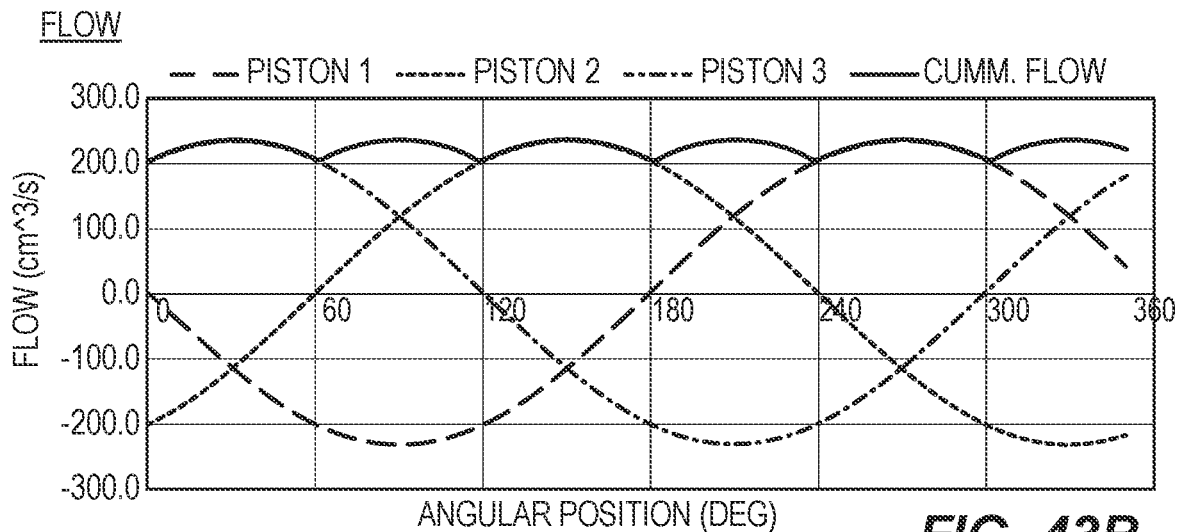
FIG. 43B illustrates fluid flow rate relative to the angular position of pistons in a three-piston dosing engine consistent with what is shown in FIG. 1.
Figure 43C:
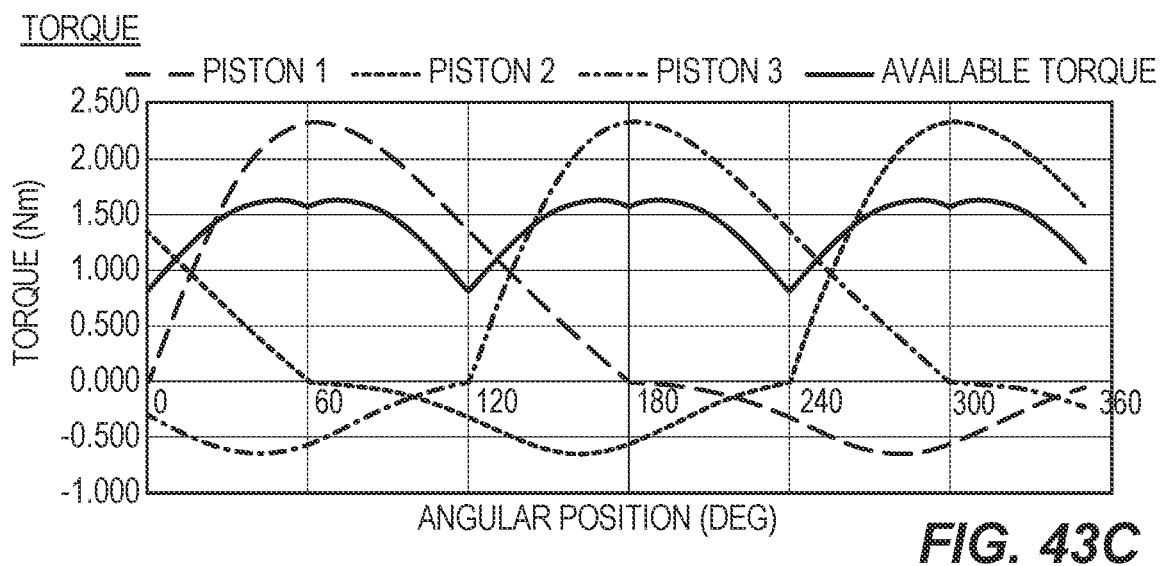
FIG. 43C illustrates piston torque relative to the angular position of pistons in a three-piston dosing engine consistent with what is shown in FIG. 1.

The drive mechanism 19 sequences the linear or reciprocal movement of the diluent pistons 62 so that diluent is constantly being taken into at least one pump chamber 78 and being dispensed from another pump chamber 78. The drive assemblies 240a, 240b move with the valve mechanism 64 to drive the pistons 62 to and between the intake and discharge positions as described above. FIG. 43A illustrates the relative positions of a three-piston system consistent with what is described relative to FIGS. 1-19, and shows that at no point is the system in a 'dead'-state where fluid is not entering or leaving the system. FIG. 43B illustrates the flow associated with the angular positions of the pistons. FIG. 43C illustrates the torque associated with each piston relative to the position of the piston.

The drive assemblies 240a, 240b also sequentially drive the chemical pumps 174 via the operative connection to the chemical drive assemblies 200 to draw in a desired or predetermined amount of chemical concentrate from the chemical reservoir(s) 14 and to dispense the chemical concentrate through the chemical outlets 196, 198 to the mix chamber 16. Rotation of the valve crank gears 244a, 244b drives gear mechanism 216a, 216b, which in turn transfers rotation to the crank gear 208. Rotation of the crank gear 208 transfers to the connecting rod 204, which reciprocates the chemical pistons 178.

Due to plural inlets 192, 194 and plural outlets 196, 198, and the corresponding pump chambers 186, 190 on opposite sides of each chemical pump 174, chemical concentrate can be dispensed on each half stroke of the chemical piston 178. It will be appreciated that check valves or other suitable components are in communication with the inlets 192, 194 and the outlets 196, 198 to prevent back-flow of chemical concentrate. Because the connecting rods 204 for each chemical pump pair is attached to opposite piston heads 180, 182 (i.e. the connecting rod for one of the chemical pumps 174 in the pair is connected to the piston head 180 and the connecting rod for the other chemical pump 174 in the pair is connected to the piston head 182), reciprocation of the chemical pistons 178 is out of phase with one another. Accordingly, when the first piston 178 is in the chemical intake position, the second piston 178 is in the chemical discharge position, and vice versa. Accordingly, chemical concentrate is constantly being moved into and out of the chemical pump assemblies 18. This increases the capacity of the system because as one of the pump chambers 186, 190 loads with chemical concentrate, the other of the pump chambers 190, 186 unloads or dispenses chemical concentrate.

Each chemical pump 174 is connected to a source of chemical concentrate (e.g., the chemical reservoirs 14). In some embodiments, two or more of the chemical pumps 174 can be fluidly coupled to the same chemical concentrate (e.g., to dispense larger quantities of chemical concentrate to the mix chamber 16). Likewise, each chemical pump 174 can be fluidly coupled to different chemical concentrates (e.g., to increase the number of chemical selections available for mixing). In the context of a dosing engine 10 that has chemical pumps 174 connected to different sources of chemical concentrate, the chemical pump assembly (or assemblies) 18 associated with the desired or selected chemical concentrate are operatively engaged by the drive mechanism 19 and the associated chemical drive assembly 200. The remaining chemical pump assembly(ies) 18 are disengaged from the drive mechanism 19 and/or the chemical drive assembly 200 so that a different chemical concentrate is not also dispensed to the mix chamber 16 at the same time as the desired chemical concentrate. In circumstances where it is desired for multiple chemical concentrates to be mixed with diluent in the mix chamber 16, the chemical pump assemblies 18 associated with the different chemical concentrates can be engaged at the same time.

Accordingly, during operation of the dosing engine 10, diluent and chemical concentrate can be constantly pumped to the mix chamber 16 in volumetric proportions that correspond to the desired concentration of the dilution formed in the mix chamber 16. The system is closed, so there is no or minimized exposure to air. This means there are very few scaling problems. In addition, the dosing engine 10 works well at low pressure (e.g., less than 7 psi) so that the desired dilution ratio of diluent and chemical concentrate can be achieved—in a proportional manner—under any load condition. Concerns about 'dirty' lines in the system are eliminated due to the separate dispensing outlets for diluent and chemical concentrate. The dosing engine 10 is water-driven, so power produced by the engine 10 may be drawn off to power the engine 10 itself, and/or other features (e.g., 'smart' or Internet-enabled features). Although the system has been described and illustrated with three housings 46 and corresponding pistons 62, it will be appreciated that additional housings 46 and pistons 62 (e.g., five housings 46 and pistons 62, ten housings 46 and pistons 62, etc.) may make actuation of the dosing engine 10 smoother.

In the illustrated embodiment, there are two chemical pump assemblies 18 that are coupled to and in fluid communication with chemical reservoirs 14 containing different chemicals. In the illustrated embodiment, only one of the chemical pump assemblies 18 is active at a time, but in additional or alternative embodiments, two or more chemical pump assemblies 18 may be active at the same time.

As a result of the interaction among the fluid pump 17, the chemical pump assemblies 18, and the drive mechanism 19, the rotary dosing engine 10 allows diluent fluid and chemical to be simultaneously and continuously pumped from the respective sources to the mix chamber 16. Measurement of the diluent fluid and the chemical flow rates can be easily determined by monitoring the turns of the valve assembly as well, either mechanically (e.g., with a tachometer or odometer/counter) or electrically (e.g., with a hall probe).

FIGS. 20-44C illustrate another exemplary dosing system that includes a dosing engine 300 (e.g., a rotary dosing engine or rotary dispenser) that can be coupled to a diluent source. As illustrated, the dosing engine 300 has a five-cylinder arrangement. It will be appreciated that some or all of the features of the dosing engine 10 can be included in or combinable with the dosing engine 300 (e.g., chemical pump assemblies, chemical drive assemblies, etc.).

Figure 20:
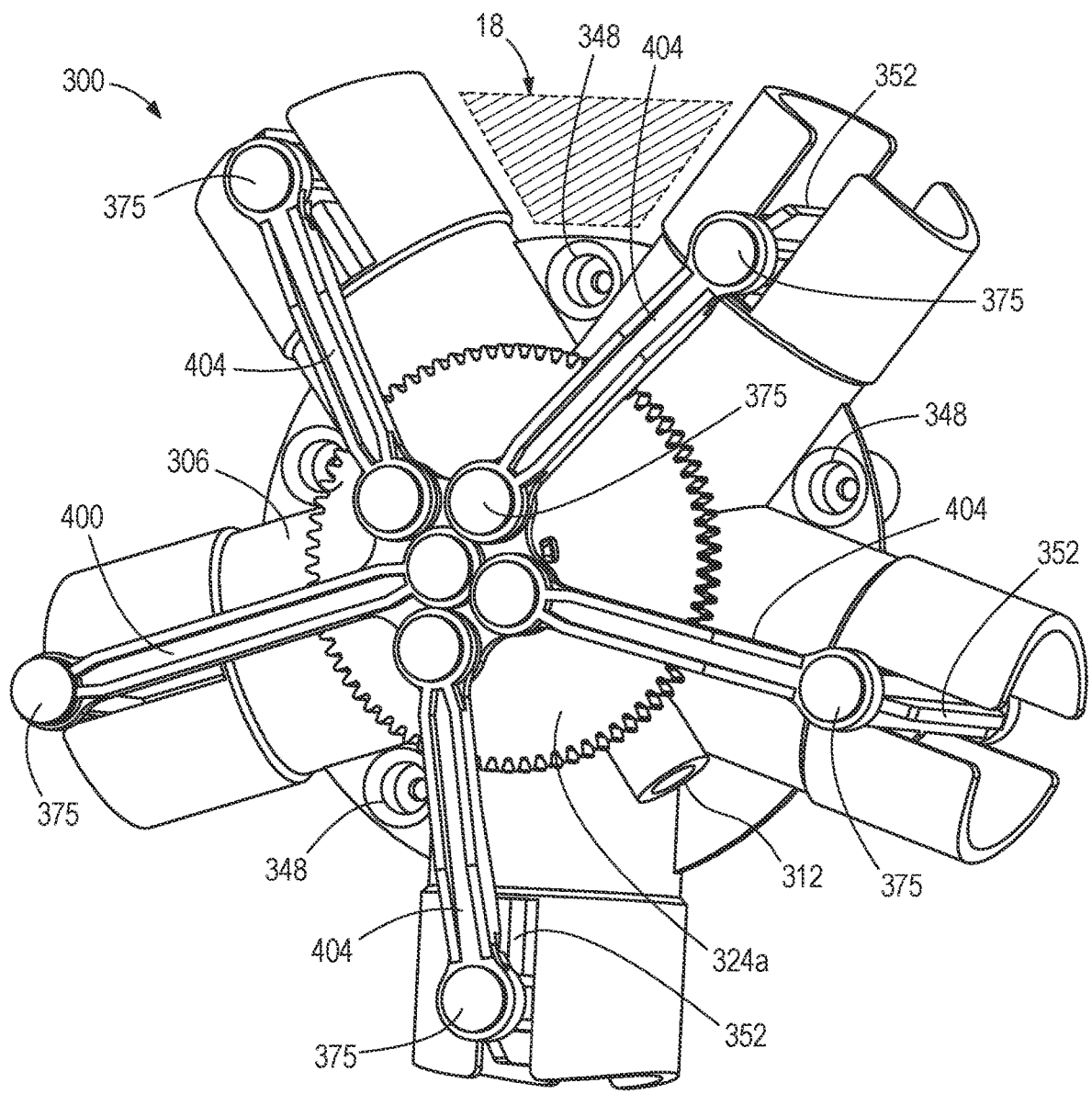
FIG. 20 is a perspective view illustrating another exemplary dosing system including a dosing engine that has a mechanism 64 pump and a drive mechanism.
Figure 21:
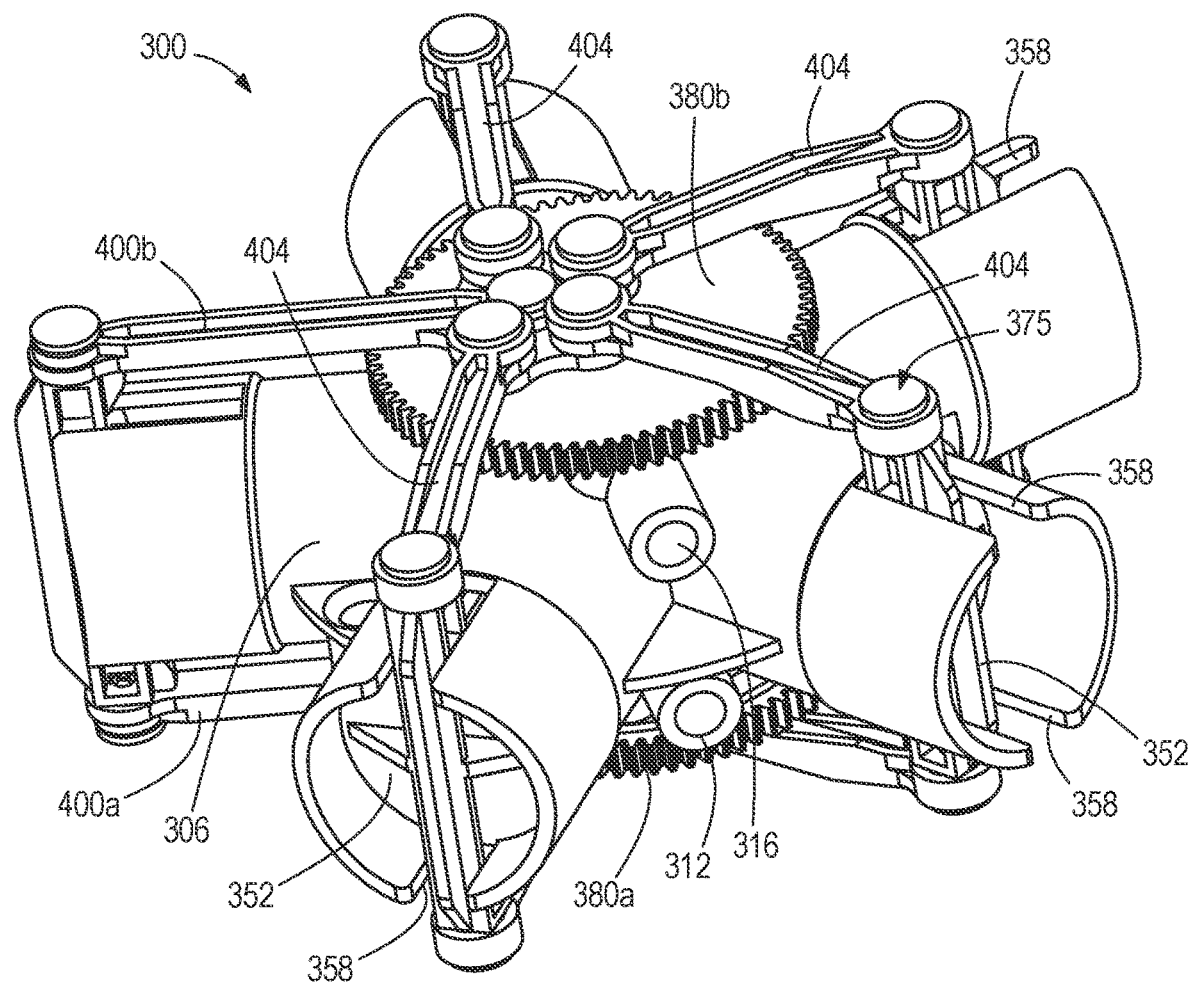
FIG. 21 is another perspective view of the dosing engine of FIG. 20 illustrating the dosing engine and an inlet and an outlet of the mechanism 64 pump.
Figure 22:
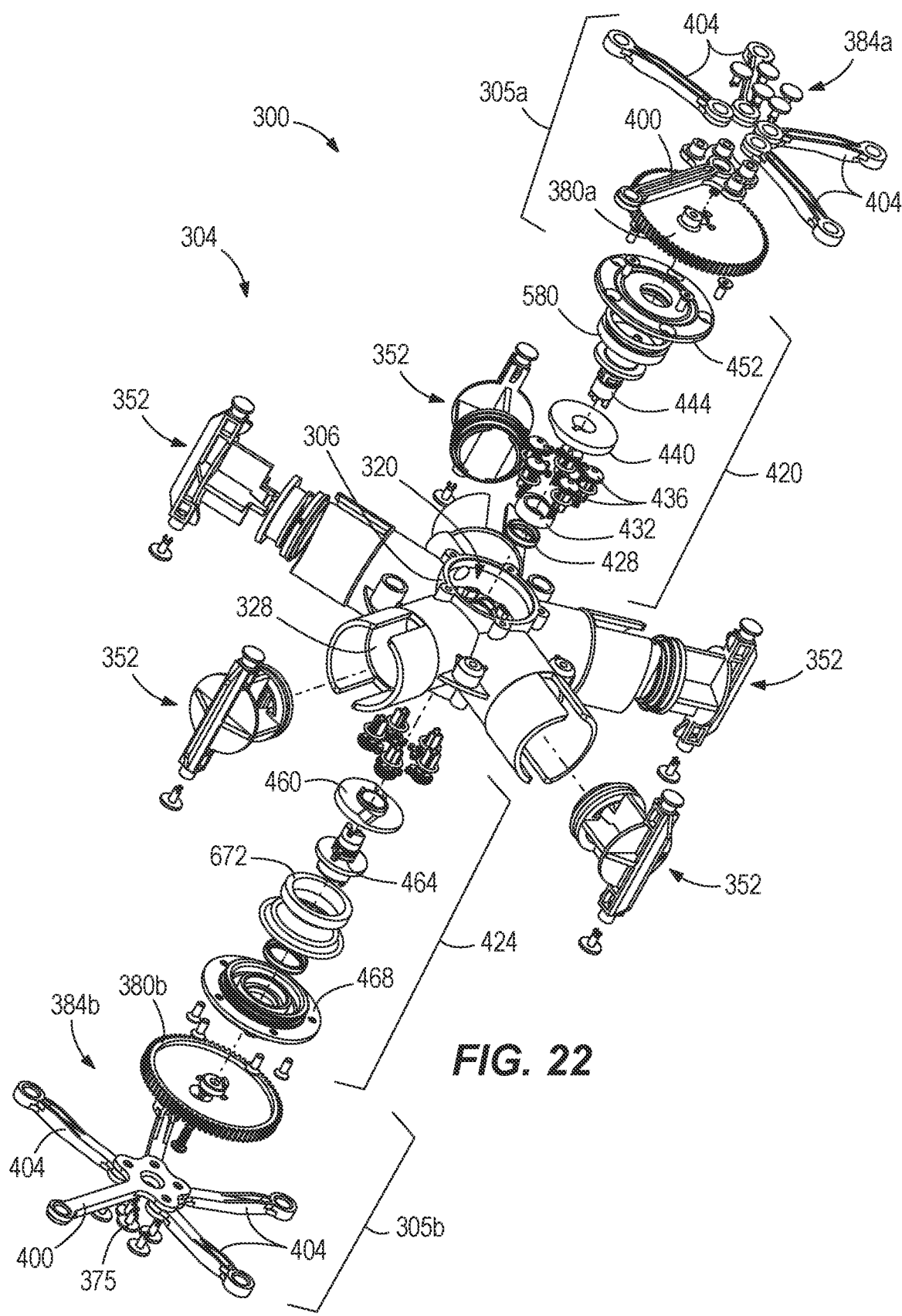
FIG. 22 is an exploded perspective view of the dosing engine of FIG. 20 illustrating various components of the dosing system.
Figure 33:
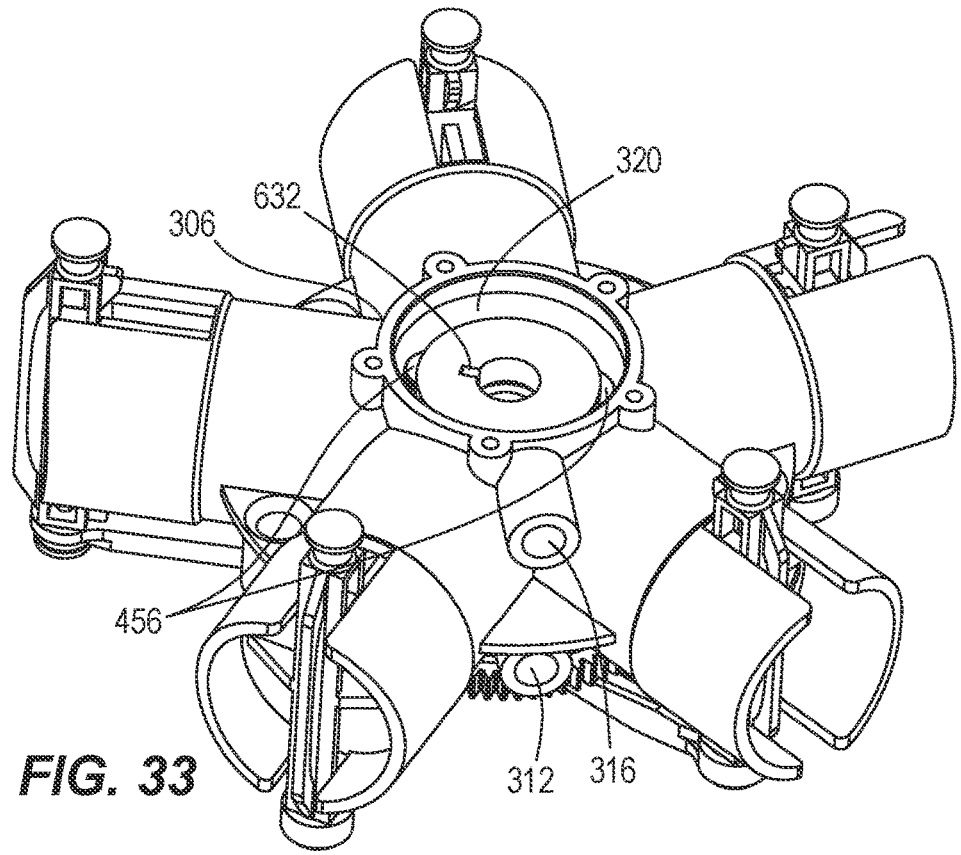
FIG. 33 is a perspective view of a portion of the dosing engine similar to FIG. 32 with the outlet shaft and the pressure seal removed to illustrate an outlet cam.
Figure 34A:
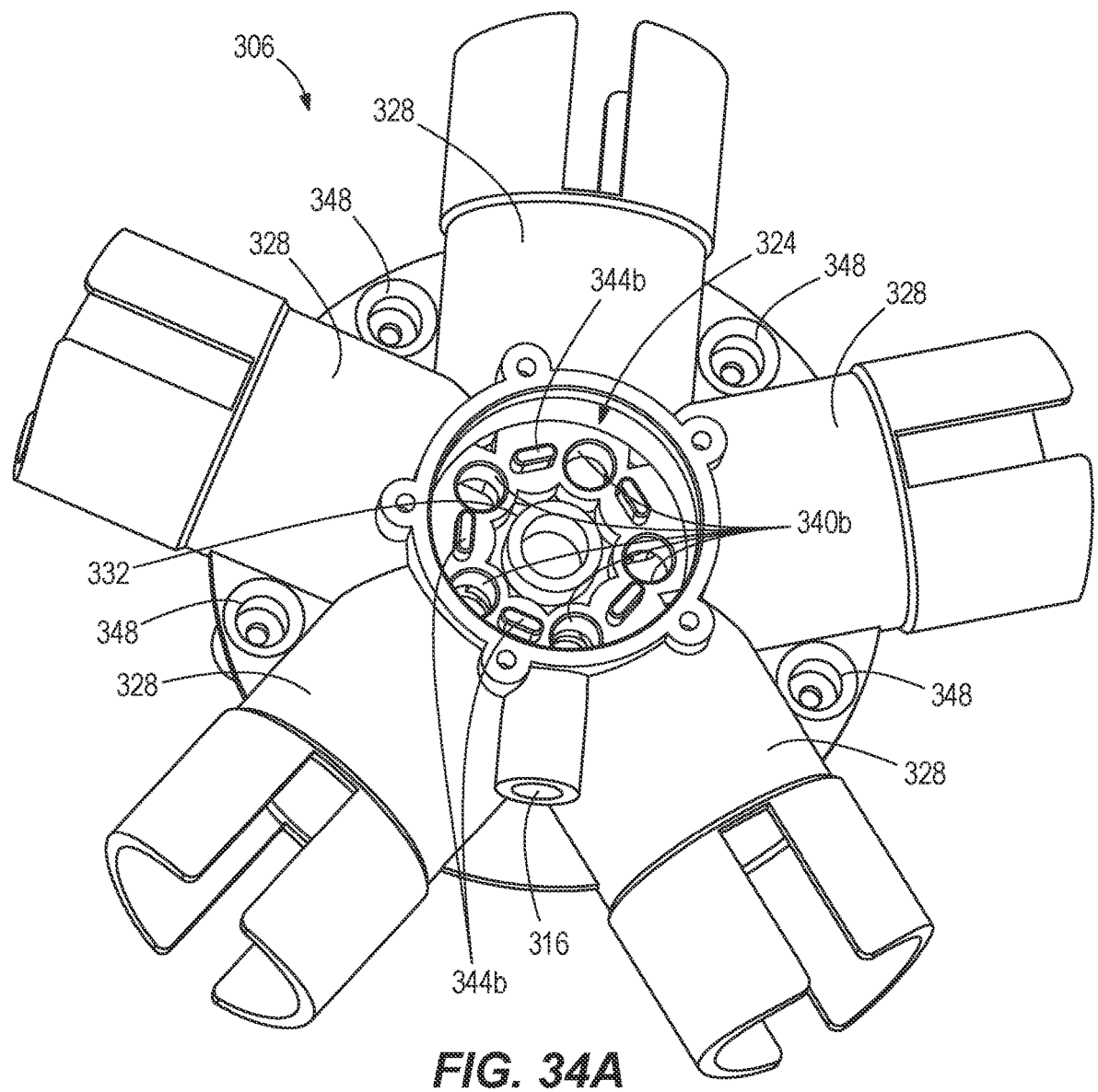
FIG. 34A is a perspective view of the framework on the outlet side.
Figure 36A:
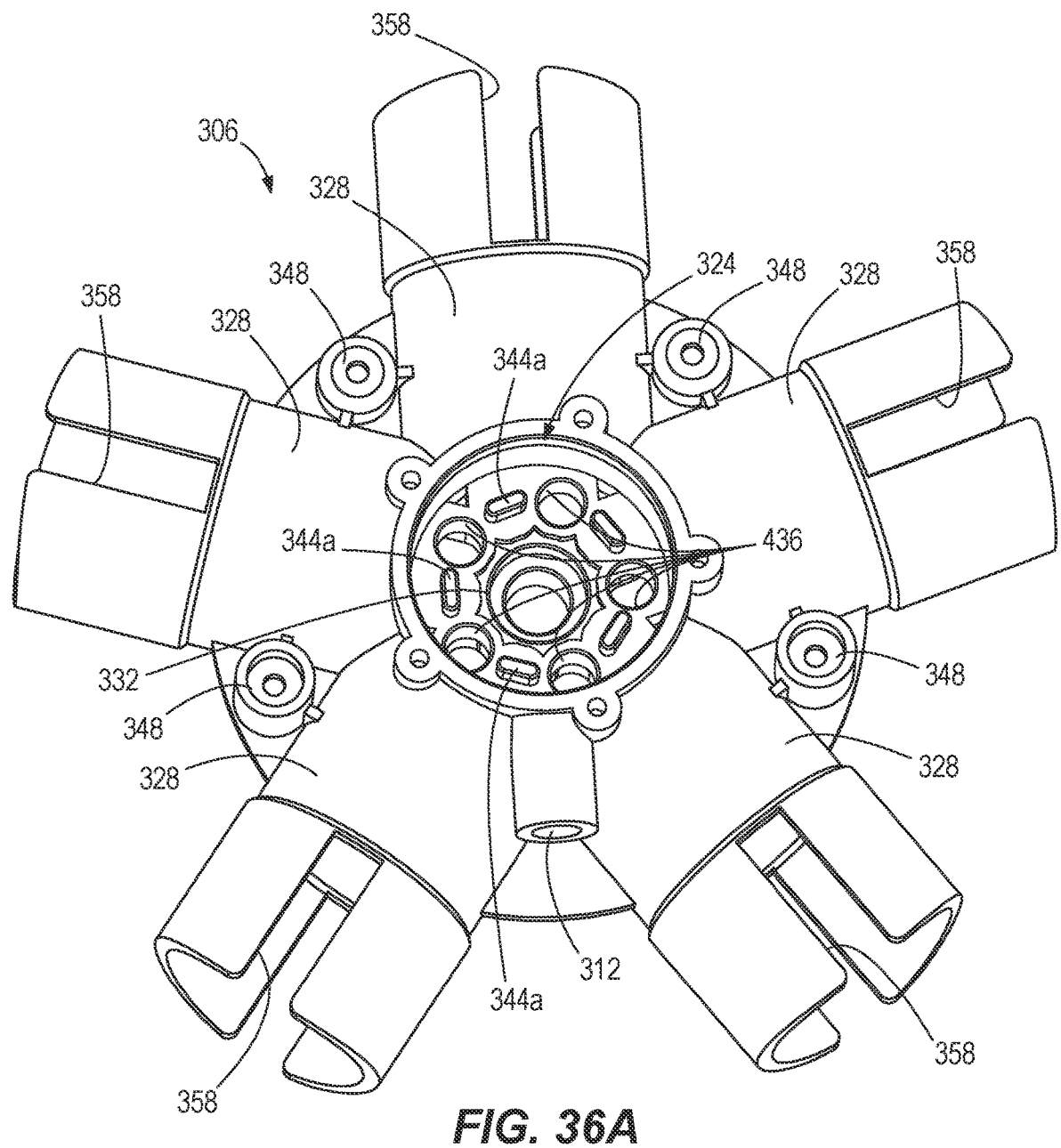
FIG. 36A is a perspective view of the framework on the inlet side.

With reference to FIGS. 20-22, the dosing engine 300 includes a diluent pump 304 and a drive mechanism 305. FIGS. 20-22, 33, 34A, and 36A show that the diluent pump 304 has a framework 306 with an inlet 312, an outlet 316, an inlet-side chamber 320, an outlet-side chamber 324, and housings 328. The inlet 312 is fluidly coupled to a diluent source (e.g., via piping, conduit, or hoses) and connects the diluent source (e.g., diluent source 12) to the inlet-side chamber 320. The outlet 316 fluidly connects the outlet-side chamber 324 to a mix chamber (e.g., the mix chamber 16). As best shown in FIGS. 34A and 36A, the framework 306 has a central opening 322 defined by a wall 336, and each of the inlet-side chamber 320 and the outlet-side chamber 324 has flow channels 340a, 340b and alignment projections 344a, 344b. The flow channels 340a are arranged in the inlet-side chamber 320 equidistant from the center of the framework 306 and equidistant from each other, and the flow channels 340a provide fluid communication between the inlet-side chamber 320 and corresponding housings 328. The flow channels 340b are arranged equidistant from the center of the framework 306 in the outlet-side chamber 324 and equidistant from each other, and the flow channels 340b provide fluid communication between the housings 328 and the outlet-side chamber 324. The alignment projections 344b are disposed between the flow channels 340b. The framework 306 also includes housing mounts 348 that are positioned between at least some of the housings 328 so that one or more chemical pump assemblies (e.g., chemical pump assemblies 18) can be connected to the framework 306. In addition or alternatively, the housing mounts 348 may be used to mount the framework 306 on other structure.

Figure 41:
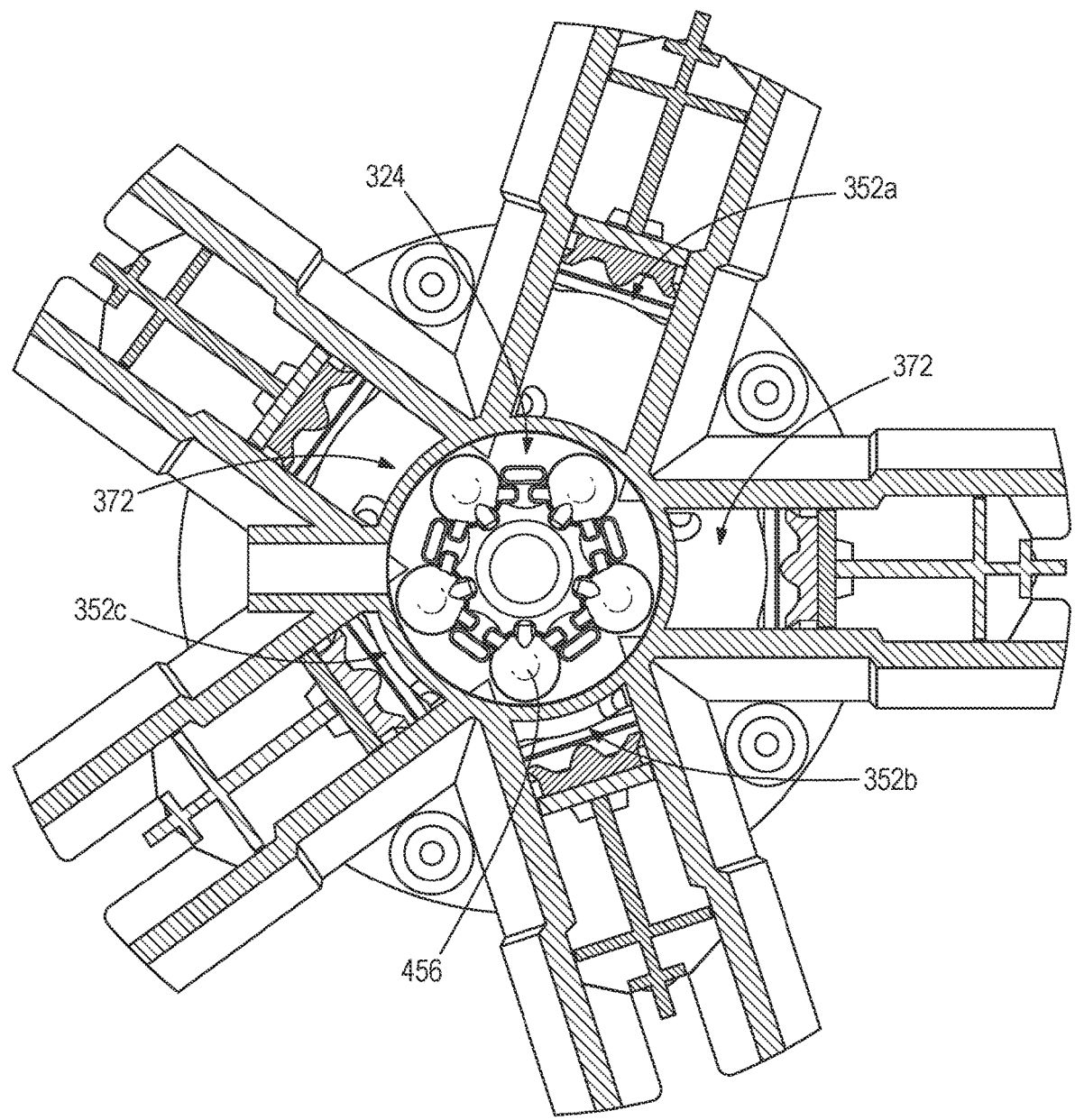
FIG. 41 is a section view across the outlet side of the dosing engine illustrating the positions of the pistons relative to the outlet-side chamber in a state of operation of the dosing engine.

The illustrated framework 306 has five housings 328 that are angularly spaced equidistant from each other around the inlet-side chamber 320 and the outlet-side chamber 324 that are located at a central portion of the framework 306. As shown in FIG. 41, the housings 328 support fluid drivers 352 (e.g., illustrated as pistons). The illustrated housings 328 are cylindrical, but it will be appreciated that the housings 328 can have other shapes (e.g., oblong, polygonal, elliptical, etc.). As shown in FIGS. 3A, 38B, 39, and 40, each housing 328 has an opening 356 that is in communication with either the inlet-side chamber 320 or the outlet-side chamber 324 based on the state of the dosing engine 300 (i.e. based on the position of the piston 352 in the housing 328 and the direction of travel for the piston 352). One diluent piston 352 is disposed in a corresponding housing 328, and each housing-piston combination defines a piston-cylinder arrangement. It will be appreciated that the term 'piston-cylinder' encompasses more than a cylindrical housing 328, and that the shape of the housing 328 and the piston head can have shapes other than cylindrical (e.g., oblong, polygonal, elliptical, etc.). In addition, each piston 352 defines an exemplary pump mechanism of the dosing engine 300 that is supported by the framework 306 and that pumps fluid from the inlet 312 toward the outlet 316 in a coordinated manner with the other pump mechanisms. For purposes of the description and the claims, the terms 'fluid driver' or 'diluent driver' shall be construed broadly as a pump mechanism that can include the piston 352, or another mechanism that is designed to pump a fluid.

Figure 27:
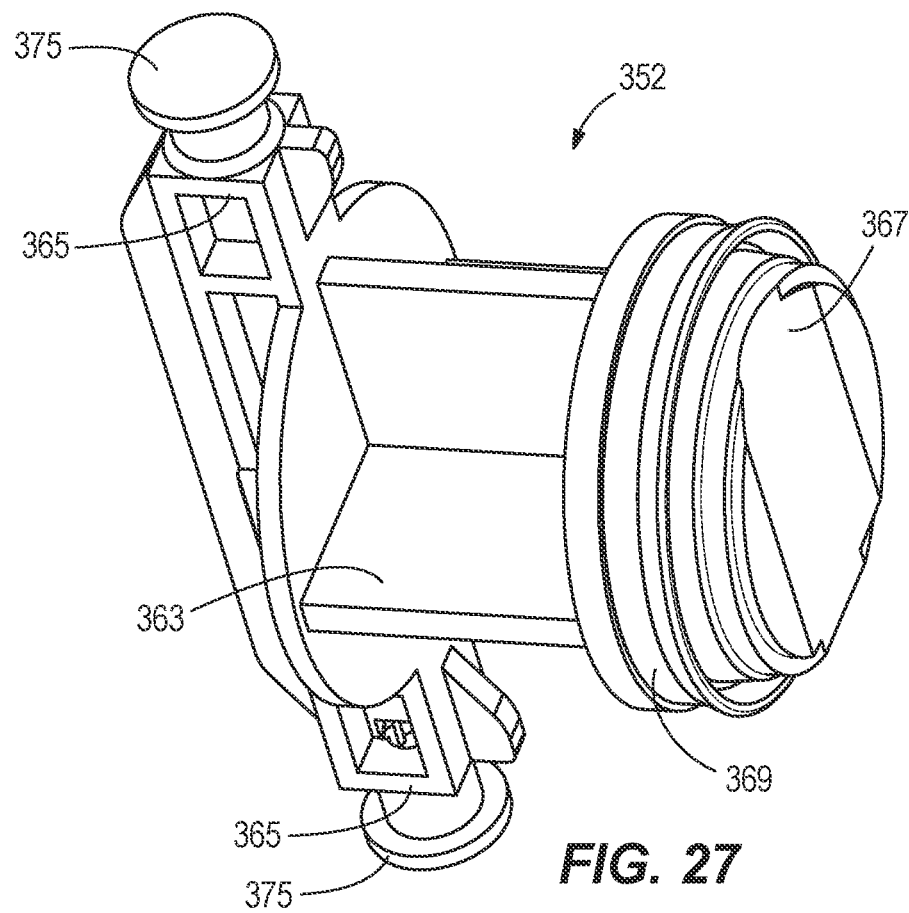
FIG. 27 is a perspective view of one mechanism 64 piston of the dosing engine of FIG. 20, including a piston head, a piston skirt, and a piston seal.

As best shown in FIG. 21, each housing 328 also has slots 358 that extend from a distal end of the housing 328 axially inward along a piston axis (i.e. the slots 358 extend radially on the framework 306). With reference to FIG. 27, each piston 352 has a body 363 that defines arms 365, a piston head 367 that is supported on an end of the body 363 opposite the arms 365 (e.g., coupled to the end of the body 363 or defined on the end of the body 363), and a seal 369 that is coupled to the piston head 367. The piston head 367 is generally shaped consistent with the shape of the housing 328 and has an annular channel that carries the seal 369. The illustrated seal 369 is a lip seal that is generally used where there is unidirectional pressure, as is the case with fluid acting on, or being acted on by, the pistons 352. It will be appreciated that other types of seals (e.g., an O-ring) are possible and considered herein. The seal 369 also may be a low friction seal. When the piston 352 is coupled to the framework 306, the space or area between the piston head 367 and the housing 328 define a pump chamber 372 where fluid can enter and leave via the opening 356.

With reference to FIGS. 20-21, and 27, the arms 365 extend laterally outward from the body 363 and extend through the slots 358 when the piston 352 is positioned in the housing 328 to connect to the drive mechanism 305 (e.g., via fasteners 375). It will be appreciated that the arms 365 may be operatively coupled to the drive mechanism 305 in other ways. Furthermore, it will be appreciated that the pistons 352 can be replaced by similar structure (e.g., bellows, etc.).

Figure 23:
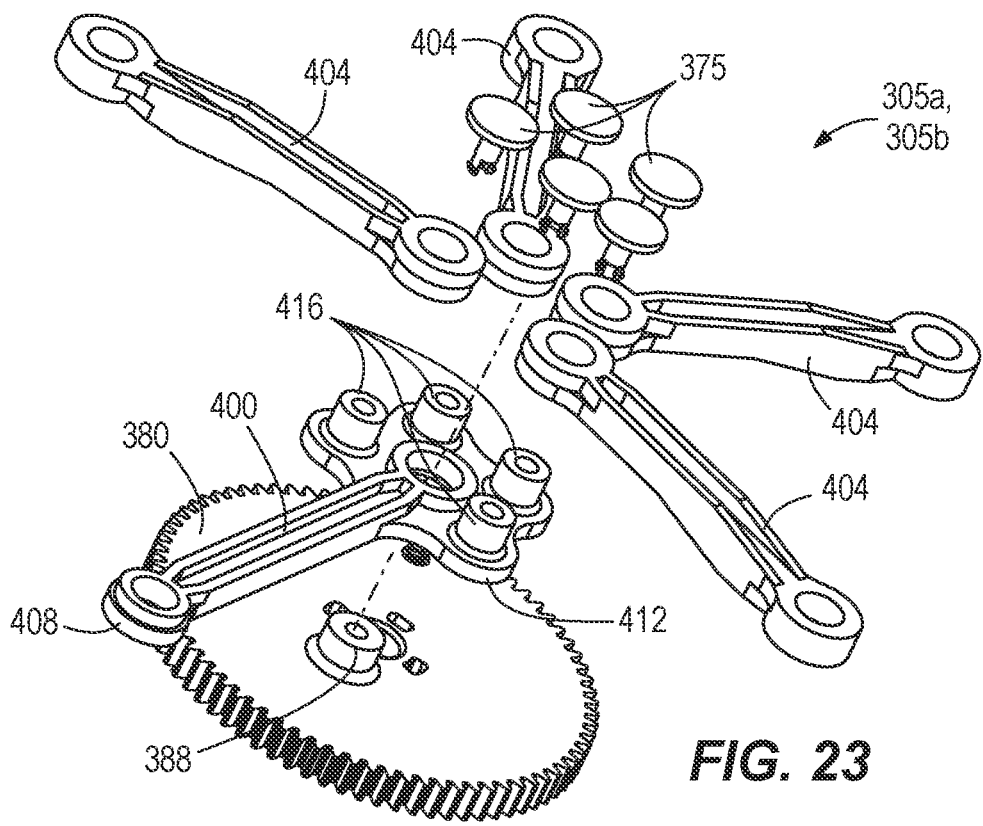
FIG. 23 is an exploded perspective view of one side of the drive mechanism of FIG. 20, including a mechanical linkage and a valve crank gear.
Figure 24:
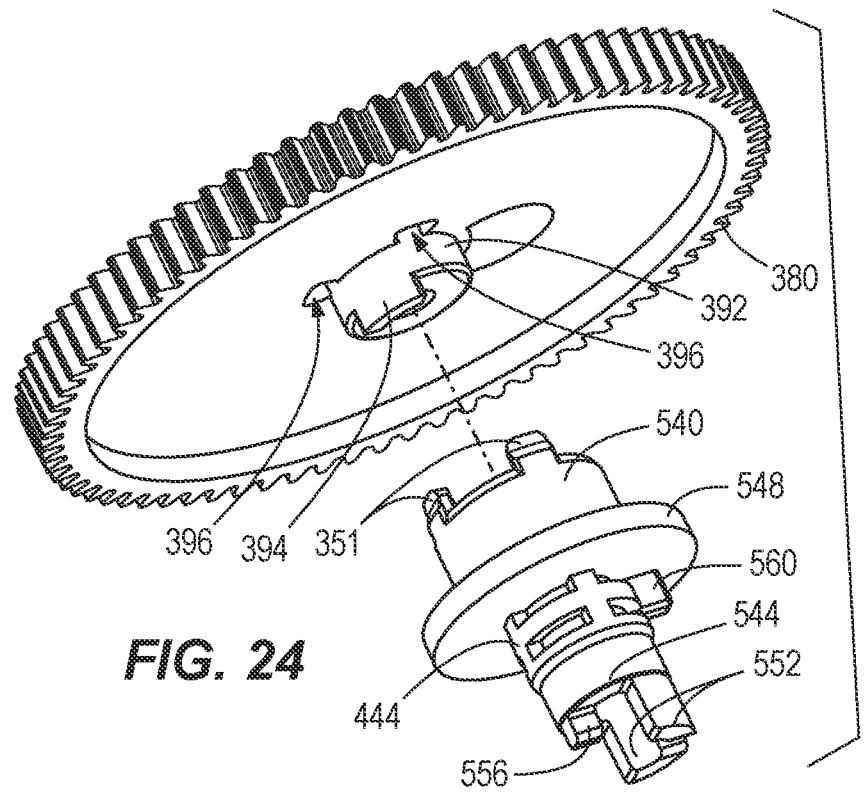
FIG. 24 is an exploded perspective view of the valve crank gear and an inlet shaft of the pump.

With reference to FIGS. 21-23 the drive mechanism 305 includes parallel inlet and outlet subassemblies 305a, 305b that are positioned on opposite, lateral sides of the framework 306 and that cooperate to drive the diluent pump 304 (and, in some embodiments, any chemical pump assemblies, such as an assembly 18, that are coupled to the drive mechanism 305). Each assembly 305a, 305b has a valve crank gear 380 (labeled 380a, 380b in some Figures to distinguish the parallel components) and a crank arm assembly or drive assembly 440a, 440b. Each valve crank gear 380 is positioned on the centerline of the framework 306 and includes gear teeth that can engage other features of a dosing engine 300 (e.g., a chemical drive assembly operably connected to a chemical pump assembly). The valve crank gear 380 also includes a bearing or gear pin 388 that protrudes outward from the outer side of the valve crank gear 380 and that is offset from the center of the valve crank gear 380. FIG. 24 illustrates an interior-facing side of the valve crank gear 380, which includes a pump assembly attachment feature that is defined by a central protrusion 392, a shaft key 394, and pockets 396.

As shown in FIGS. 23-24, each drive assembly 384a, 384b has a primary crank arm 400, and secondary crank arms 404. The primary crank arm 400 has a base or first end 432 that is rotatably connected to the gear pin 388 (e.g., via a fastener 375), and a second end 412 that is connected to one of the arms 365. The secondary crank arms 404 are rotatably attached to the first end 432 of the primary crank arm 472 via bearings 416 on the primary crank arm 400, and fasteners (e.g., snap fasteners 375). The secondary crank arms 404 extend toward and connect to respective arms 365 of the remaining pistons 352. The pinned connections of the secondary crank arms 404 to the primary crank arm 400 define slider crank mechanisms or similar mechanical linkages that transfer linear or reciprocal movement of the pistons 352 within the housings 328 to rotational movement of the diluent pump 304.

Figure 29:
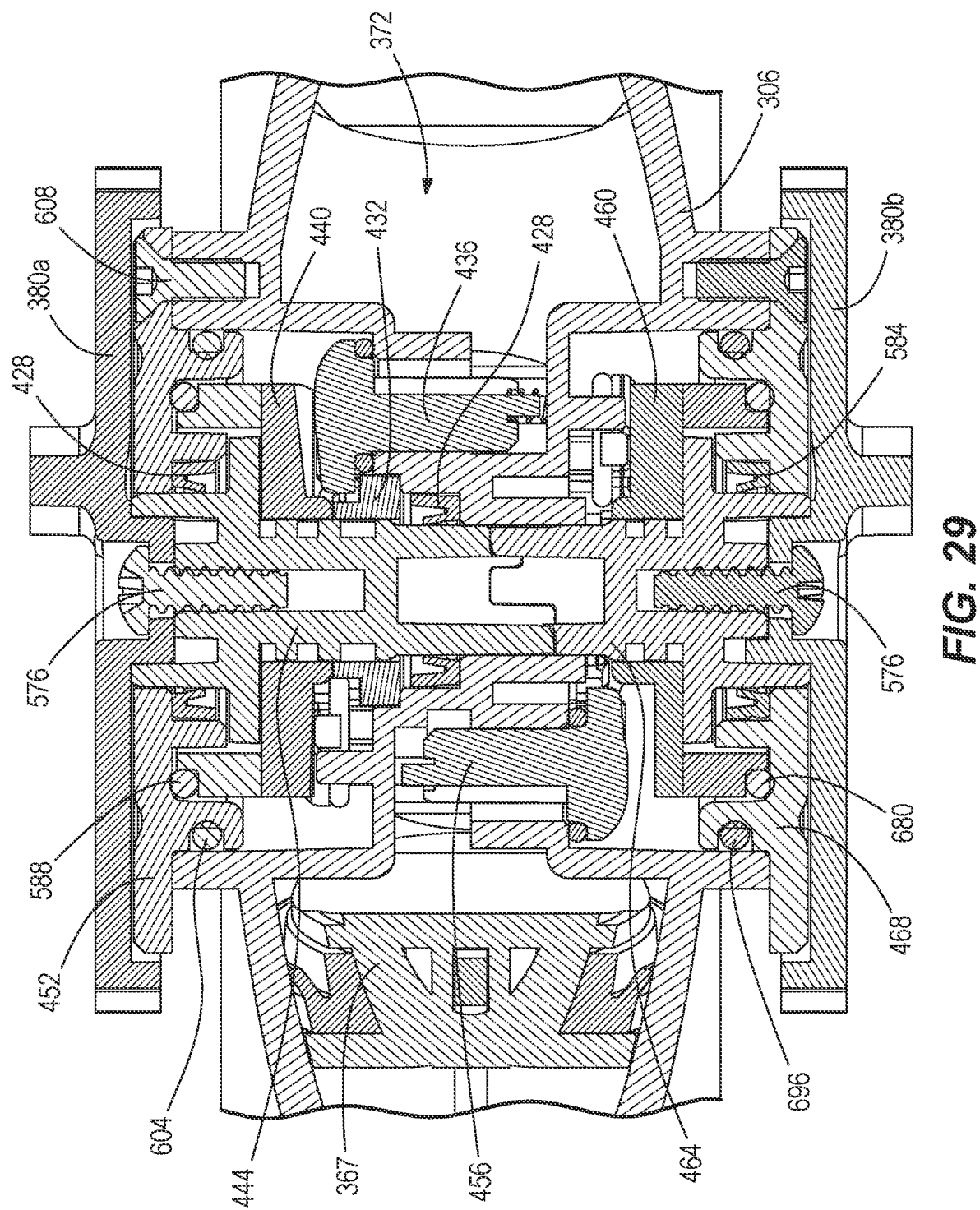
FIG. 29 is a section view of the mechanism 64 pump illustrating the framework, the inlet valve assembly, the outlet valve assembly, and pump chambers.
Figure 30:
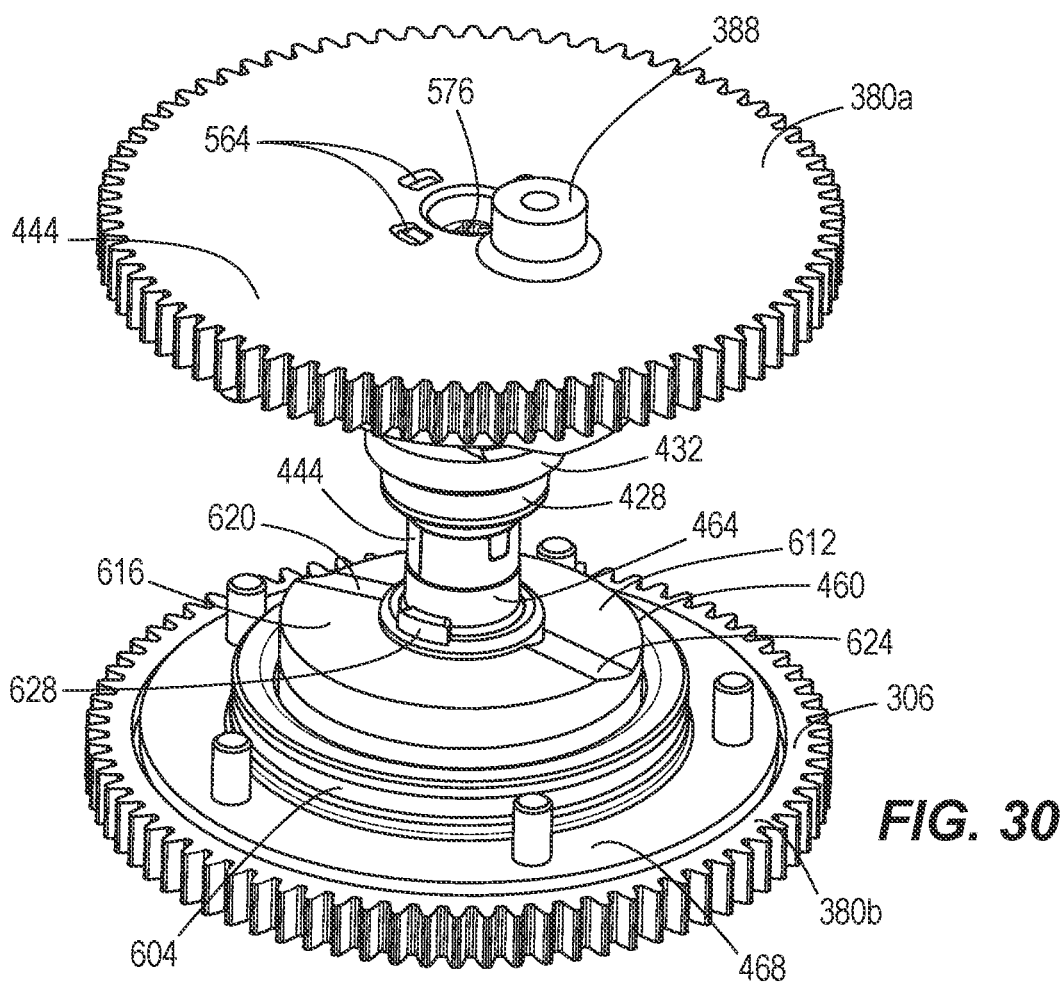
FIG. 30 is a perspective view of the inlet valve assembly and the outlet valve assembly.

With reference to FIGS. 22, 29, and 30, the diluent pump 304 has an inlet flow control device 420 (e.g., illustrated as a valve assembly or a valve mechanism 420) that is positioned on the inlet side of the framework 306, and an outlet flow control device 424 (e.g., illustrated as a valve assembly or a valve mechanism 424) that is positioned on the outlet side of the framework 306. For purposes of the description, the terms 'valve assembly' and 'valve mechanism' are used herein as examples of a flow control device. The inlet valve assembly 420 and the outlet valve assembly 424 are interconnected such that the two assemblies 420, 424 rotate together during operation. As shown in FIGS. 29-31, 35, 36B, and 37A-37G, the inlet valve assembly 420 includes a bore seal 428, a lift cam 432, inlet valve poppets 436, an inlet pressure cam 440, an inlet shaft 444, and a seal plate 452. As shown in FIGS. 29, 30, 32-34, and 37H-37M, the outlet valve assembly 424 includes outlet valve poppets 456, an outlet pressure cam 460, an outlet shaft 464, and a seal plate 468.

Figure 28:
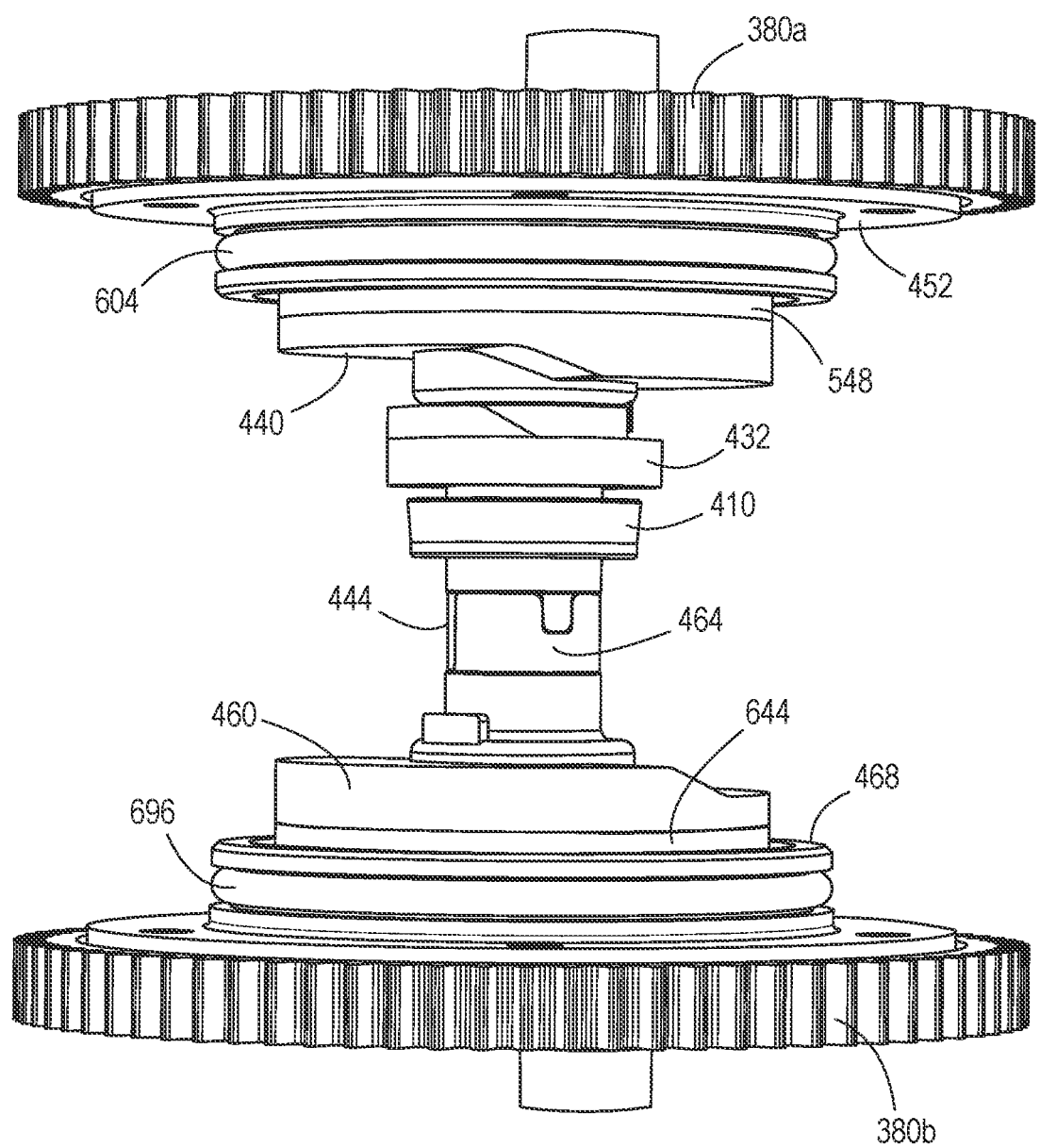
FIG. 28 is a view of the mechanism 64 pump illustrating valve crank gears, and portions of an inlet valve assembly and an outlet valve assembly, with poppets removed for clarity.
Figure 36B:
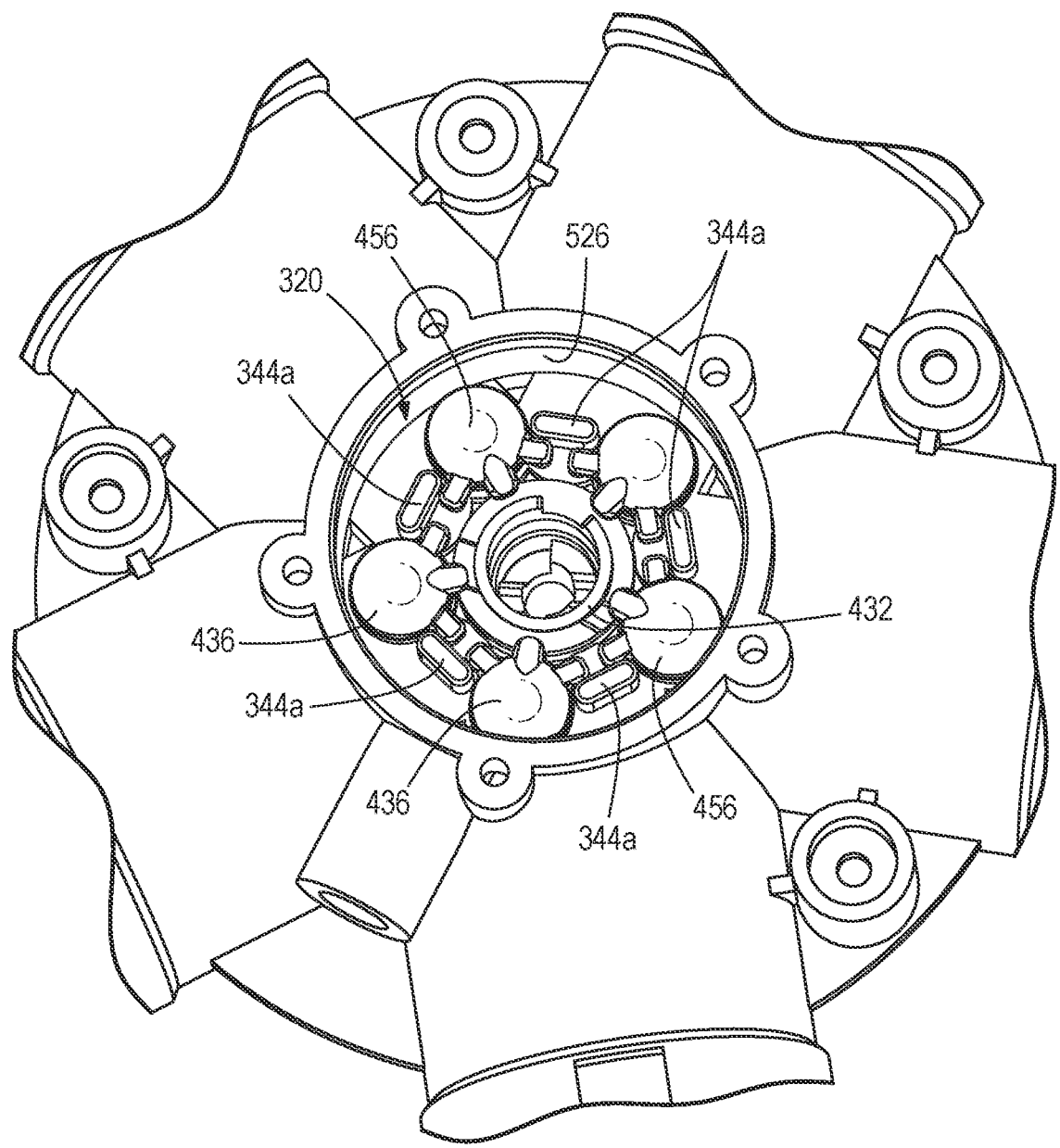
FIG. 36B is a perspective view of a portion of the dosing engine of FIG. 35 with the inlet pressure cam removed to illustrate the inlet-side poppets and the inlet-side lift cam.
Figure 37A:
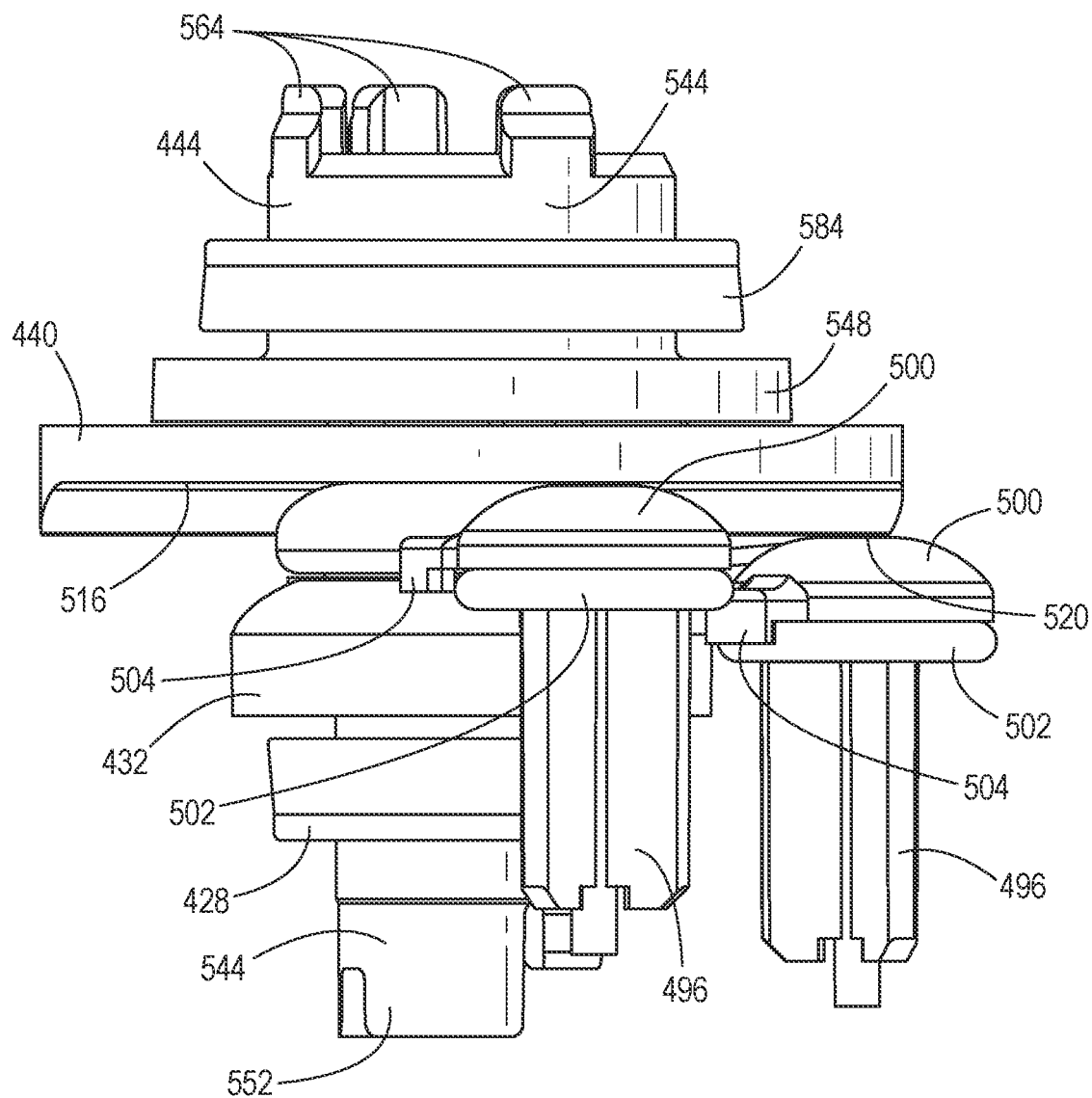
FIG. 37A is a view of the inlet valve assembly, including a bore seal, a lift cam, poppets (with some removed for clarity), an inlet-side-pressure cam, and an inlet shaft.
Figure 37B:
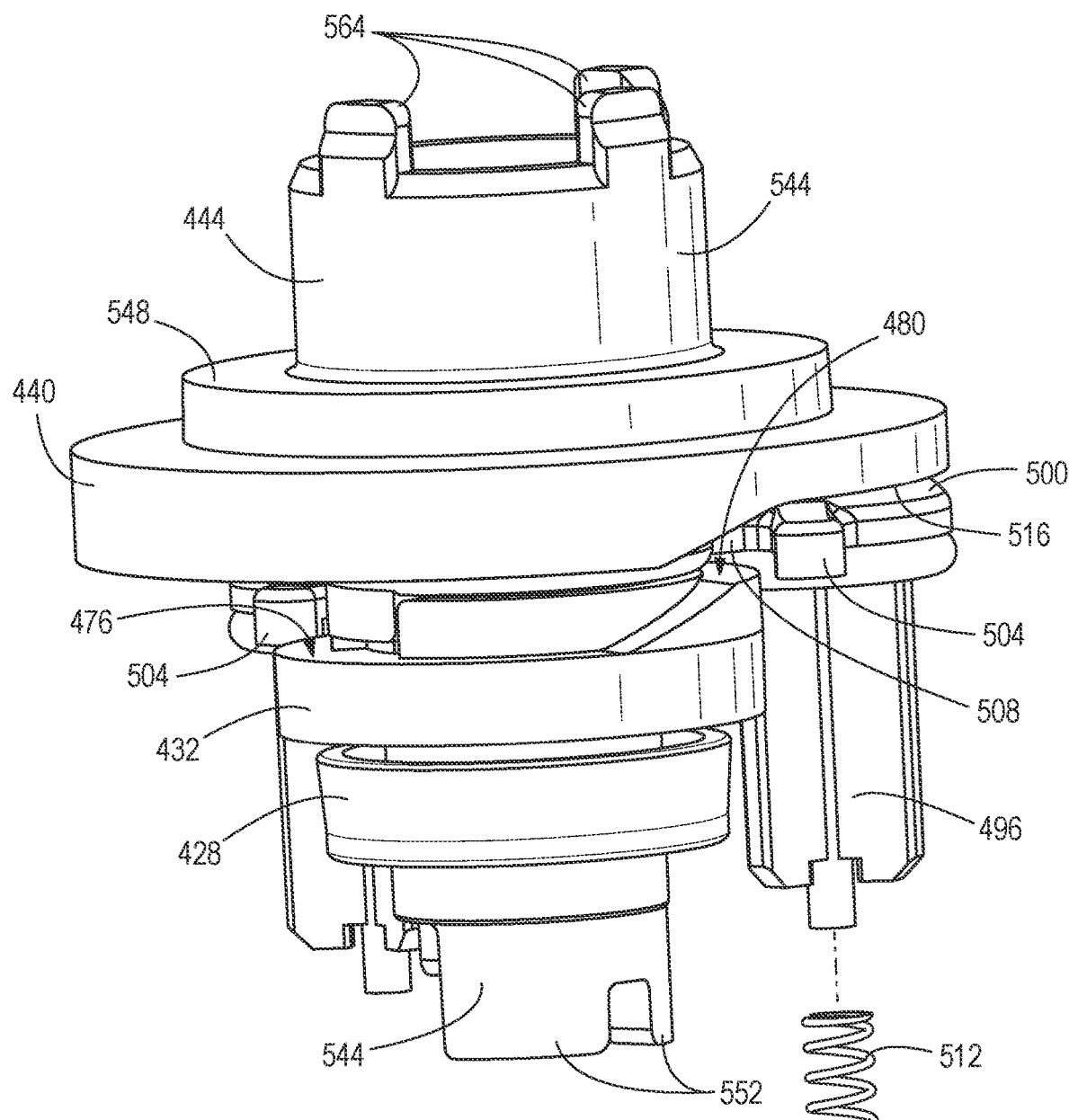
FIG. 37B is a perspective view of the lift cam, poppets, the inlet-side-pressure cam, the inlet shaft, and poppets (with some removed for clarity).
Figure 37C:
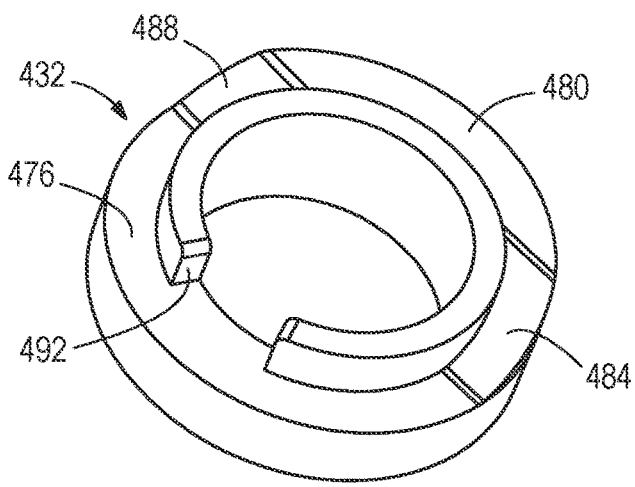
FIG. 37C is a perspective view of the lift cam.
Figure 37D:
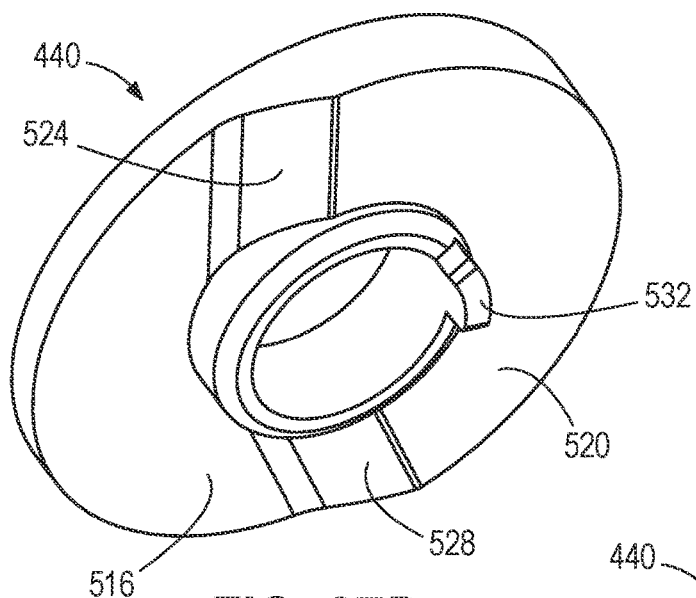
FIG. 37D is a perspective view of the inlet pressure cam.

With reference to FIGS. 28, 29, and 37A, the bore seal 428 is disposed in a center bore 472 in the inlet-side chamber 320 and is annular in shape to receive the inlet shaft 444. The bore seal 428 is coupled to the inlet shaft 444 to seal the inlet valve assembly 420 relative to the framework 306. FIGS. 29, 31, 36, and 37A-37C show that the lift cam 432 is disposed in the inlet-side chamber 320 on the exterior side of the bore seal 428 and is annular so that the inlet shaft 444 can extend through the lift cam 432. On the exterior side, the lift cam 432 has a base section 476 and a lift cam ledge 480 that is connected to the base section 476 by a first cam slope 484 and a second cam slope 488. The lift cam ledge 480 and the first and second cam slopes 484, 488 extend partially around the lift cam 432 and are engageable with an underside of the valve poppets 436 to bias or move the valve poppets 436 to the open position during rotation of the pump 304. Referring to FIGS. 37B and 37C, the lift cam 432 has a slot or notch 492 that is engageable by the inlet pressure cam 440 to maintain cooperative fixed rotation as explained in detail below.

As best shown in FIGS. 36A and 37A-37B, each valve poppet 436 includes a stem 496 and a poppet head 500. The stem 496 extends into the flow channels 340a in the framework 306, and the poppet head 500 is disposed in the inlet-side chamber 320. A poppet seal 502 (e.g., an O-ring) is positioned underneath the poppet head 500 to seal the flow channel 340a from the inlet-side chamber 320 when the valve poppet 436 is in the closed position. The valve poppets 436 can be formed from material that is wear resistant or durable (e.g., durable nylon), or other suitable material.

With reference to FIGS. 36B, 37A, 37B, each valve poppet 436 also includes lateral projections 504 and a center projection 508 that extend radially from the poppet head 500. The lateral projections 504 engage the alignment projections 344a that extend from the framework 306 into the inlet-side chamber 320 to limit or prevent rotation of the valve poppet 436 during movement of the valve poppet 436 between the closed and open positions. The center projection 508 is engageable by the lift cam 432 to lift the valve poppets 436 to the open position. In some constructions, the valve poppets 436 can be additionally biased to the open position by springs 512 (see FIG. 37B) that engage a distal end of the valve poppets 436 that is disposed in the flow channels 340a.

Figure 37E:
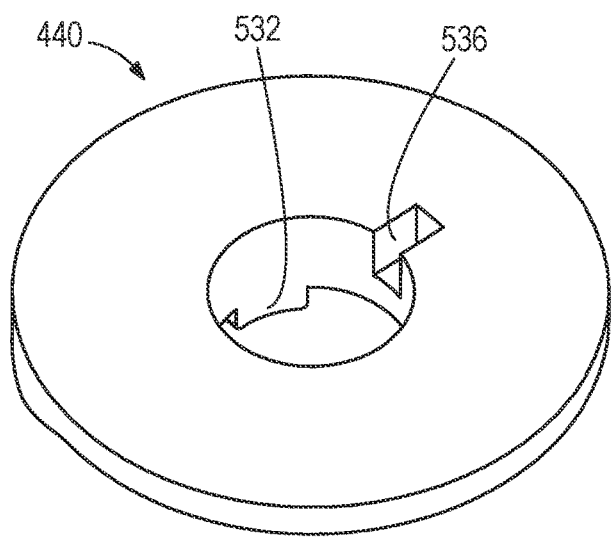
FIG. 37E is another perspective view of the inlet pressure cam.

FIGS. 28, 29, 31, 35, and 37A, 37B, 37D, 37E show that the inlet pressure cam 440 is disposed in the inlet-side chamber 320 on the exterior side of the lift cam 432 and is annular so that the inlet shaft 444 can extend through the inlet pressure cam 440. The inlet pressure cam 440 has a base section 516 and a pressure cam ledge 520 that is connected to the base section 516 by a first cam slope 524 and a second cam slope 528. The inlet pressure cam 440 also has a key 532 that extends outward from adjacent the inner wall of the inlet pressure cam 440. The key 532 is engageable with the notch 492 to maintain fixed rotation between the lift cam 432 and the inlet pressure cam 440. The pressure cam ledge 520 and the first and second cam slopes 524, 528 extend partially around the inlet pressure cam 440 and are engageable with the upper side of the poppet heads 500 to bias or move the valve poppets 436 to the closed position during rotation of the pump 304. The base section 476, the lift cam ledge 480, the first cam slope 484, and the second cam slope 488 cooperate with the base section 516, the pressure cam ledge 520 the first cam slope 524, and the second cam slope 528 to define a path for the poppet heads 500 during rotation of the diluent pump 304. Referring to FIGS. 33 and 37E, the inlet pressure cam 440 has a slot or notch 536 that is engageable by the inlet shaft 444 to maintain cooperative fixed rotation between the shaft 444 and the inlet pressure cam 440.

Figure 37F:
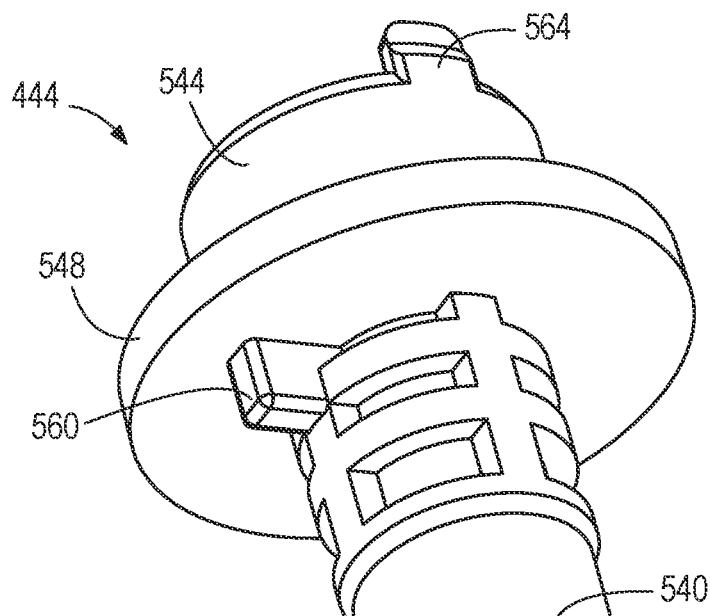
FIG. 37F is a perspective view of the inlet shaft.
Figure 37G:
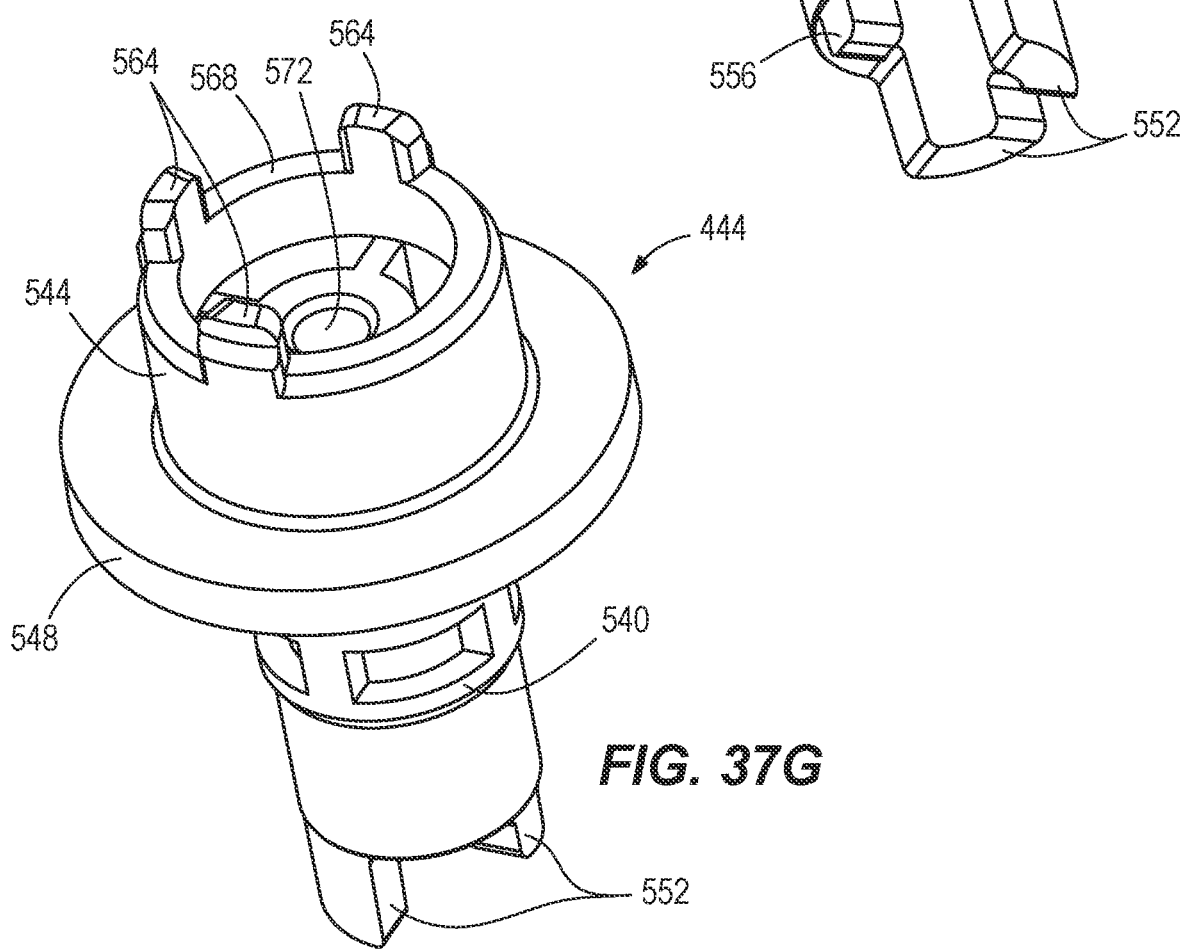
FIG. 37G is another perspective view of the inlet shaft.

As best seen in FIGS. 28, 29, 31, 37A, 37B, and 37F-37G, the inlet shaft 444 includes an elongated body with an inner end 540 and an outer end 544, and a cam plate 548 that is disposed between the ends 540, 544. The inner end 540 is shaped to mate with the outlet shaft 464 so that both shafts 464 rotate in unison. As illustrated in FIG. 37F, the inner end 540 has two spaced fingers 552 and a tab 556, and the cam plate 548 has a key 560 on the side facing the inner end 540. The key 560 engages the notch 536 in the inlet pressure cam 440 to fix rotation between the inlet shaft 444 and the inlet pressure cam 440. It will be appreciated that the inner end 540 can have other features that facilitate interlock with the outlet shaft 464.

With reference to FIGS. 24, 29, 31, 37A, 37B, and 37G, the outer end 544 has shaft extensions 564 that are spaced annularly around the periphery of the inlet shaft 444 and that engage the pockets 396. The shaft key 394 extending from the valve crank gear 380*a* is engaged with a slot 568 in the outer end 544 between the shaft extensions 564. The illustrated outer end 544 has three extensions 564, but it will be appreciated that the outer end 544 can have one, two, or more than three extensions 564 to fix rotation between the valve crank gear 380*a* and the inlet shaft 444. The inlet shaft 444 also has an aperture 572 that receives a fastener 576 to secure the valve crank gear 380*a* to the inlet shaft 444.

Figure 31:
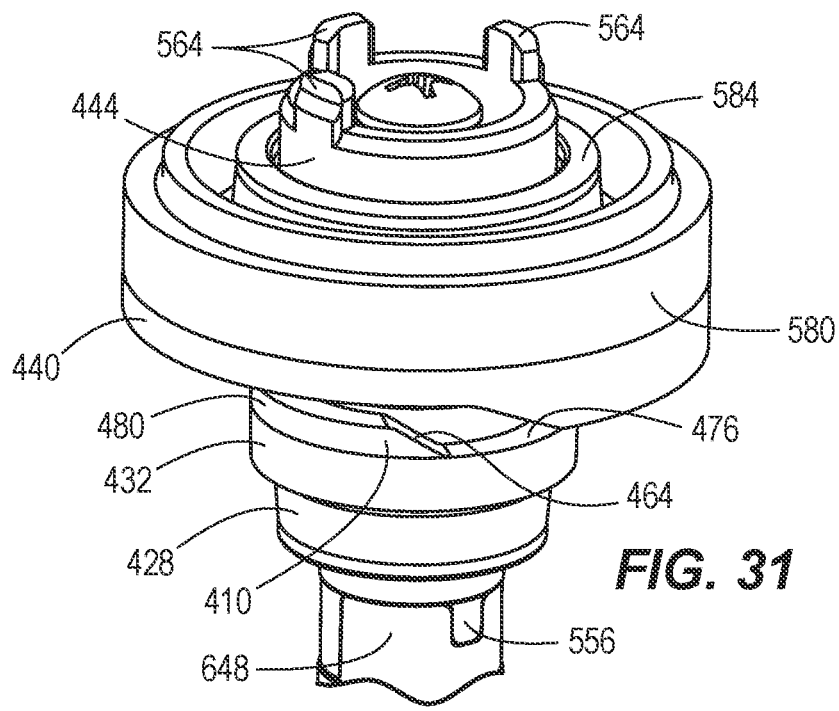
FIG. 31 is a perspective view of a portion of the inlet valve assembly.
Figure 32:
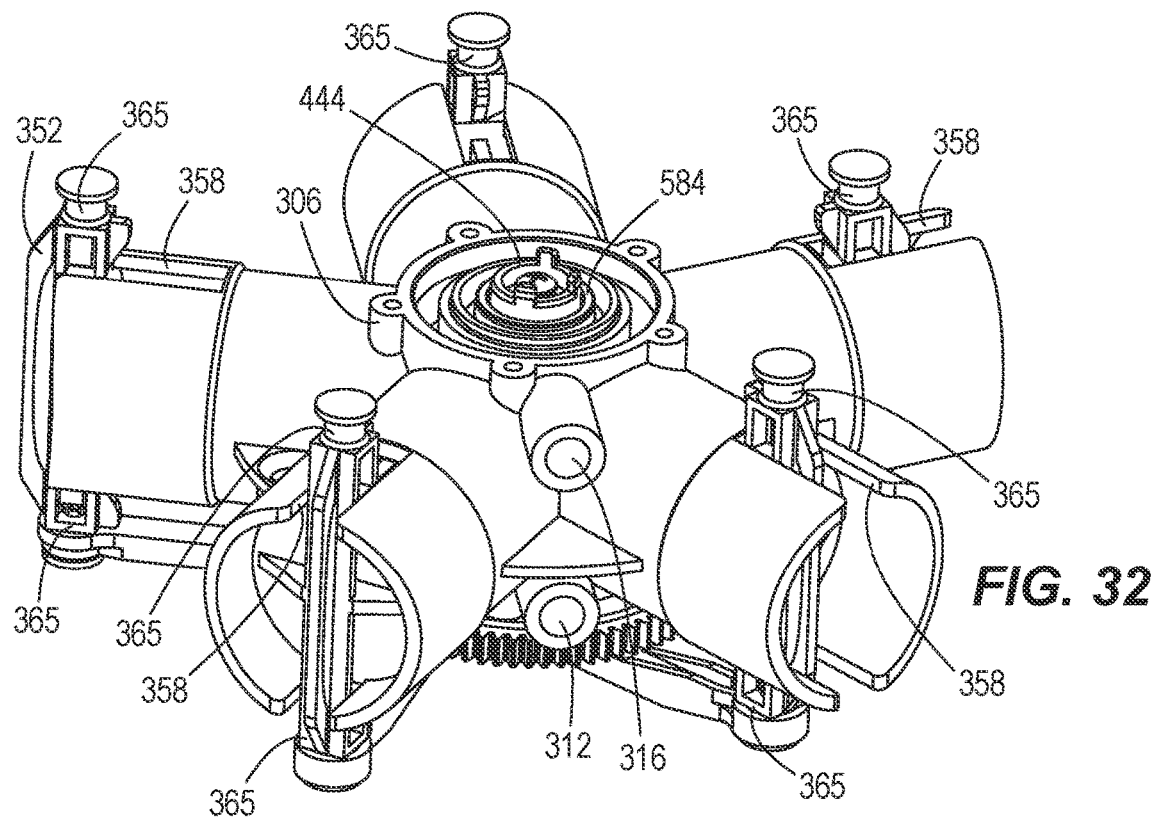
FIG. 32 is a perspective view of a portion of the outlet valve assembly with an outlet shaft and a pressure seal.

With reference to FIGS. 29 and 31, a bearing or wear plate 580 is supported on the outer side of the inlet pressure cam 440. The wear plate 580 surrounds the cam plate 548 and a portion of the outer end 544. A shaft seal 584 is coupled to the outer end 544 to seal the interior parts of the inlet valve assembly 420. A seal 588 (e.g., an O-ring) is coupled to a seal shelf 592 that is defined on the outer periphery of the wear plate 580.

Figure 25:
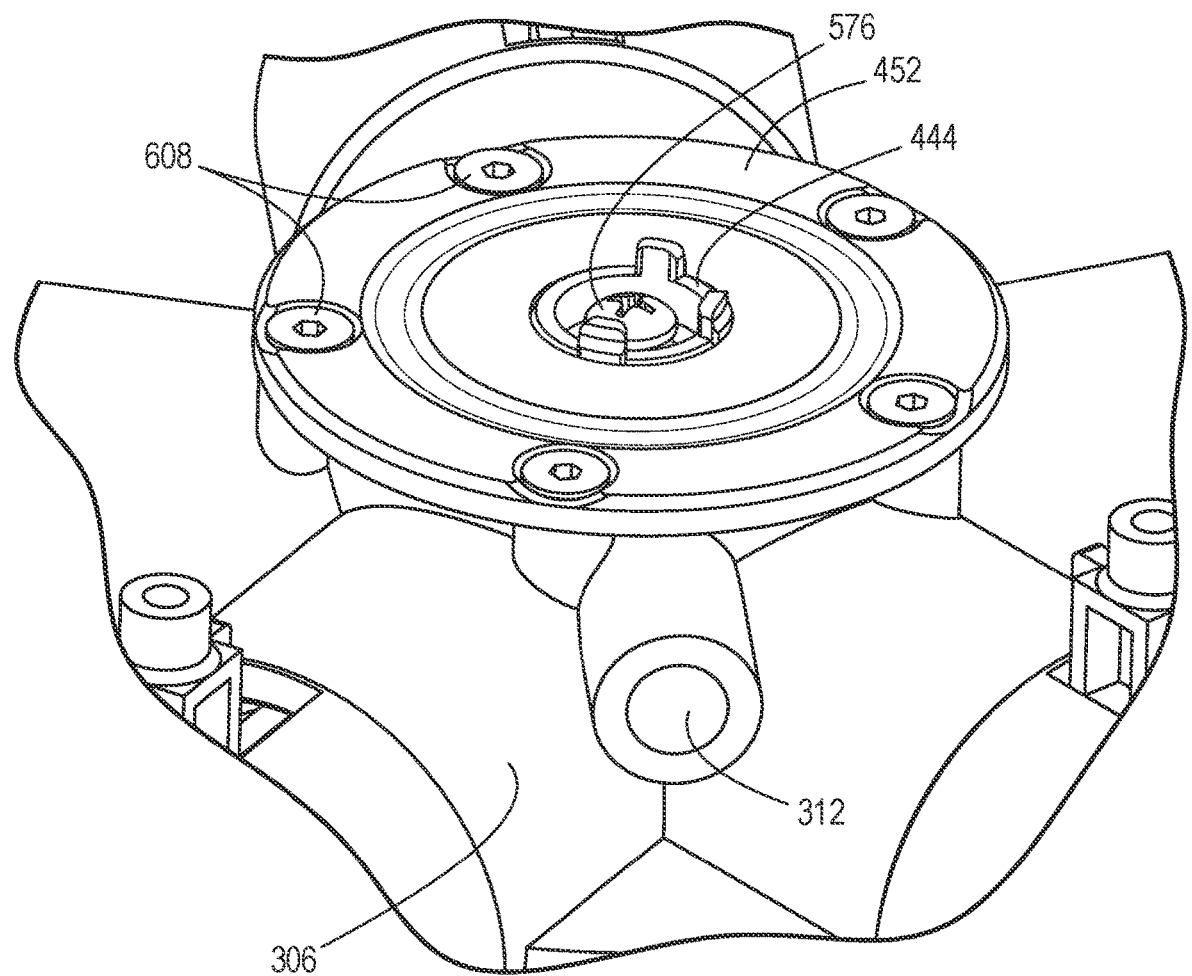
FIG. 25 is a perspective view of the dosing engine of FIG. 21 with the crank arms and the valve crank gear removed to illustrate portions of the mechanism 64 pump, including a seal plate and an inlet shaft.
Figure 26:
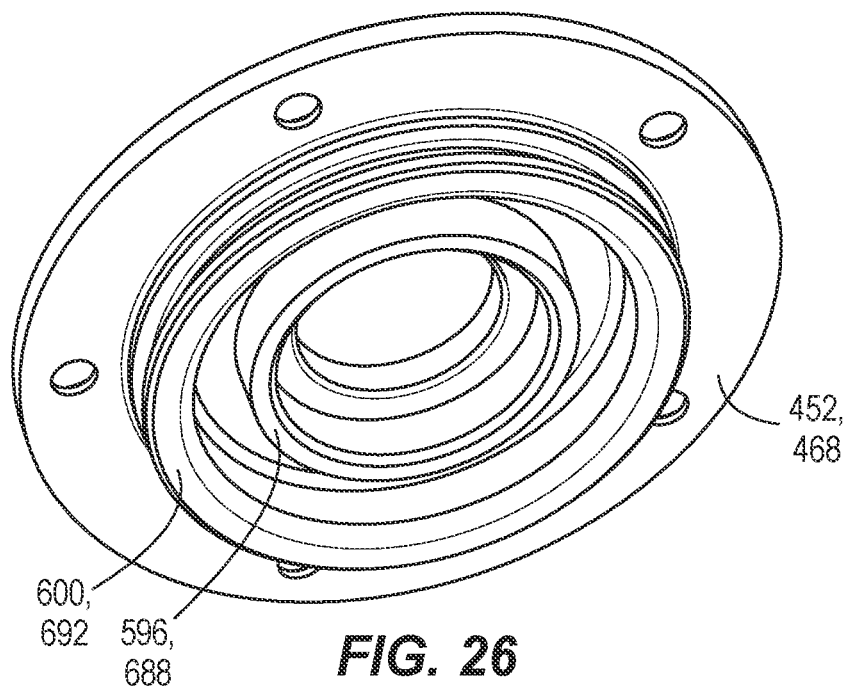
FIG. 26 is a perspective view of an inner side the seal plate of FIG. 25.

FIG. 29 shows that the seal plate 452 is sandwiched between the valve crank gear 380*a* and the inlet shaft 444. The seal plate 452 includes an inner annular neck 596 that is engageable with the cam plate 548, and an outer annular neck 600 that supports a seal 604 and that engages an inner wall 526 of the inlet-side chamber 320. As best shown in FIG. 25, the seal plate 452 is secured to the framework 306 by fasteners 608 such that the seal plate 452 does not rotate with the valve crank gear 380*a* or the inlet valve assembly 420.

Figure 34B:
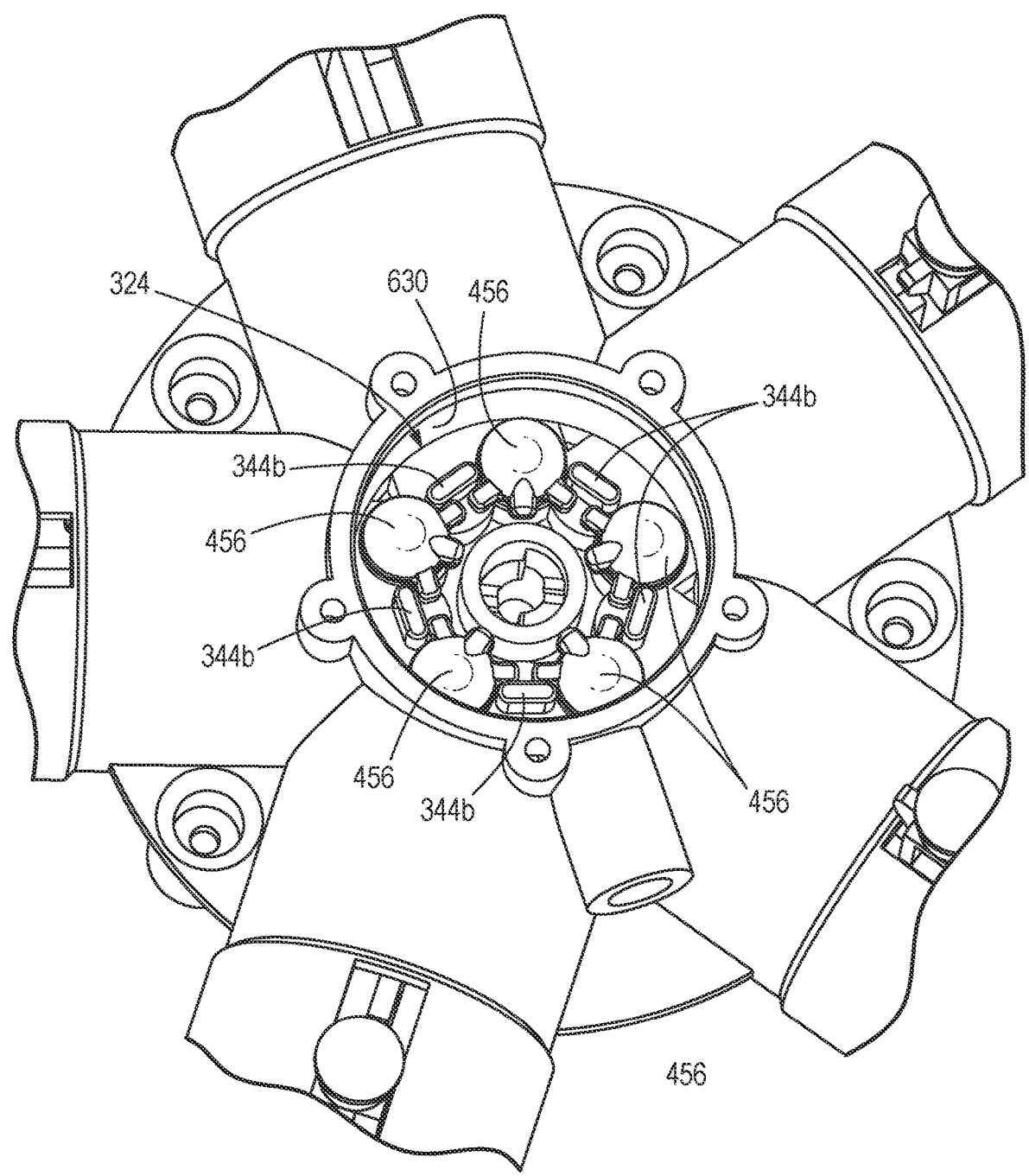
FIG. 34B is a perspective view of a portion of the dosing engine similar to FIG. 33 with the outlet cam removed to illustrate poppets of the valve assembly on the outlet side.
Figure 35:
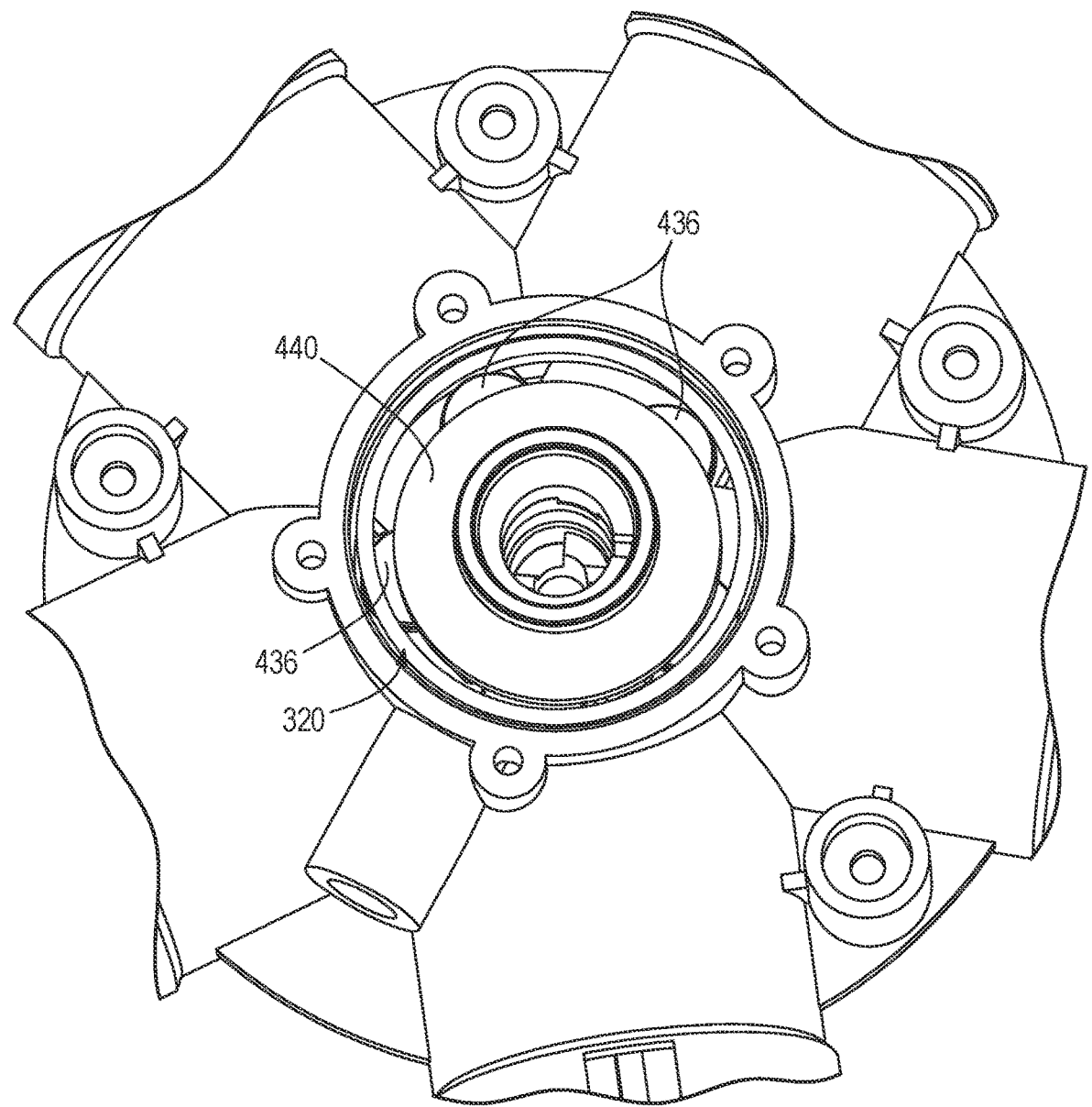
FIG. 35 is a perspective view of a portion of the dosing engine with the center shaft removed to illustrate an inlet pressure cam and inlet-side poppets.
Figure 37H:
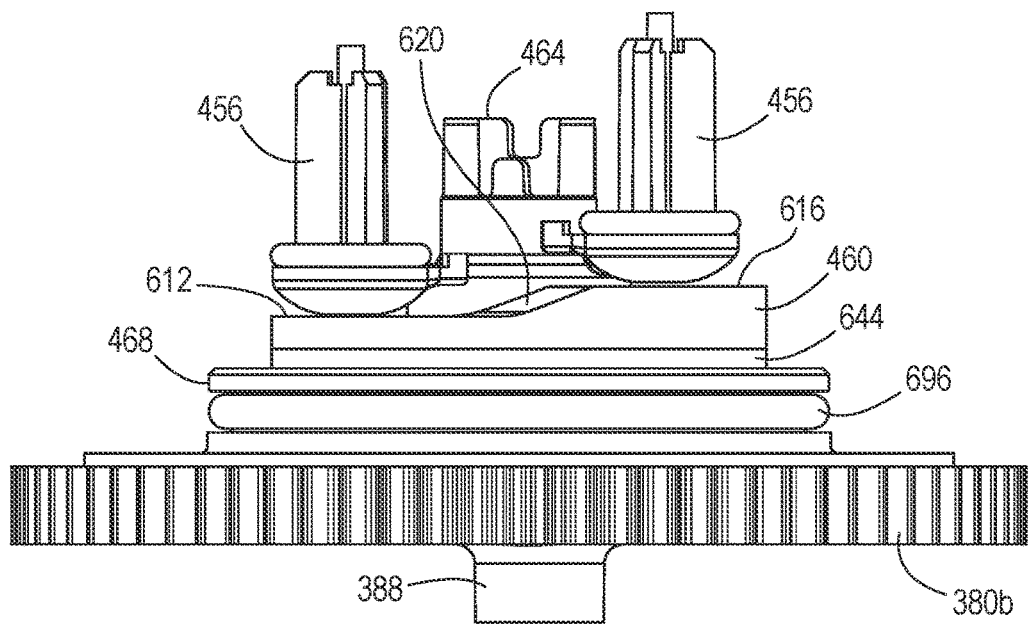
FIG. 37H is a view of the outlet valve assembly, including poppets, an outlet pressure cam, a seal plate, and an outlet shaft.

With reference to FIGS. 29, 34B, and 37H, the illustrated outlet-side valve poppets 456 are the same as the inlet-side valve poppets 436 and each valve poppet 456 includes the stem 496 and the poppet head 500. In some constructions, the outlet-side valve poppets 456 may not have the center projection 508 because a lift cam is not needed to move the outlet valve poppets 456 to the open position. Instead, fluid flow toward the outlet 316 may be sufficient to move the valve poppets 456 to the open position. A poppet seal 502 (e.g., an O-ring) is positioned underneath each poppet head 500 to seal the flow channel 340*b* from the outlet-side chamber 324 when the valve poppet 456 is in the closed position. The valve poppets 456 can be formed from material that is wear resistant or durable (e.g., durable nylon), or other suitable material.

Figure 37J:
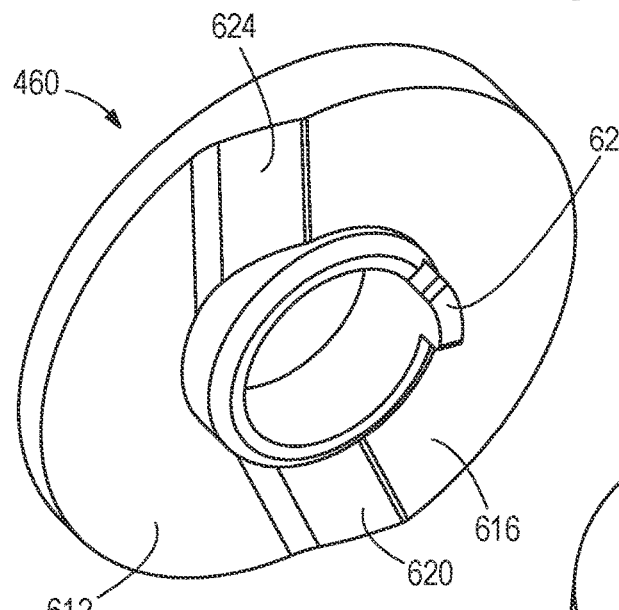
FIG. 37J is a perspective view of the outlet pressure cam.
Figure 37K:
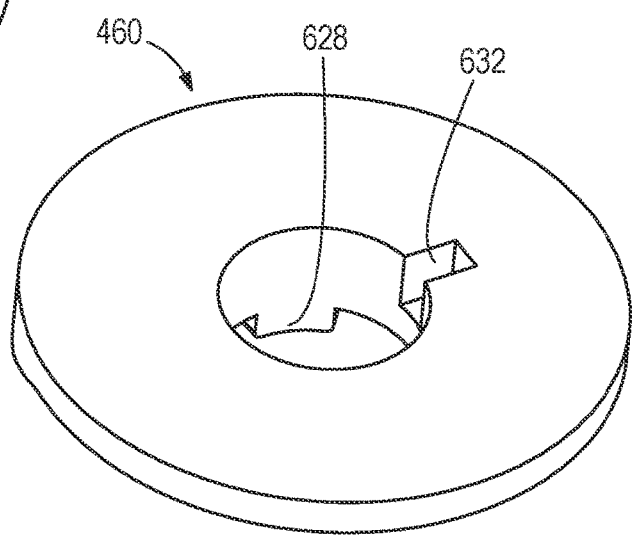
FIG. 37K is another perspective view of the outlet pressure cam.

FIGS. 29 and 33 show that the outlet pressure cam 460 is disposed in the outlet-side chamber 324 and is annular so that the outlet shaft 464 can extend through the outlet pressure cam 460. As shown in FIGS. 28, 37J, and 37K, the outlet pressure cam 460 has a base section 612 and a pressure cam ledge 616 that is connected to the base section 612 by a first cam slope 620 and a second cam slope 624. The illustrated inlet pressure cam 460 also has a key 628 that extends outward from adjacent the inner wall of the outlet pressure cam 460. The key 628 rotates about an exterior of the wall 336 defining the opening 322 for the shafts 444, 464. The pressure cam ledge 616 and the first and second cam slopes 620, 624 extend partially around the outlet pressure cam 460 and are engageable with the upper side of the poppet heads 500 to bias or move the valve poppets 456 to the closed position during rotation of the pump 304. In the closed position, the valve poppets 456 rest or are coupled to an inner wall 630 of the outlet-side chamber 324. The inner wall 630 cooperates with the base section 612, the pressure cam ledge 616 the first cam slope 620, and the second cam slope 624 to define a path for the poppet heads 500 on the outlet side during rotation of the diluent pump 304. Referring to FIG. 37K, the outlet pressure cam 460 has a slot or notch 632 that is engageable by the outlet shaft 464 to maintain cooperative fixed rotation between the shaft 464 and the outlet pressure cam 460.

Figure 37L:
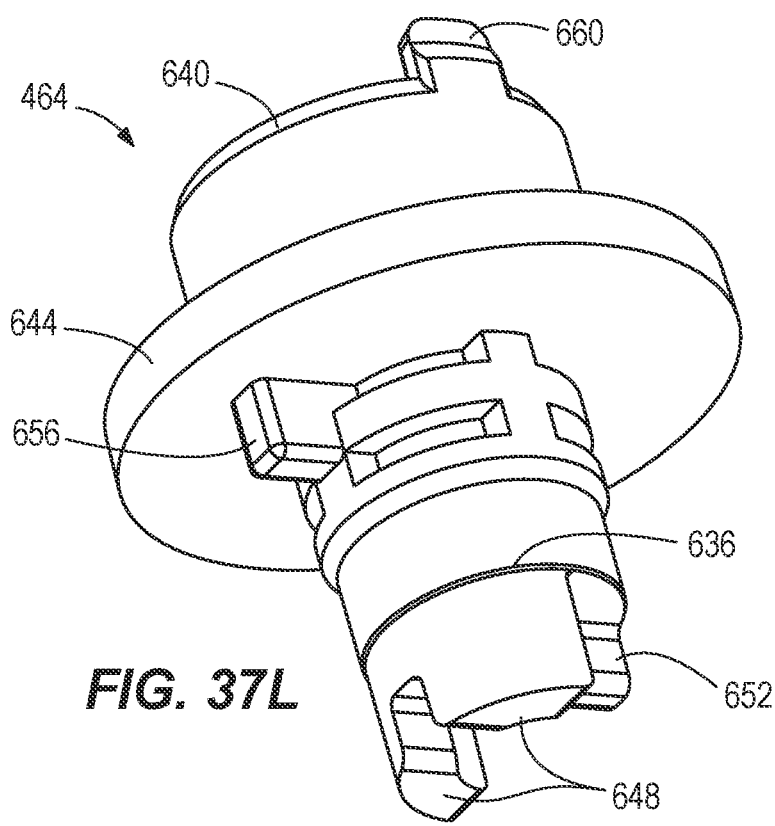
FIG. 37L is a perspective view of the outlet shaft.
Figure 37M:
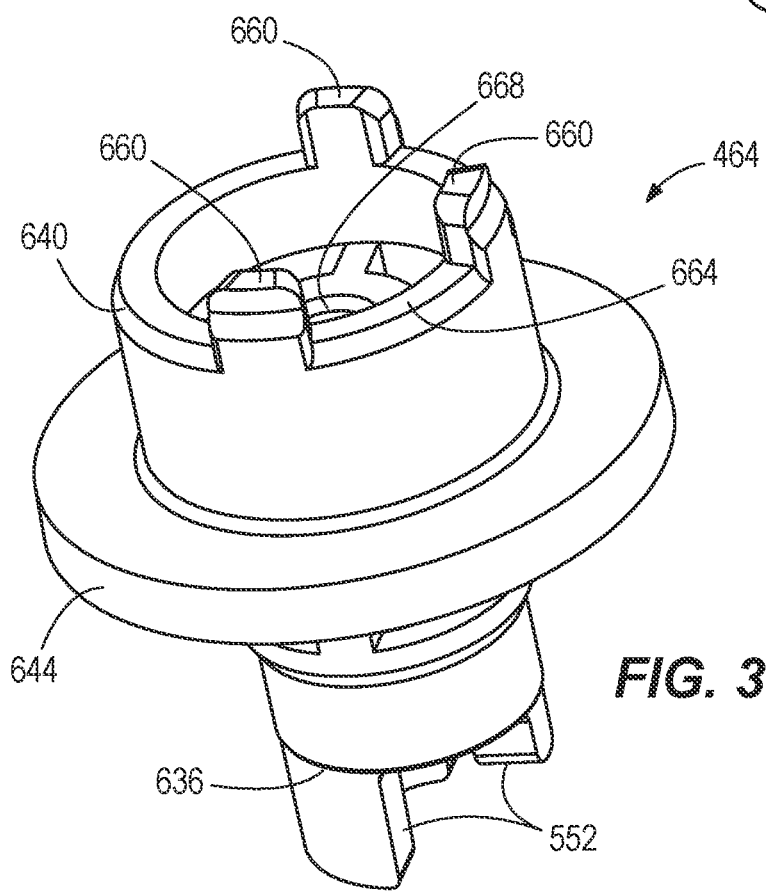
FIG. 37M is another perspective view of the outlet shaft.

As best seen in FIGS. 28, 29, 37H, 37L, and 37M, the outlet shaft 464 includes an elongated body with an inner end 636 and an outer end 640, and a cam plate 644 that is disposed between the ends 636, 640. Consistent with what is explained above with regard to the inlet shaft 444, the inner end 636 is shaped to mate with the outlet shaft 464 so that both shafts 444, 464 rotate in unison. As illustrated in FIG. 37L, 37M, the inner end 636 has two spaced fingers 648 and a tab 652, and the cam plate 644 has a key 656 on the side facing the inner end 636. The fingers 648 are engaged with the inlet shaft 444 in the space between the fingers 552, and the fingers 552 are engaged with the outlet shaft 464 in the space between the fingers 648. It will be appreciated that the inner end 636 can have other features that facilitate interlock with the inlet shaft 444. The key 656 engages the notch 632 in the outlet pressure cam 460 to fix rotation between the outlet shaft 464 and the outlet pressure cam 460.

With reference to FIGS. 37L and 37M, the outer end 640 has shaft extensions 660 that are spaced annularly around the periphery of the outlet shaft 464 and that are engageable with the pockets 396 in the valve crank gear 380*b*. The shaft key 394 extending from the valve crank gear 380*b* is engaged with a slot 664 in the outer end 640 between the shaft extensions 660. The illustrated outer end 640 has three extensions 660, but it will be appreciated that the outer end 640 can have one, two, or more than three extensions 660 to fix rotation between the valve crank gear 380*b* and the outlet shaft 464. The outlet shaft 464 also has an aperture 668 that receives a fastener 576 to secure the valve crank gear 380*b* to the outlet shaft 464. The valve crank gear 380*b* is the same as the valve crank gear 380*a*. As such, the outer end 640 and the valve crank gear 380*b* are engageable with and secured relative to each other in the same way that the outer end 544 of the inlet shaft 444 and the valve crank gear 380*a* are engaged with and secured relative to each other.

With reference to FIG. 29, a bearing or wear plate 672 is supported on the outer side of the outlet pressure cam 460. The wear plate 672 is the same as the wear plate 580 and surrounds the cam plate 644 and a portion of the outer end 640. A shaft seal or ring 676 is coupled to the outer end 640 to seal the interior parts of the outlet valve assembly 424. A seal 680 (e.g., an O-ring) is coupled to a seal shelf 684 that is defined on the outer periphery of the wear plate 672.

FIG. 29 shows that the seal plate 468 is sandwiched between the valve crank gear 380 and the outlet shaft 464. The seal plate 468 is the same as the seal plate 452 and includes an inner annular neck 688 that is engageable with the cam plate 644, and an outer annular neck 692 that supports a seal 696 and that engages an inner wall 698 of the outlet-side chamber 324. The seal plate 468 is secured to the framework 306 by fasteners 696 such that the seal plate 468 does not rotate with the valve crank gear 380b or the outlet valve assembly 424.

To assemble the dosing engine 300, the inlet valve assembly 420 and the outlet valve assembly 424 are installed on the framework 306 from their respective sides. On the inlet side, the bore seal 428 is inserted into the center bore 472, and the lift cam 432 is installed over the bore seal 428. Thereafter, the valve poppets 436 (and the corresponding poppet seals 412) are inserted into respective flow channels 340a so that the valve poppets 436 rest on the base section 476, the lift cam ledge 480, the first cam slope 484, or the second cam slope 488 (depending on the orientation of the lift cam 432 relative to the valve poppets 436). The inlet pressure cam 440 is positioned over the lift cam 432 so that the key 532 is engaged with the notch 492 to fix rotation between the lift cam 432 and the inlet pressure cam 440. The inlet shaft 444 is coupled to the inlet pressure cam 440 via engagement between the key 560 and the notch 536 so that the inlet pressure cam 440 rotates with the inlet shaft 444. The wear plate 580 and the shaft seal 584 are coupled to the outer side of the inlet shaft 444 adjacent the outer end 544. The seal plate 452 is then positioned over and the inlet shaft 444, the wear plate 580, and the shaft seal 584 and attached to the framework 306. The valve crank gear 380a is then positioned over the inlet shaft 444 so that the pockets 396 align with the shaft extensions 644 and so that the shaft key 394 is aligned with the slot 568. The remainder of the drive mechanism 305 on the inlet side is then attached to the valve crank gear 380a.

On the outlet side, the valve poppets 456 (and the corresponding poppet seals 412) are inserted into respective flow channels 340b so that the valve poppets 456 rest on the inner wall 698 of the outlet-side chamber 324. The outlet pressure cam 460 is positioned over the valve poppets 456, and the outlet shaft 464 is coupled to the outlet pressure cam 460 via engagement between the key 656 and the notch 632 so that the outlet pressure cam 460 rotates with the outlet shaft 464. The outlet shaft 464 also is keyed to the inlet shaft 444 due to the complementary features on the respective inner ends 540, 636. This complementary engagement between the shafts 444, 464 defines a flow control device that controls fluid flow on the inlet and outlet sides of the dosing engine 300.

The wear plate 672 and the shaft seal 676 are coupled to the outer side of the outlet shaft 464 adjacent the outer end 640. The seal plate 468 is then positioned over and the outlet shaft 464, the wear plate 672, and the shaft seal 676, and attached to the framework 306. The valve crank gear 380b is then positioned over the outlet shaft 464 so that the pockets 396 align with the shaft extensions 660 and so that the shaft key 394 is aligned with the slot 664. The remainder of the drive mechanism 305 on the outlet side is then attached to the valve crank gear 380b. The pistons 352 are positioned in the framework 306 so that the arms 365 are disposed in the slots 358. The primary crank arms 400a, 400b are attached to (e.g., snapped onto) the respective valve crank gears 380a, 380b and onto the arms 365 of one of the pistons 352 so that the arms 400a, 400b rotate relative to the respective connections. The secondary crank arms 404 are then attached to (e.g., snapped onto) the primary crank arms 400a, 400b and to the arms 365 of the remaining pistons 352 for relative rotation.

The lift cam 432, the inlet pressure cam 440, and the valve poppets 436, define a valve of the inlet valve assembly 420, and the poppets 456 and the outlet pressure cam 460 define a valve of the outlet valve assembly 424, both of which are driven by the inlet shaft 444 and the outlet shaft 464. The valves direct fluid into and out of the pump chambers 372 in a coordinated manner based on the state of the valve poppets 436, 456. The flow channels 340a and the openings 356 provide fluid communication between the inlet-side chamber 320 and the pump chambers 372 based on the state of the poppets 436 (e.g., open or closed, or in some position between open and closed). Likewise, the flow channels 340b and the openings 356 provide fluid communication between the pump chambers 372 and the outlet-side chamber 320 based on the state of the poppets 456 (e.g., open or closed, or in some position between open and closed). Each piston 352 and corresponding pump chamber 372 has two valve poppets—one inlet valve poppet 436 and one outlet valve poppet 456. When one of the two valve poppets 436, 456 is open or moving toward the open position, the other valve poppet 456, 436 is closed. When the piston 352 is at a bottom-dead position (closest to the opening 356) or a top-dead position (farthest from the opening 356), both valve poppets 436, 456 are generally closed. Depending on the tolerances of the system, the poppets 436, 456 may temporarily both be in the closed position at the same time while transitioning between the inlet and outlet strokes, although this should be limited to prevent a condition known as cylinder knock. Due to the cooperative arrangement between the lift cam ledge 480 and the pressure cam ledge 520 on the inlet side, and the relative orientation of the pressure cam ledge 616 on the outlet side, the valve poppets 436, 456 are varied between the closed and open positions in a coordinated manner that aligns with the state of the piston 352 to which the valve poppets 436, 456 correspond.

The bore seal 320 seals the inlet-side chamber 320 from the outlet-side chamber 324 so that fluid does not flow directly from the inlet-side chamber 320 to the outlet-side chamber 324. The shaft seals 584, 676, and the seals 588, 680 act as a fluid barrier between the inlet and outlet shafts 444, 464 and the exterior of the engine 300 such that fluid within the framework 306 does not escape or otherwise leak.

Depending on the direction of rotation of the diluent pump 304, one of the cam slopes 484, 488 lifts at least one of the poppets 436 to the open position, the lift cam ledge 480 holds the lifted poppet(s) in the open position, and the other of the cam slopes 488, 484 allows the lifted poppet(s) 436 to move toward the closed position. The base section 476 of the lift cam 380 allows the valve poppet(s) 436 to be in the closed position. The base section 516, the pressure cam ledge 520, and the first and second cam slopes 524, 528 on the inlet pressure cam 440 complement the action of the valve poppets 436 that is facilitated by the lift cam 324. That is, the base section 516 permits the valve poppet(s) 436 to stay open when lifted by the lift cam 432, the pressure cam ledge 520 forces valve poppets 436 to stay closed by engagement with the respective poppet heads 500 (i.e. when the poppets 436 are aligned with the base section 476), and the cam slopes 524, 528 permit movement of the valve poppets 436 between their open and closed positions. On the outlet side, there is no need for a lift cam because the pressure of fluid flowing from one or more of the pump chambers 372 is sufficient to force the corresponding poppet 456 to the open position. The outlet pressure cam 460 coordinates movement of the poppet 456 from the open position back toward, and to, the closed position, and holds the poppet 456 in the closed position via the pressure cam ledge 616.

The dosing engine 300 self-primes the pistons 352 when water flows through the inlet 312 and into at least one of the pump chambers 372. Stated another way, diluent entering the system defines the motive force for the dosing engine 300 and drives movement of the pistons 352, which in turn rotates the valve assemblies 420, 424. A pressure differential that is generated between the inlet 312 and the outlet 316 causes the pistons 352 to reciprocate within the housings 328, which in turn rotate the valve assemblies 420, 424. Fluid flows from the inlet 312 through the flow channels 340a associated with the valve poppet(s) 436 that are partially or fully open. The fluid then enters the corresponding pump chamber 372 via the opening 356 in the housing 328. The pressure of the fluid forces the corresponding piston 352 to move away from the opening 356 toward a top-dead position, which allows more fluid to accumulate in the pump chamber 372. This action primes the drive mechanism 305, which begins movement of the remaining pistons 352 within the respective housings 328.

Figure 38A:
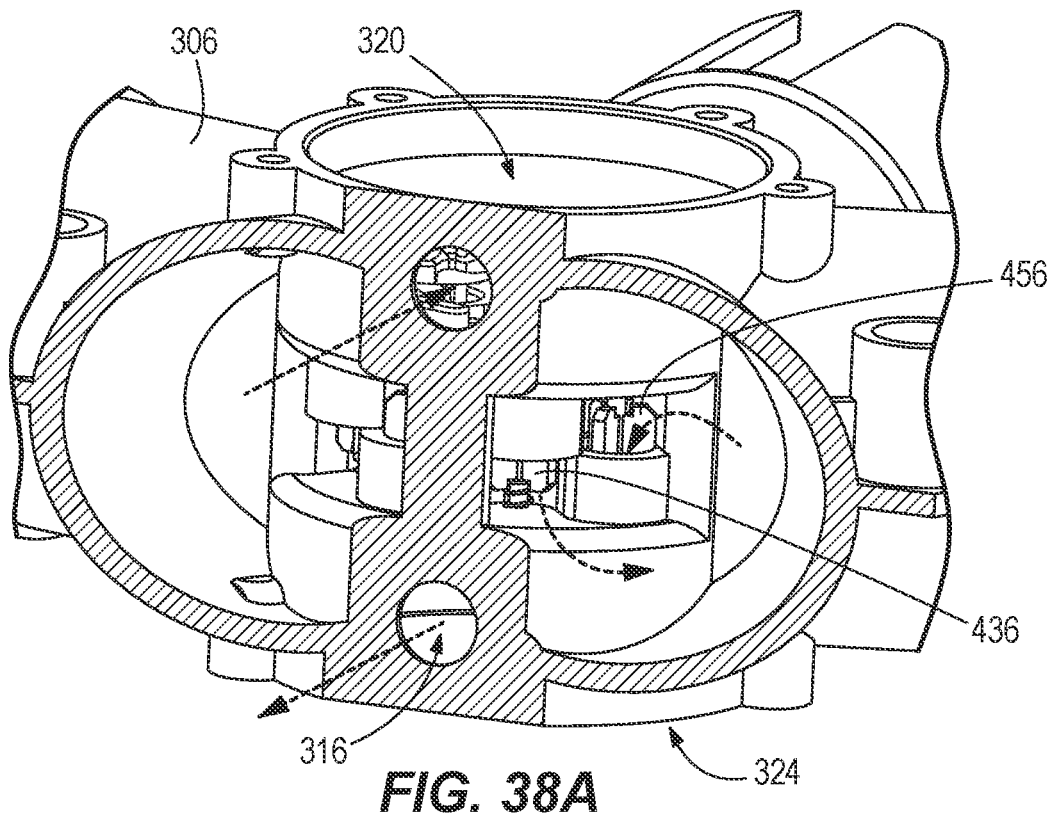
FIG. 38A is a section view across the inlet and outlet of the dosing engine illustrating fluid flow through the inlet and the outlet, and into and out of a mechanism 64 pump chamber relative to the inlet-side chamber and the outlet-side chamber, respectively.
Figure 38B:
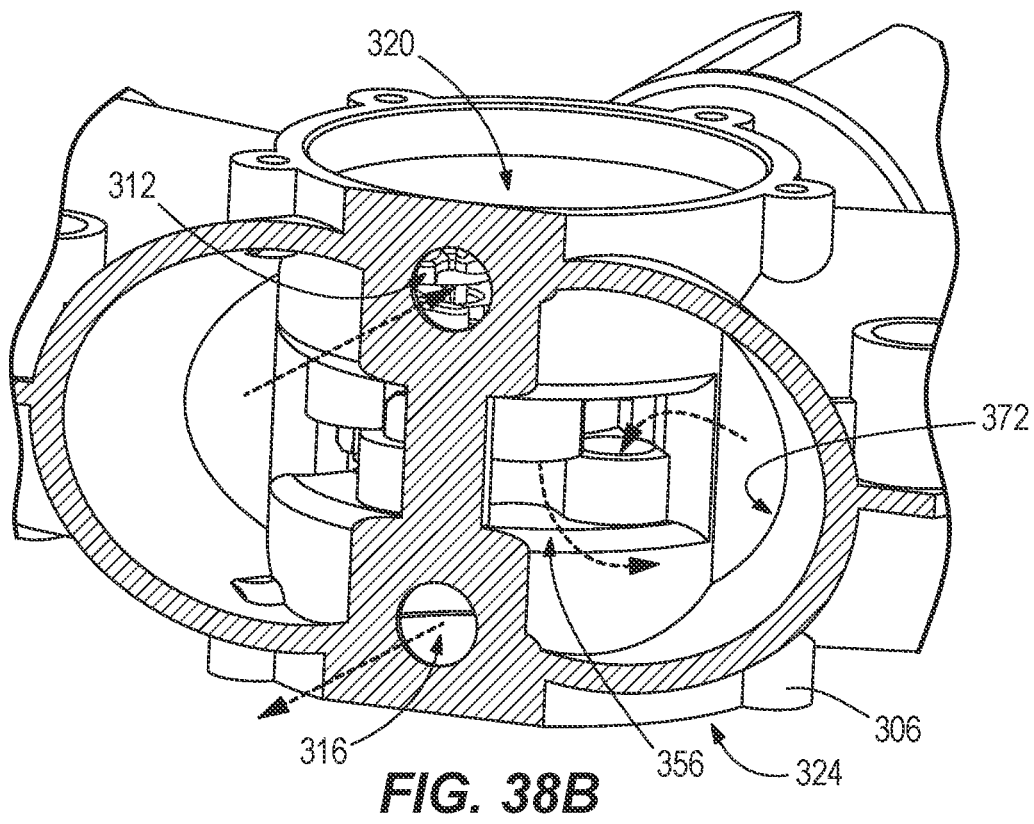
FIG. 38B is another section view across the inlet and outlet of the dosing engine illustrating fluid flow through the inlet and the outlet, and into and out of a mechanism 64 pump chamber relative to the inlet-side chamber and the outlet-side chamber, respectively, with some poppets removed for clarity.
Figure 39:
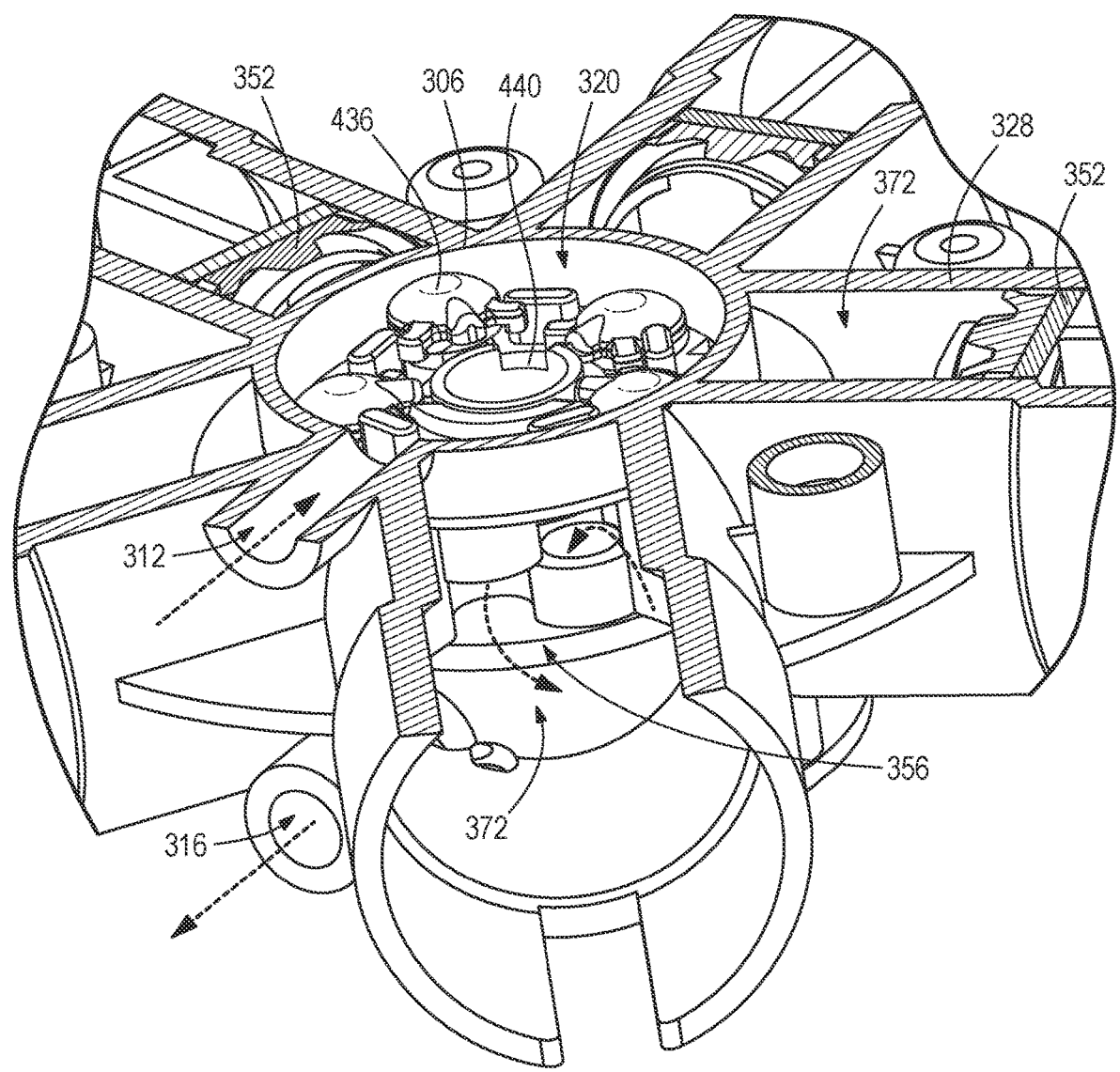
FIG. 39 is a section view across the inlet side the dosing engine illustrating fluid flow through the system.
Figure 40:
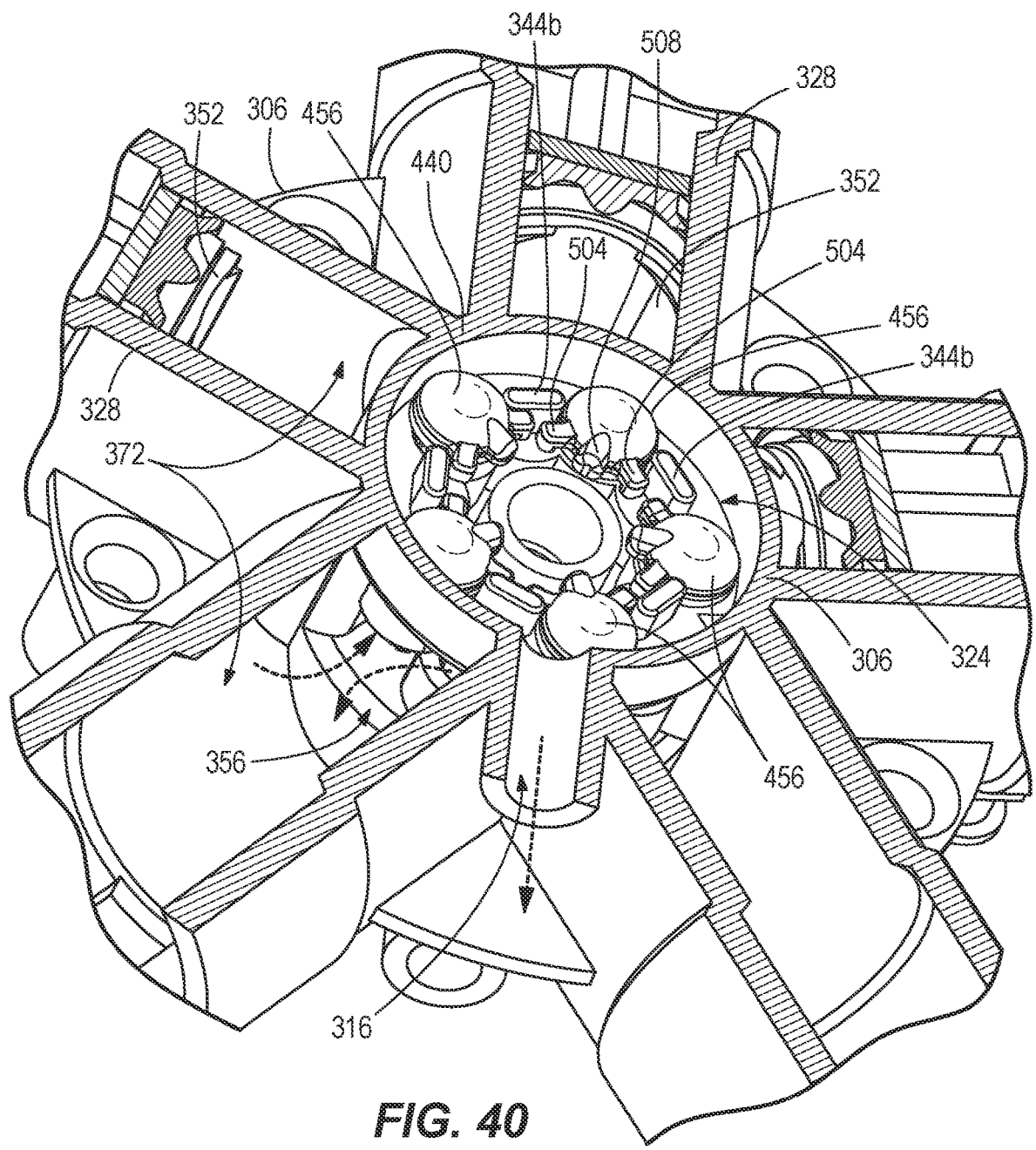
FIG. 40 is a section view across the outlet side of the dosing engine illustrating fluid flow through the system.

FIGS. 38A-40 generally show a fluid flow path of fluid through the dosing engine 300 and actuation of the pistons 352 within the framework 306. FIG. 38A differs from FIG. 38B in that the poppets 436 are removed in FIG. 38B to better show the fluid flow path. The dashed lines in FIGS. 38A-40 indicate the flow paths as described herein.

Each piston 352 is actuatable between an extended position (i.e. the top-dead position) and a bottom-dead position. The top-dead position corresponds to a maximum radius that the piston 352 extends from the axis of rotation of the diluent pump 304 (through the central opening 332), and the bottom-dead position corresponds to the minimum radius that the piston 352 can be located from the axis of rotation. Referring to FIG. 41, Piston 352a is in the top-dead position, while piston 352b and piston 352c are both in, or approximately in, the bottom-dead position. Piston 352d and piston 352e are between the top-dead position and the bottom-dead position and are moving toward or away from one of these positions. As such, there is no state of the dosing engine 300 in which fluid is neither flowing into a pump chamber 372, nor flowing from a pump chamber 372. The rotational movement of the valve crank gears 380, caused by fluid flow in the system, can be used to drive other systems, for example the chemical pump assemblies 18.

The volume of the pump chamber 372, which corresponds to the amount of fluid that can be driven out of the system, is defined by the amount of travel between the bottom-dead position and the top-dead position and the cross-sectional area of the pump chamber taken across the axis along which the pistons 352 move.

Figure 42A:
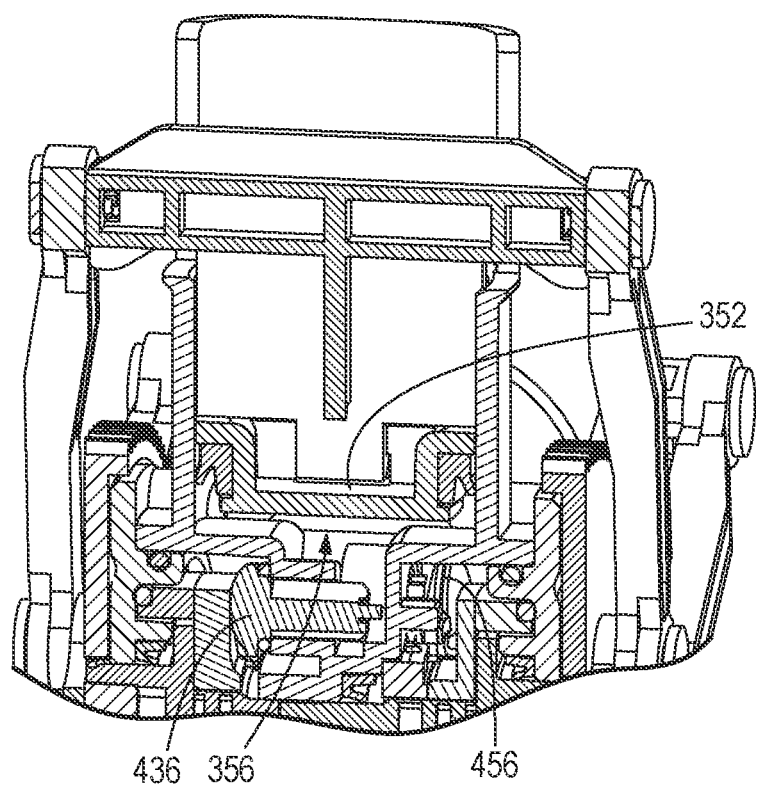
FIG. 42A is a section view illustrating a stroke of one piston and relative positions of the poppets associated with the piston during operation of the dosing engine.
Figure 42B:
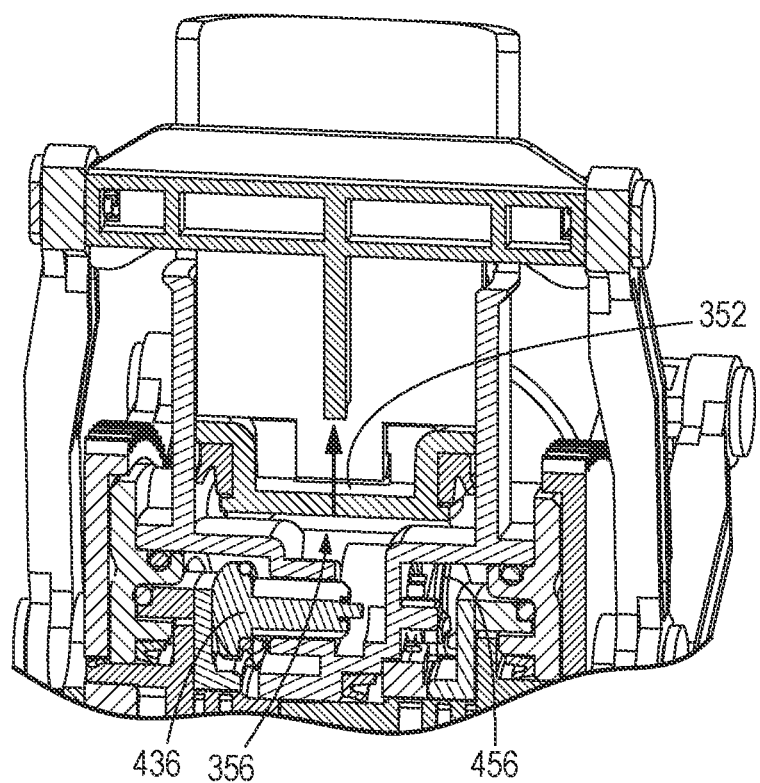
FIG. 42B is a section view illustrating a stroke of one piston and relative positions of the poppets associated with the piston during operation of the dosing engine.
Figure 42C:
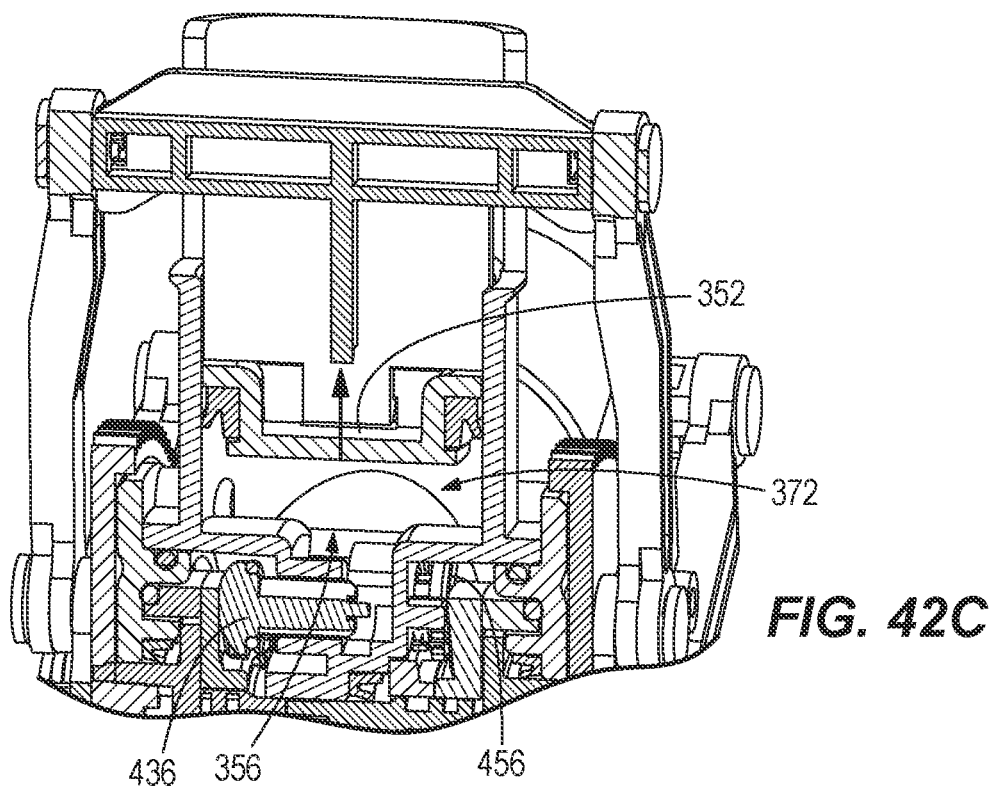
FIG. 42C is a section view illustrating a stroke of one piston and relative positions of the poppets associated with the piston during operation of the dosing engine.
Figure 42D:
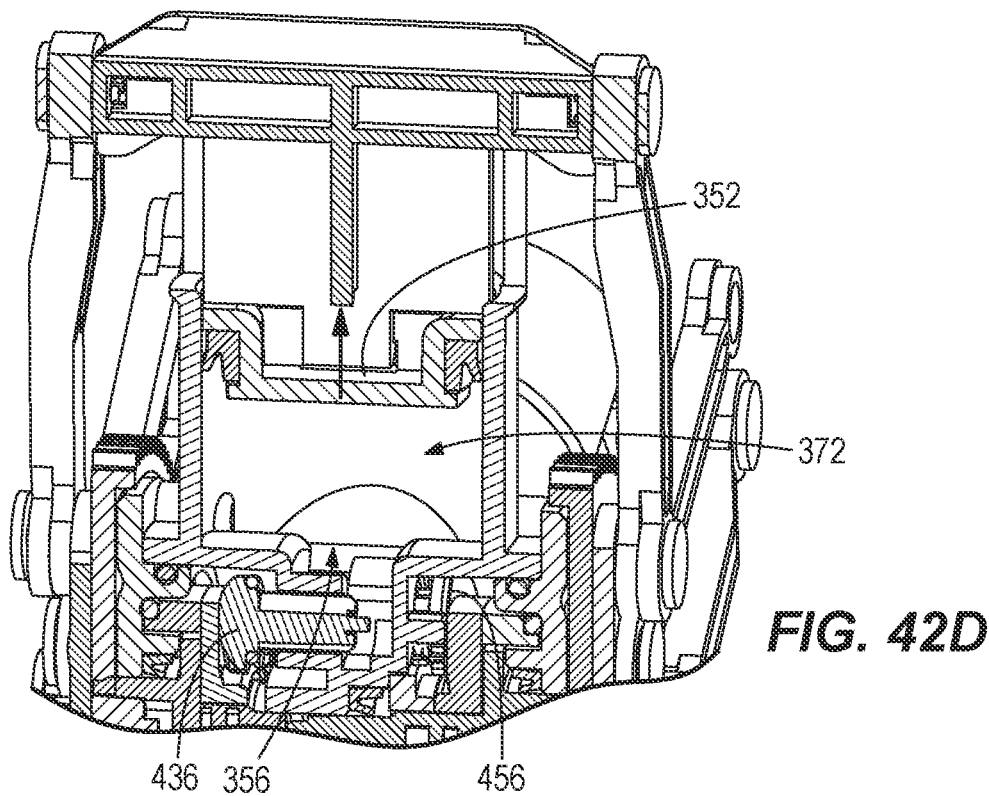
FIG. 42D is a section view illustrating a stroke of one piston and relative positions of the poppets associated with the piston during operation of the dosing engine.
Figure 42E:
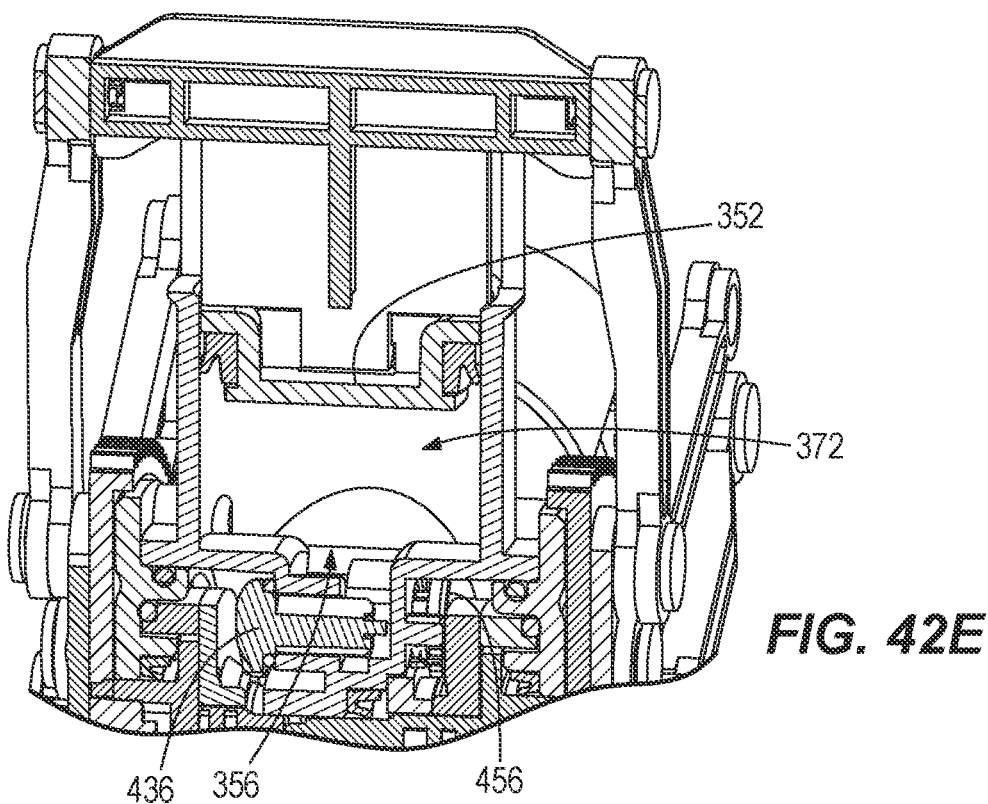
FIG. 42E is a section view illustrating a stroke of one piston and relative positions of the poppets associated with the piston during operation of the dosing engine.
Figure 42F:
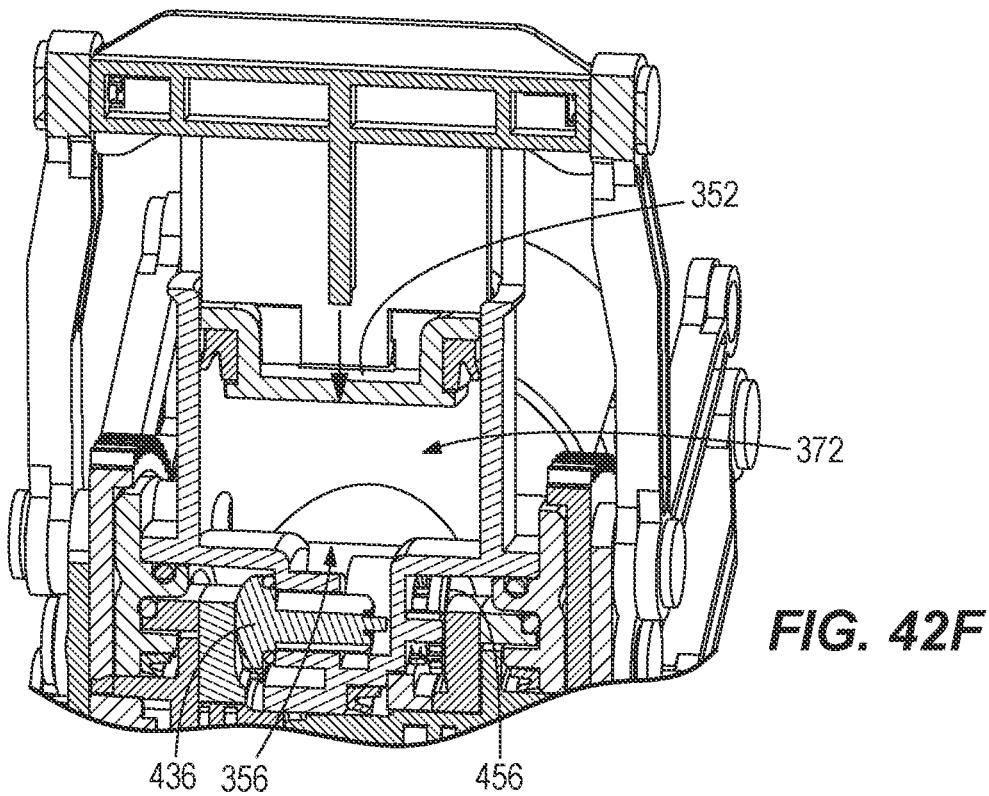
FIG. 42F is a section view illustrating a stroke of one piston and relative positions of the poppets associated with the piston during operation of the dosing engine.
Figure 42G:
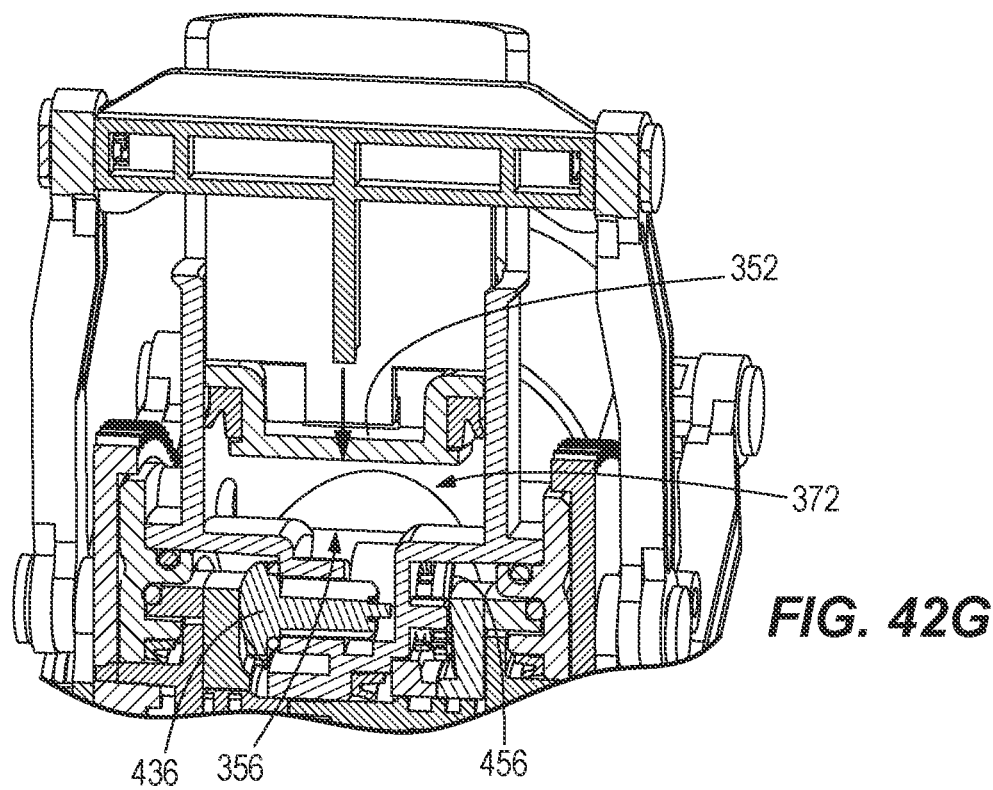
FIG. 42G is a section view illustrating a stroke of one piston and relative positions of the poppets associated with the piston during operation of the dosing engine.
Figure 42H:
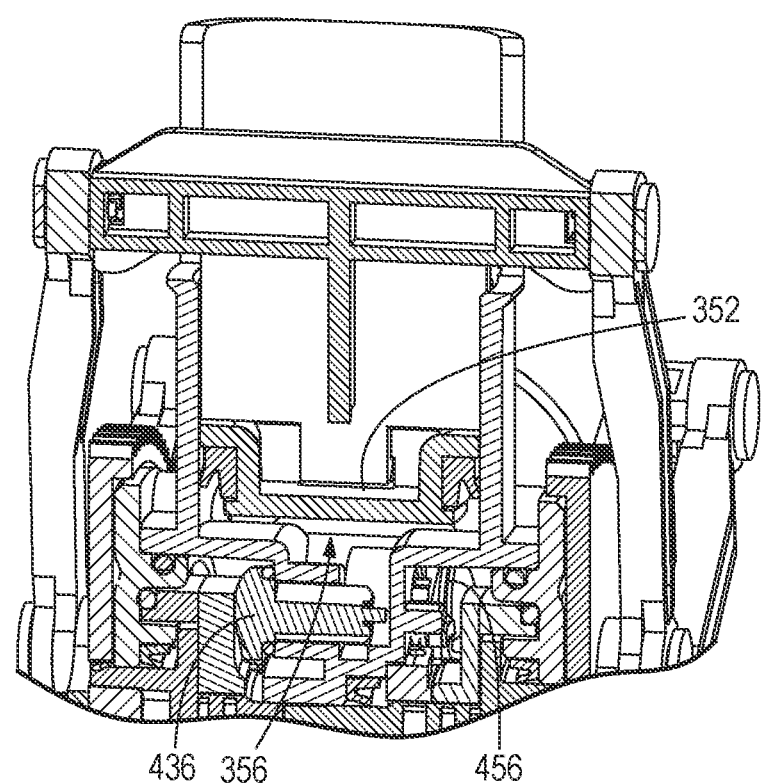
FIG. 42H is a section view illustrating a stroke of one piston and relative positions of the poppets associated with the piston during operation of the dosing engine.

FIGS. 42A-42H illustrate the up-stroke of one piston 352 within its housing 328 (FIGS. 42B-42D) from the bottom-dead position (FIG. 42A) to the top-dead position (FIG. 42E), and the down-stroke of the piston 352 from the top-dead position back to the bottom dead position (FIGS. 42f-42H). The corresponding positions of the inlet valve poppet 436 (shown moving to the open position or in the open position in FIGS. 42B-42D, and closing or in the closed position in FIGS. 42E-42H) and the outlet valve poppet 456 (shown closed in FIGS. 42A-42E and 42H, and moving toward the open position or in the open position in FIGS. 42F-4G) are also shown. For example, FIG. 42D illustrates the piston 352 nearing the top-dead position, and the inlet valve poppet 436 is open but moving toward the closed position, and the outlet valve poppet 456 is closed.

FIG. 43E illustrates that the valve poppets 436, 456 are closed. FIG. 42G illustrates that the inlet valve poppet 436 remains closed as the piston moves to the bottom-dead position, and the outlet valve poppet 456 remains open.

Figure 44A:
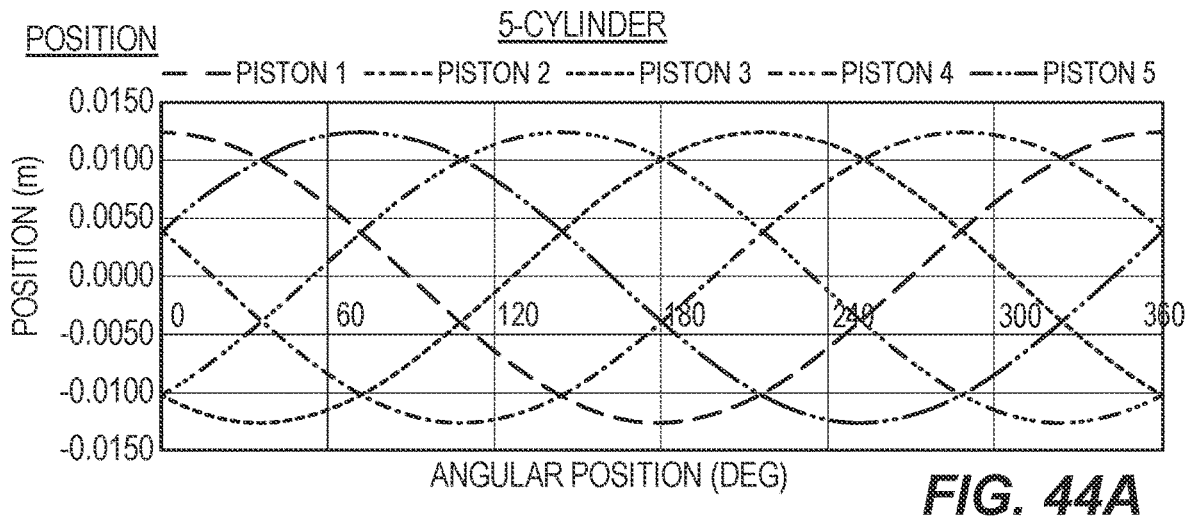
FIG. 44A illustrates piston deflection relative to the angular position of pistons in a five-piston dosing engine consistent with what is shown in FIG. 20.
Figure 44B:
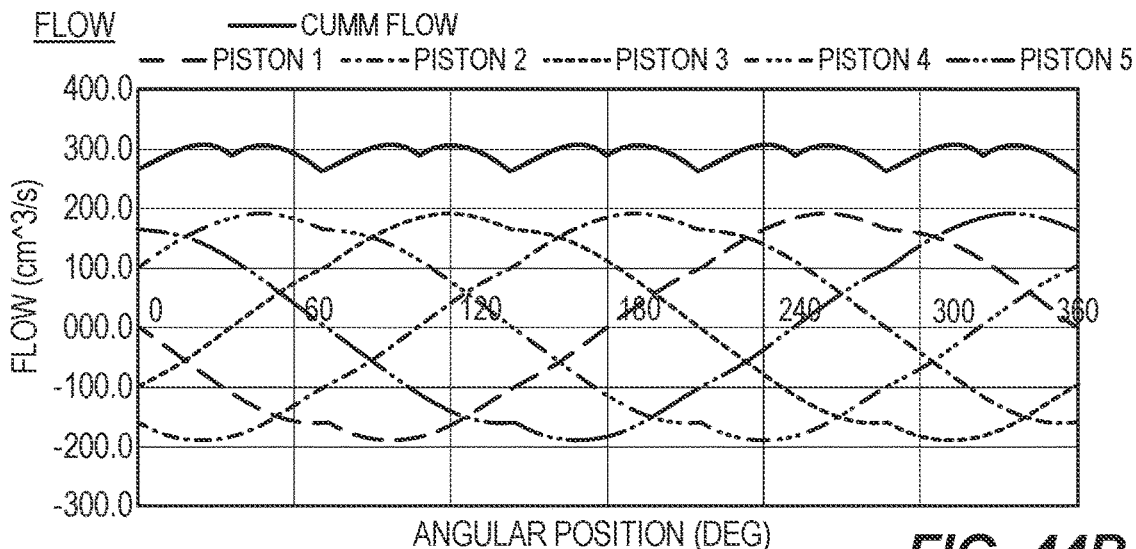
FIG. 44B illustrates dosing engine flow rate relative to the angular position of pistons in a five-piston dosing engine consistent with what is shown in FIG. 20.

FIG. 44A illustrates the relative positions of a five-piston system consistent with what is described relative to FIGS. 20-43K and shows that at no point is the system in a 'dead'-state where fluid is not entering or leaving the system. FIG. 44B illustrates the flow associated with the angular positions of the pistons. FIG. 44D illustrates the torque associated with each piston relative to the position of the piston.

Various exemplary dimensions of the five-cylinder dosing engine 300 are now provided for context, although other dimensions, especially scaled dimensions, are contemplated. The diluent pump 304 preferably operates at about 120-180 revolutions per minute ("rpm"). Each cylinder size is about 28 cubic centimeters. The diluent pump 304 as illustrated has a 6-inch diameter but could have other diameters such as a diameter of 4 inches. The diluent pump 304 can operate at a fluid pressure of about 25-30 pounds per square inch ("psi"), but is intended to operate with a consistent fluid pressure that is lower, such as 5-15 psi. Also, the diluent pump 304 can operate under large, temporary surges of fluid pressure, for example 100 psi. When such a surge occurs, the diluent pump 304 operates to work down the driving fluid pressure back into an operation range via pumping the driving fluid. The dosing engine 300 pump about 50,000 liters of driving fluid, for example water, over about a two-year lifespan.

Comparing the three-cylinder dosing engine 10 with the five-cylinder dosing engine 300, FIGS. 43A and 44A illustrate the radial position of the pistons relative to the angular position of the rotating components of the respective dosing engines. FIGS. 43B and 44B show the same angular position of the pistons of each dosing engine with a cumulative flow rate through each engine as a result of the piston movements. Notably, when comparing the cumulative flow of the three-cylinder engine 10 with the five-cylinder engine 300, the five-cylinder engine 300 provides a relatively smoother cumulative flow. That is, the delta between minimum and maximum flow rates of the five-cylinder dosing engine 300 is less than that between the minimum and maximum flow rates for the three-cylinder dosing engine when operating at a steady state. This feature of the five-cylinder dosing engine design is advantageous for maintaining a consistent, steady output and preventing or minimizing a "water hammer" phenomenon in the pistons.

Figure 44C:
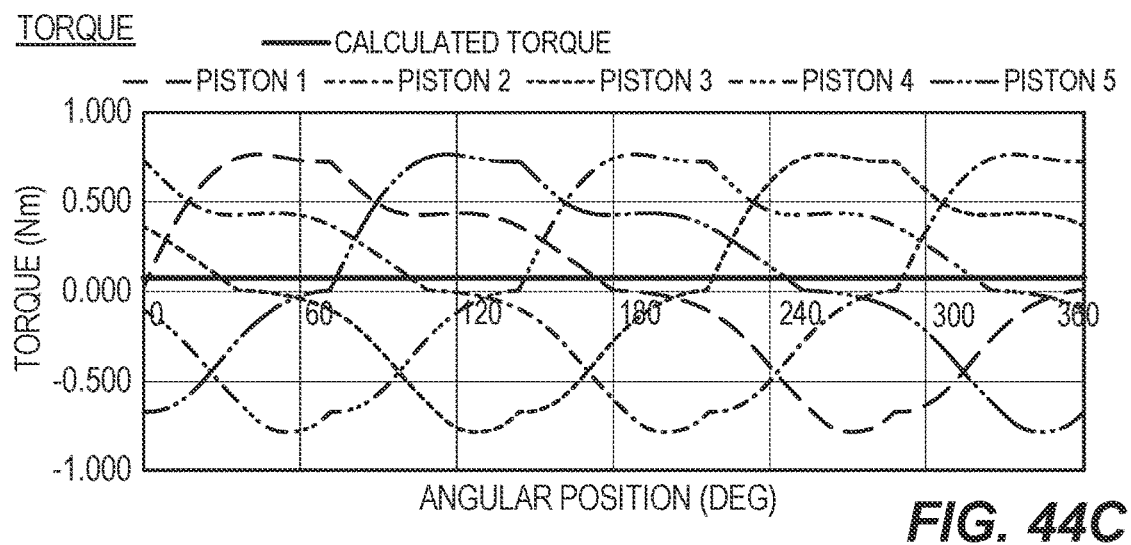
FIG. 44C illustrates piston torque relative to the angular position of pistons in a five-piston dosing engine consistent with what is shown in FIG. 20.

FIGS. 43C and 44C illustrate the toque of each piston of the three- and five-cylinder dosing engine configurations. The five-cylinder dosing engine 300 has relatively less torque acting on each of the pistons 352 than what acts on the pistons of the three-cylinder dosing engine 10, and additionally has a lower change in torque relative to the angular position of the pistons. These features provide less stress on the pump parts, and in turn, higher reliability of the dosing engine.

It follows that aspects from both the three-cylinder and the five-cylinder dosing engines are combinable to meet dosing engine requirements. For example, the poppets 436, 456, the pressure cams 440, 428, and lift cam 380 could be used in a three-piston dosing engine. Similarly, the valve mechanism 64 that is rotatable within the central chamber 44 of the three-piston engine 10 is adaptable to work with a five-cylinder dosing engine 300. Each dosing engine is adaptable to operate the chemical pumps 18.

Other aspects not shown herein are combinable with the three-cylinder dosing engine 10 and the five-cylinder dosing engine 300 as disclosed herein. For example, filtration may be fitted on the inlet side of the framework to filter sediment from the dosing engine driving fluid. While corrosion may not be an issue if the dosing engine is generally made from plastic or a composite material, sediment, sand, and other particulate in the driving fluid could get trapped in the dosing engine and inhibit the actuation of the pump components. A pressure or flow regulator on the inlet of the framework could also be provided to protect the dosing engine from damagingly high pressure or flow of the driving fluid into the dosing engine.

The invention claimed is:

1. A dosing engine comprising:
a framework including an inlet configured to receive a fluid and an outlet configured to dispense the fluid, the framework further including a central chamber;
fluid drivers supported by and radially arranged on the framework and configured to pump fluid toward the outlet; and
a flow control device coupled to the framework and in fluid communication with the inlet, the outlet, and the fluid drivers, at least a portion of the flow control device disposed in the central chamber,
wherein the fluid drivers are cooperatively driven by a motive force from fluid flow through the inlet to dispense fluid via the outlet, and to drive the flow control device to distribute diluent to the fluid drivers in a coordinated manner.

2. The dosing engine of claim 1, further comprising a drive mechanism operatively coupled to the fluid drivers and to the flow control device, wherein the motive force on the fluid drivers is transferred to the flow control device by the drive mechanism.

3. The dosing system of claim 2, wherein the fluid drivers are defined by piston-cylinder arrangements, and wherein the drive mechanism is defined by a linkage mechanism configured to transfer linear movement of the piston-cylinder arrangements to rotation of the flow control device.

4. The dosing system of claim 1, wherein the flow control device includes an inlet valve mechanism disposed on an inlet side of the framework and an outlet valve mechanism disposed on an outlet side of the framework, and wherein the inlet valve mechanism and the outlet valve mechanism are attached to each other for fixed rotation.

5. The dosing system of claim 4, wherein the inlet valve mechanism includes inlet poppets and the outlet valve includes outlet poppets, wherein one each of the inlet poppets and the outlet poppets are associated with one of the fluid drivers, and wherein the inlet poppets and the outlet poppets are configured to open and close in a coordinated manner to control flow of fluid from the inlet to the outlet.

6. The dosing system of claim 5, wherein the inlet poppets are biased to the open position by a lift cam disposed in the framework on an underside of the inlet poppets.

7. The dosing system of claim 5, further comprising a drive mechanism operatively coupled to the fluid drivers and to the flow control device, and one or more chemical drivers coupled to the framework, wherein the one or more chemical drivers are configured to pump chemical in response to movement of the drive mechanism, wherein the one or more chemical drivers are selectively engaged or disengaged from the drive mechanism to stop chemical dispensation.

8. The dosing system of claim 1, wherein the fluid drivers are sequenced to provide continuous fluid flow to the outlet.

9. The dosing system of claim 1, wherein the fluid drivers at least partially define pump chambers, wherein the flow control device includes an inlet valve mechanism disposed on an inlet side of the framework and an outlet valve mechanism disposed on an outlet side of the framework, wherein the inlet valve mechanism and the outlet valve mechanism are axially-connected, and wherein each of the inlet valve mechanism and the outlet valve mechanism are configured to provide sequenced fluid intake into the pump chamber and fluid output from the pump chamber.

10. A dosing engine comprising:
a framework including an inlet configured to receive a fluid and an outlet configured to dispense the fluid;
fluid drivers supported by and radially arranged on the framework, the fluid drivers angularly spaced around the framework and configured to pump fluid toward the outlet;
a drive mechanism coupled to the framework and operatively coupled to the fluid drivers;
and
a flow control device at least partially disposed in the framework and operatively coupled to the drive mechanism, the flow control device in fluid communication with the inlet, the outlet, and the fluid drivers, and the flow control device defined by one or more cams and one or more valves to sequence flow of fluid to and from the fluid drivers in response to movement of the drive mechanism.

11. The dosing engine of claim 10, wherein a motive force on the fluid drivers is transferred to the flow control device by the drive mechanism.

12. The dosing system of claim 11, wherein the fluid drivers are defined by piston-cylinder arrangements, and wherein the drive mechanism is defined by a linkage mechanism configured to transfer linear movement of the piston-cylinder arrangements to rotation of the flow control device.

13. The dosing system of claim 10, wherein the flow control device includes an inlet valve mechanism disposed on an inlet side of the framework and an outlet valve mechanism disposed on an outlet side of the framework, wherein the inlet valve mechanism and the outlet valve mechanism are attached to each other for fixed rotation to sequence flow of fluid to and from the fluid drivers.

14. The dosing system of claim 13, and wherein the inlet valve mechanism includes a lift cam, an inlet pressure cam, and valves disposed between the lift cam and the inlet pressure cam, and wherein each of the valves is movable between a closed position and an open positions in response to rotation of the lift cam and the inlet pressure cam.

15. The dosing system of claim 14, wherein the lift cam and the pressure cam have sequenced cam portions to vary each of the valves between the closed position and the open position.

16. The dosing system of claim 14, wherein the outlet valve mechanism includes an outlet pressure cam and valves disposed in the framework inward of the outlet pressure cam, wherein motive force of fluid from the fluid drivers varies the valves to the open position and the outlet pressure cam is configured to vary the valves to the closed position.

17. A method of dispensing a fluid, the method comprising:
directing a fluid through an inlet of a framework, the framework supporting fluid drivers at least partially defining pump chambers associated with the fluid drivers;

cooperatively moving the fluid drivers via a motive force from fluid flow into the framework to dispense fluid to an outlet; and driving a flow control device in response to the cooperative movement of the fluid drivers to distribute diluent to the fluid drivers in a coordinated manner.

18. The method of claim 17, further comprising rotating a drive mechanism in response to movement of the fluid drivers, the drive mechanism operatively coupled between the fluid drivers and the flow control device; and transferring movement from the drive mechanism to the flow control device.

19. The method of claim 17, further comprising moving at least a first fluid driver of the fluid drivers in a first direction in response to the motive force of fluid flow into the associated pump chamber;

moving at least a second fluid driver of the fluid drivers in a second direction in response to the motive force of fluid flow into the pump chamber associated with the first fluid driver; and dispensing fluid from the pump chamber associated with the second fluid driver in response to moving at least the second fluid driver in the second direction.

20. A dosing engine comprising:

a framework including an inlet configured to receive a fluid and an outlet configured to dispense the fluid;

fluid drivers supported by the framework and configured to pump fluid toward the outlet, the fluid drivers defined by piston-cylinder arrangements; and a flow control device coupled to the framework and in fluid communication with the inlet, the outlet, and the fluid drivers;

a drive mechanism operatively coupled to the fluid drivers and to the flow control device, the drive mechanism defined by a linkage mechanism configured to transfer linear movement of the piston-cylinder arrangements to rotation of the flow control device, wherein the fluid drivers are cooperatively driven by a motive force from fluid flow through the inlet to dispense fluid via the outlet, and to drive the flow control device to distribute diluent to the fluid drivers in a coordinated manner.

wherein the motive force on the fluid drivers is transferred to the flow control device by the drive mechanism.

* * * * *